United States Patent
Takahashi

(10) Patent No.: US 11,447,039 B2
(45) Date of Patent: Sep. 20, 2022

(54) COMMUNICATION SEAT-TYPE VEHICLE

(71) Applicant: YAMAHA HATSUDOKI KABUSHIKI KAISHA, Iwata (JP)

(72) Inventor: Arato Takahashi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 298 days.

(21) Appl. No.: 16/878,400

(22) Filed: May 19, 2020

(65) Prior Publication Data

US 2020/0276914 A1   Sep. 3, 2020

Related U.S. Application Data

(63) Continuation-in-part of application No. PCT/JP2018/042743, filed on Nov. 20, 2018.

(30) Foreign Application Priority Data

Nov. 20, 2017   (JP) .............................. JP2017-223154

(51) Int. Cl.
  *B62D 25/00* (2006.01)
  *B60N 2/01* (2006.01)
  (Continued)

(52) U.S. Cl.
  CPC ........ *B60N 2/01* (2013.01); *B60J 5/06* (2013.01); *B60N 2/04* (2013.01); *B60N 2/24* (2013.01);
  (Continued)

(58) Field of Classification Search
  CPC ........ B62D 21/18; B62D 47/00; B62D 31/00; B62D 31/003; B62D 25/00; B62D 25/04;
  (Continued)

(56) References Cited

U.S. PATENT DOCUMENTS 1,350,601 A   8/1920   Fuller
1,710,616 A   4/1929   Guernsey
(Continued)

FOREIGN PATENT DOCUMENTS

AU   2792900 A   9/2000
CN   106627812 A   5/2017
(Continued)

OTHER PUBLICATIONS

Yamaha Motor Co., LTD, "CES 2018", [online], Jan. 9, 2018, YouTube (registered trademark), [retrieved on Oct. 19, 2018], the Internet <https://global.yamahamotor.com/jp/showroom/event/2018-ces/index.html>.

(Continued)

*Primary Examiner* — Gregory A Blankenship
(74) *Attorney, Agent, or Firm* — Rabin & Berdo, P.C.

(57) ABSTRACT

A communication seat-type vehicle having communication seats arranged at locations to allow the passengers seated thereon to talk face-to-face, four wheels including two front wheels and two rear wheels, a driving source configured to apply driving force to at least one of the four wheels, a steering mechanism configured to steer at least one of the four wheels, and a vehicle body frame which is at least partially provided between front ends of the two front wheels and rear ends of the two rear wheels in the vehicle front-rear direction, and in which a cabin space is provided to accommodate the passengers. The vehicle body frame has a front H-shaped frame structure including a ceiling frame, a floor frame provided directly below the ceiling frame, a front H-shaped frame including two front pillars and a front intermediate transverse frame connecting the two front pillars, and a rear frame including two rear pillars.

15 Claims, 18 Drawing Sheets

(51) Int. Cl.
*B60N 2/24* (2006.01)
*B62D 25/20* (2006.01)
*B60W 60/00* (2020.01)
*B60J 5/06* (2006.01)
*B60N 2/04* (2006.01)
*B60N 2/64* (2006.01)
*B60W 10/04* (2006.01)
*B60W 10/20* (2006.01)
*B62D 21/02* (2006.01)

(52) U.S. Cl.
CPC .............. *B60N 2/64* (2013.01); *B60W 10/04* (2013.01); *B60W 10/20* (2013.01); *B60W 60/0025* (2020.02); *B62D 21/02* (2013.01); *B62D 25/20* (2013.01)

(58) Field of Classification Search
CPC .... B62D 25/06; B62D 25/02; B62D 25/2018; B62D 25/2027; B62D 25/2009; B60N 2/24; B60N 2/01
See application file for complete search history.

(56) References Cited

U.S. PATENT DOCUMENTS

| | | | |
|---|---|---|---|
| 2,516,237 | A | 7/1950 | Morse |
| 3,352,597 | A | 11/1967 | Barenyi et al. |
| 3,504,336 | A | 3/1970 | Boblitz |
| 3,759,566 | A | 9/1973 | Sobey et al. |
| 3,856,106 | A | 12/1974 | Sobey et al. |
| 4,627,656 | A | 12/1986 | Gokimoto et al. |
| 6,129,405 | A | 10/2000 | Miyahara et al. |
| 6,260,913 | B1 | 7/2001 | Sekita et al. |
| 6,334,252 | B1 * | 1/2002 | Sato .................. B62D 23/00 29/430 |
| 7,455,490 | B1 | 11/2008 | Goosen |
| 9,725,064 | B1 | 8/2017 | Faruque et al. |
| 9,802,661 | B1 * | 10/2017 | Kentley-Klay ...... G05D 1/0088 |
| 2013/0015012 | A1 | 1/2013 | Wu |
| 2013/0098695 | A1 | 4/2013 | Itou et al. |
| 2015/0175040 | A1 | 6/2015 | Meszaros et al. |
| 2016/0272141 | A1 | 9/2016 | Ohmura |
| 2018/0065464 | A1 * | 3/2018 | Palhegyi .................. B60G 3/18 |
| 2018/0272977 | A1 | 9/2018 | Szawarski et al. |
| 2019/0100247 | A1 | 4/2019 | Nusier et al. |
| 2019/0106017 | A1 | 4/2019 | Marubayashi et al. |
| 2019/0185077 | A1 * | 6/2019 | Smith ................. B60K 17/3462 |
| 2019/0193666 | A1 | 6/2019 | Jost et al. |
| 2019/0202391 | A1 | 7/2019 | Cho et al. |
| 2019/0225167 | A1 * | 7/2019 | Takamura .............. B62D 63/02 |
| 2020/0039388 | A1 | 2/2020 | Onoyama |
| 2020/0086820 | A1 * | 3/2020 | Gould ...................... B60N 2/01 |
| 2020/0093662 | A1 | 3/2020 | Mori |
| 2020/0130838 | A1 | 4/2020 | Beaudin et al. |
| 2020/0276914 | A1 * | 9/2020 | Takahashi .................. B60J 5/06 |
| 2021/0038447 | A1 | 2/2021 | Fukawatase et al. |
| 2021/0146807 | A1 * | 5/2021 | Wood ..................... B60N 2/206 |
| 2021/0179179 | A1 | 6/2021 | Butukuri et al. |
| 2021/0221263 | A1 | 7/2021 | Jost et al. |
| 2021/0300212 | A1 * | 9/2021 | Ito ............................. B60R 1/12 |
| 2021/0380023 | A1 * | 12/2021 | Kanitz ................. B60N 2/0292 |
| 2022/0024353 | A1 * | 1/2022 | Cha .................... B60H 1/00564 |

FOREIGN PATENT DOCUMENTS

| | | |
|---|---|---|
| DE | 1142115 B | 1/1963 |
| DE | 102016008800 A1 | 1/2018 |
| FR | 2114948 A5 | 6/1972 |
| FR | 2826613 A1 | 1/2003 |
| FR | 3046395 A1 | 7/2017 |
| FR | 3046395 B1 | 5/2018 |
| JP | 2000-318501 A | 11/2000 |
| JP | 2003-191757 A | 7/2003 |
| JP | 2006-026303 A | 2/2006 |
| JP | 2007-325625 A | 12/2007 |
| JP | 2010120395 A | 6/2010 |
| JP | 2016175513 A | 10/2016 |
| KR | 20120009215 A | 2/2012 |
| WO | 0051840 A1 | 9/2000 |
| WO | 2011061585 A2 | 5/2011 |
| WO | 2011098848 A1 | 8/2011 |
| WO | 2011154681 A1 | 12/2011 |
| WO | 2016161216 A1 | 10/2016 |
| WO | 2020162186 A1 | 8/2020 |

OTHER PUBLICATIONS

Zeromomentpoint, "Future Robot Commuter Hotaru", [online], Apr. 25, 2016, YouTube (registered trademark), [retrieved on Nov. 15, 2017], the Internet <https://www.youtube.com/watch?v=2XbrZ5me2E4>.

\* cited by examiner

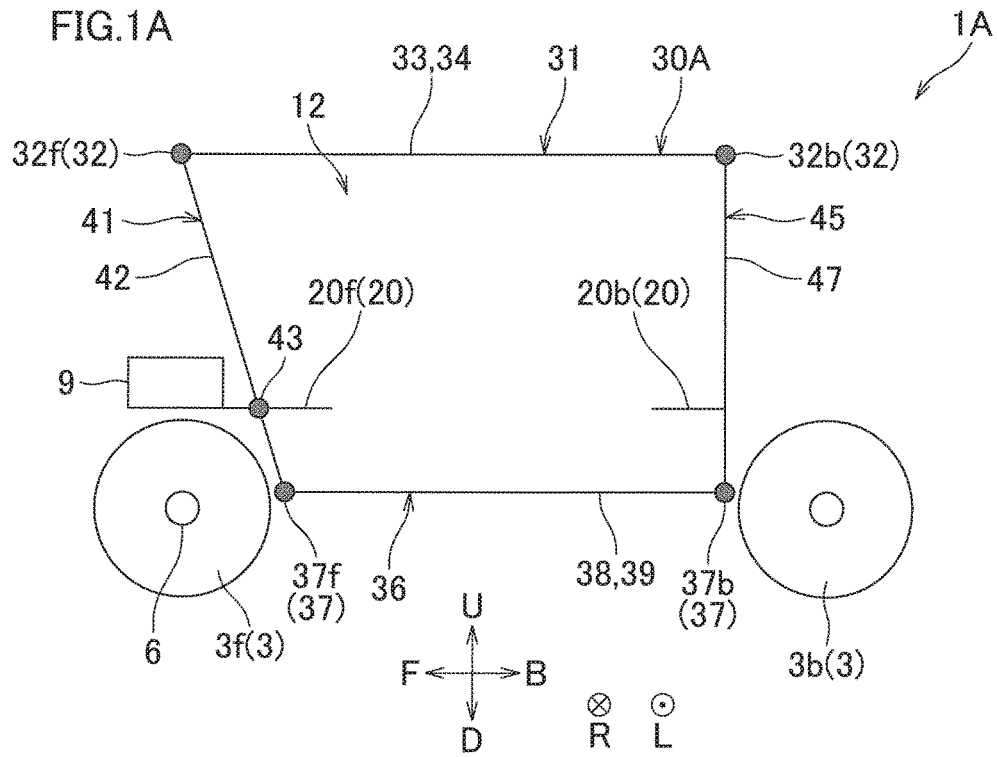
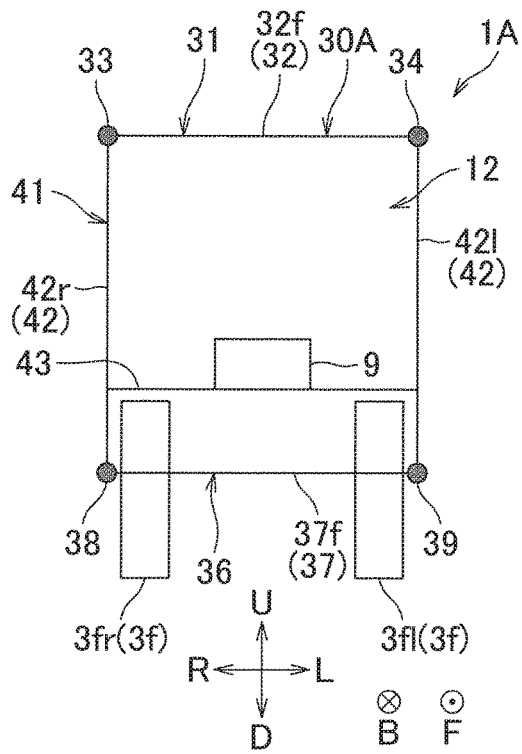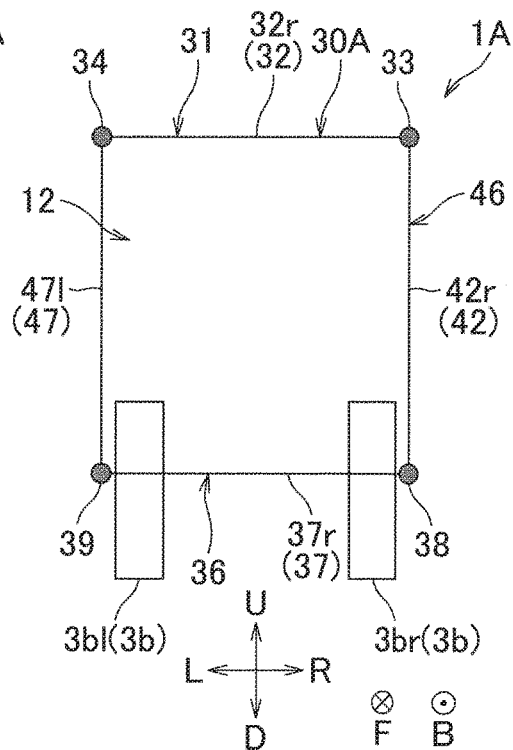

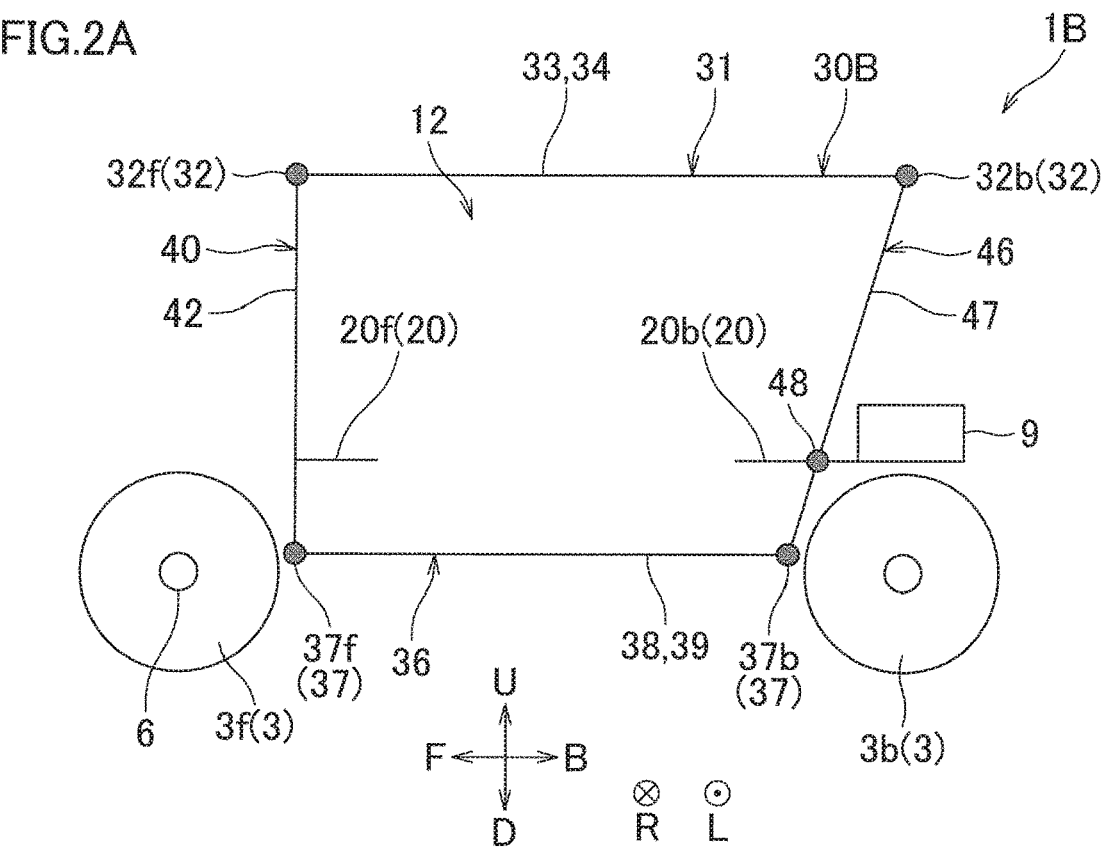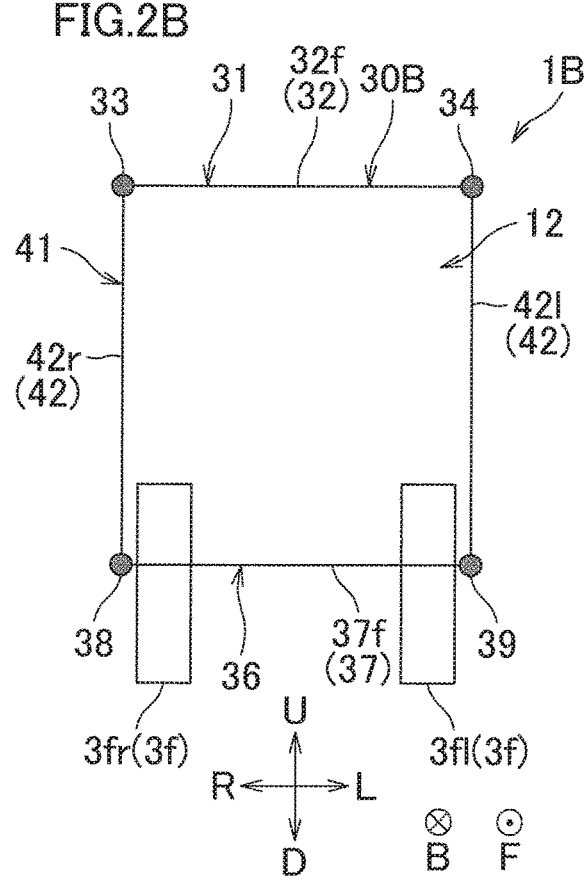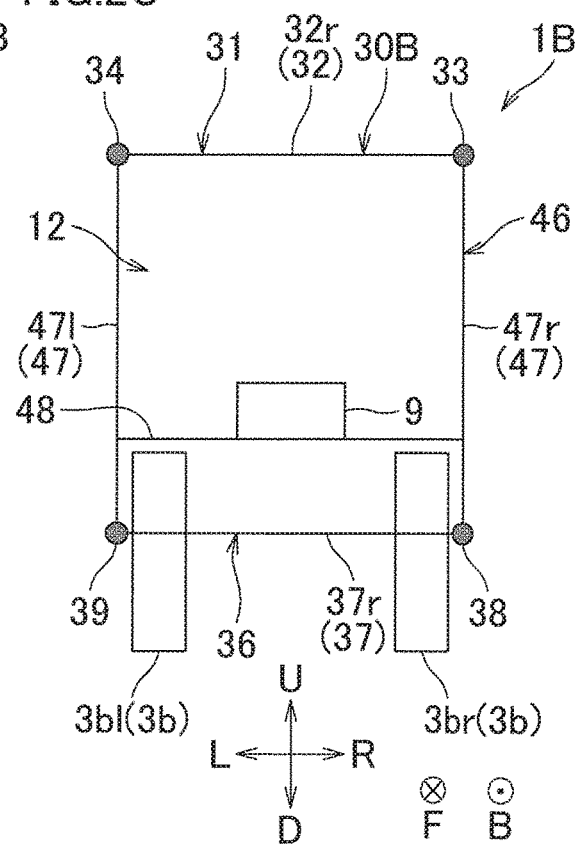

COMMUNICATION SEAT-TYPE VEHICLE

CROSS-REFERENCE TO RELATED APPLICATIONS

This application is a continuation-in-part application of International Application No. PCT/JP2018/042743, filed on Nov. 20, 2018, and claims the benefit of the earlier filing date of Japanese Patent Application No. 2017-223154, filed on Nov. 20, 2017. The entire contents of each of the identified applications are incorporated herein by reference.

BACKGROUND

Technical Field

The present teaching relates to a communication seat-type vehicle including communication seats which allow passengers to be seated at locations where the passengers are able to talk face-to-face with one another.

Background Art

A communication seat-type vehicle is a vehicle including communication seats which allow passengers to be seated at locations where the passengers are able to talk face-to-face with one another. In the communication seat-type vehicle, a cabin space in which passengers, etc. are accommodated is provided at a vehicle internal portion. The communication seat-type vehicle is therefore required to allow passengers to easily get in or out from the vehicle.

As a communication seat-type vehicle, a vehicle named Hotaru has been proposed as shown in a Non-Patent Literature 1. Hotaru is a vehicle having communication seats in a vehicle internal portion in order to satisfy the requirements above. The communication seats are arranged to have a large space therebetween, in order to allow passengers seated on the communication seats to talk face-to-face with one another in a limited space.

When the traveling direction of the communication seat-type vehicle is a forward direction in the vehicle front-rear direction, a doorway through which passengers get in and out from a cabin space is provided at a left portion, a right portion, or both of these portions of the vehicle. When viewed in the vehicle left-right direction, the doorway is provided at an intermediate portion between the communication seats. Because there is a large space between the communication seats, the doorway can be widened. When the doorway is wide, it is easy to get in and out from the cabin space for passengers.

CITATION LIST

Non-Patent Literature

[Non-Patent Literature 1] zeromomentpoint, "Future Robot Commuter Hotaru", [online], Apr. 25, 2016, YouTube (registered trademark), [retrieved on Nov. 15, 2017], the Internet.

SUMMARY OF INVENTION

Technical Problem

In connection with the above, elderly people may ride on the communication seat-type vehicle. Furthermore, a passenger in wheelchair may ride on the communication seat-type vehicle. Furthermore, a cart with a luggage may be brought into the communication seat-type vehicle. The communication seat-type vehicle is therefore required to have improved easiness of getting in and out, while the rigidity of a vehicle body frame is secured.

An object of the present teaching is to provide a communication seat-type vehicle which has improved easiness of getting in and out, while the rigidity of a vehicle body frame is secured.

Solution to Problem

The inventors of the subject application studied communication seat-type vehicles. In the communication seat-type vehicle, passengers get in and out from the cabin space. Furthermore, the communication seat-type vehicle includes a heavy load which is a driving source such as an engine and a battery or a steering mechanism. It is necessary in the communication seat-type vehicle to secure the rigidity of a structure which receives stress from the passengers and the heavy load such as the driving source or the steering mechanism.

The inventors of the subject application tried to employ a vehicle body frame constituted by rod members such as pipes, as the structure receiving stress. When a passenger rides on the vehicle, the vehicle body frame is loaded. In particular, a floor frame supporting a floor surface is loaded. The floor frame is included in the vehicle body frame. The vehicle body frame is therefore required to secure the rigidity of the floor frame on which the load of passengers is applied. In order to secure the rigidity of the floor frame, the rod members constituting the floor frame may be thickened. However, when the rod members constituting the floor frame are thickened, the floor frame is accordingly thickened. When the floor frame is thickened, the floor surface of the cabin space is heightened. When the floor surface of the cabin space is heightened, it becomes difficult to get in and out from the communication seat-type vehicle.

The communication seat-type vehicle needs to have a large cabin space in which communication seats are provided and a wide doorway through which passengers easily get in and out from the vehicle. For this reason, the driving source, the steering mechanism, etc., which are heavy loads, are provided in front of or behind the cabin space in the vehicle front-rear direction. The cabin space is provided inside the vehicle body frame. The vehicle body frame is therefore required to secure the rigidity of a front portion and a rear portion in the vehicle front-rear direction of the vehicle body frame partially supporting at least one of the driving source or the steering mechanism, which is a heavy load provided in front of or behind the cabin space in the vehicle front-rear direction.

Under this circumstance, the inventors of the subject application have found the shape of the vehicle body frame of the communication seat-type vehicle, with which the rigidity is secured and passengers can easily get in and out from the vehicle. The inventors of the subject application have found that, in a vehicle body frame constituted by twelve frames which are front, rear, left, right, upper, and lower frames, an H-shaped frame is formed at least at a front portion or a rear portion in the vehicle front-rear direction of the vehicle body frame by providing, at the front portion or the rear portion in the vehicle front-rear direction, a transverse frame which connects the left and right frames which are provided at a left portion and a right portion in the vehicle left-right direction, respectively. Furthermore, the inventors of the subject application have found to arrange at least one of the front portion or the rear portion of the vehicle body frame to have an inverted trapezoidal shape when viewed in the vehicle left-right direction. In the inverted trapezoidal shape, the upper side is longer than the lower side of the trapezoid. In the vehicle body frame in which at least one of the front portion or the rear portion has an inverted trapezoidal shape when viewed in the vehicle left-right direction, an upper portion of the H-shaped frame on the front portion is provided forward of a lower portion, or an upper portion of the H-shaped frame on the rear portion is provided forward of a lower portion.

As the at least one of the front portion or the rear portion in the vehicle front-rear direction of the vehicle body frame has the H-shaped frame, it is possible to secure the rigidity of at least one of the front portion or the rear portion in the vehicle front-rear direction of the vehicle body frame which supports the driving source or the steering mechanism provided in front of or behind the cabin space in the vehicle front-rear direction. Furthermore, as at least one of the front portion or the rear portion of the vehicle body frame has the inverted trapezoidal shape when viewed in the vehicle left-right direction, a floor frame constituted by lower four frames can be shortened in the vehicle front-rear direction, and a ceiling frame constituted by upper four frames can be shortened in the vehicle front-rear direction. Because the floor frame is shortened in the front-rear direction, the required rigidity is secured even when the rod members constituting the floor frame are thin. Because each of the rod members constituting the floor frame is thin, the floor surface of the communication seat-type vehicle is low in height. Therefore, easiness of getting in and out from the communication seat-type vehicle is improved. In this way, it has been found that the rigidity of the vehicle body frame is secured and the easiness of getting in and out is improved in the communication seat-type vehicle, by causing at least the front portion or the rear portion in the vehicle front-rear direction of the vehicle body frame to have the H-shaped frame and arranging at least one of the front portion or the rear portion of the vehicle body frame to have the inverted trapezoidal shape when viewed in the vehicle left-right direction.

(1) A communication seat-type vehicle of the present teaching is able to run forward in the vehicle front-rear direction as a traveling direction, the vehicle comprising: communication seats which are provided in a vehicle internal portion and allow passengers to be seated at locations where the passengers are able to talk face-to-face with one another; four wheels including two front wheels and two rear wheels which are rearward of the two front wheels in the vehicle front-rear direction; a driving source configured to apply driving force to at least one of the four wheels; a steering mechanism which is configured to steer at least one of the four wheels; and a vehicle body frame which is at least partially provided between front ends of the two front wheels and rear ends of the two rear wheels in the vehicle front-rear direction, a cabin space in the vehicle internal portion being provided in the vehicle body frame to accommodate the passengers, the vehicle body frame having a front H-shaped frame structure including: (A) a ceiling frame including (a-1) two ceiling transverse frames which are lined up in the vehicle front-rear direction and are each along a vehicle left-right direction, (a-2) a ceiling right frame connecting right portions of the two ceiling transverse frames with each other, and (a-3) a ceiling left frame which connects left portions of the two ceiling transverse frame with each other; (B) a floor frame provided directly below the ceiling frame and including (b-1) two floor transverse frames which are lined up in the vehicle front-rear direction and are each along the vehicle left-right direction, (b-2) a floor right frame connecting right portions of the two floor transverse frames with each other, and (b-3) a floor left frame which connects left portions of the two floor transverse frame with each other; (C1) a front H-shaped frame including (c-1) two front pillars which are positioned forward of an entrance through which the passengers get in and out from the cabin space, are lined up in the vehicle left-right direction, are each along a vehicle up-down direction, each of which has an upper portion connected to a front portion of the ceiling frame, and each of which has a lower portion connected to a front portion of the floor frame and (c-2) a front intermediate transverse frame which connects the two front pillars each of which is arranged so that an upper portion is located forward of a lower portion, the front intermediate transverse frame supporting part of at least one of the driving source or the steering mechanism, which is provided in front of the front intermediate transverse frame; and (D1) (d-1) a rear frame including two rear pillars which are positioned rearward of the entrance, are lined up in the vehicle left-right direction, are each along the vehicle up-down direction, each of which has an upper portion connected to a rear portion of the ceiling frame, and each of which has a lower portion connected to a rear portion of the floor frame.

According to this arrangement, the communication seat-type vehicle includes the communication seats, the four wheels, the driving source, the steering mechanism, and the vehicle body frame. The communication seats are provided in the vehicle internal portion. The communication seats are arranged to allow passengers to be seated at locations where the passengers are able to talk face-to-face with one another. The communication seats are seats arranged so that plural passengers are seatable on the seats. On the communication seats, one passenger or plural passengers may be seated. The communication seats may be switchable between a state in which seated passengers face one another and a state in which the seated passengers face in the same direction. In this connection, the communication seats are not fixed in a state in which the seated passengers face only in the same direction. The four wheels include two front wheels and two rear wheels. The two rear wheels are provided rearward of the two front wheels in the vehicle front-rear direction. The driving source applies driving force to at least one of the four wheels. The steering mechanism steers at least one of the four wheels. The vehicle body frame is at least partially provided between front ends of two front wheels and rear ends of two rear wheels in the vehicle front-rear direction. The vehicle body frame is provided in the vehicle internal portion. The vehicle body frame has the cabin space therein. The cabin space is a space provided in the vehicle internal portion and is a space where passengers are accommodated. The communication seat-type vehicle is able to run forward in the vehicle front-rear direction, as a traveling direction. The traveling direction is a direction in which the communication seat-type vehicle in normal use runs due to the rotation of wheels. The traveling direction does not include a direction in which the communication seat-type vehicle runs due to temporary reverse rotation of the wheels. When the communication seat-type vehicle is a bi-directional vehicle, the traveling direction can be changed to rearward in the vehicle front-rear direction by the reverse rotation of the wheels.

The vehicle body frame has the front H-shaped frame structure. The front H-shaped frame structure includes (A) the ceiling frame, (B) the floor frame, (C1) the front H-shaped frame, and (D1) the rear frame. (A) The ceiling frame includes (a-1) the two ceiling transverse frames, (a-2) the ceiling right frame, and (a-3) the ceiling left frame. The two ceiling transverse frames are lined up in the vehicle front-rear direction and are each provided along the vehicle left-right direction. The ceiling right frame connects right portions of the two ceiling transverse frames. The ceiling left frame connects left portions of the two ceiling transverse frames. (B) The floor frame includes (b-1) the two floor transverse frames, (b-2) the floor right frame, and (b-3) the floor left frame. The floor frame is provided directly below the ceiling frame. The two floor transverse frames are lined up in the vehicle front-rear direction and are each provided along the vehicle left-right direction. The floor right frame connects right portions of the two floor transverse frames. The floor left frame connects left portions of the two floor transverse frames. (C1) The front H-shaped frame includes (c-1) the two front pillars and (c-2) the front intermediate transverse frame. The two front pillars are provided forward of the doorway and are lined up in the vehicle left-right direction. Each of the two front pillars is provided along the vehicle up-down direction. The two front pillars have upper portions which are connected to a front portion of the ceiling frame, and lower portions which are connected to a front portion of the floor frame. The front intermediate transverse frame connects the two front pillars in each of which the upper portion is provided forward of the lower portion. The front intermediate transverse frame supports a part of at least one of the driving source or the steering mechanism, which is a heavy load provided forward of the front intermediate transverse frame. (D1) The rear H-shaped frame includes (d-1) the two rear pillars. The two rear pillars are provided rearward of the doorway and are lined up in the vehicle left-right direction. Each of the two rear pillar is provided along the vehicle up-down direction. The two rear pillars have upper portions which are connected to a rear portion of the ceiling frame, and lower portions which are connected to a rear portion of the floor frame.

The vehicle body frame having the front H-shaped frame structure includes the front H-shaped frame which includes the front intermediate transverse frame. This allows the front intermediate transverse frame to support the part of at least one of the driving source or the steering mechanism, which is a heavy load provided in front of the vehicle body frame in the vehicle front-rear direction. In other words, the front H-shaped frame makes it possible to secure the rigidity of the front portion in the vehicle front-rear direction of the vehicle body frame. Furthermore, the upper portion in the vehicle up-down direction of the front H-shaped frame is provided forward of the lower portion. As the vehicle body frame is provided in this way, the floor frame is shortened in the vehicle front-rear direction and the ceiling frame is elongated in the vehicle front-rear direction. Because the floor frame is shortened in the front-rear direction, the required rigidity of the vehicle body frame is secured even when rod members constituting the floor frame are thin. When each of the rod members constituting the floor frame is thin, the floor surface supported by the floor frame can be lowered in height. This allows passengers to easily get in or out from the communication seat-type vehicle, even when the passengers are on wheelchairs or are elderly people.

Because of the above, the communication seat-type vehicle of the present teaching is able to improve easiness of getting in and out, while securing the rigidity of the vehicle body frame.

(2) According to an aspect of the present teaching, the communication seat-type vehicle of the present teaching preferably includes the following arrangement, in addition to the arrangement (1). The vehicle body frame includes: the front H-shaped frame structure; a rear H-shaped frame structure including (A) the ceiling frame, (B) the floor frame, (C2) (c-1) a front frame including the two front pillars, and (D2) a rear H-shaped frame including (d-1) the two rear pillars and (d-2) a rear intermediate transverse frame which connects the two rear pillars in each of which an upper portion is located rearward of a lower portion, the rear intermediate transverse frame supporting part of at least one of the driving source or the steering mechanism, which is provided behind the rear intermediate transverse frame; or a front-rear H-shaped frame structure including (A) the ceiling frame, (B) the floor frame, (C1) the front H-shaped frame, and (D2) the rear H-shaped frame.

According to this arrangement, the vehicle body frame includes the front H-shaped frame structure, the rear H-shaped frame, or the front-rear H-shaped frame structure.

The rear H-shaped frame includes (A) the ceiling frame, (B) the floor frame, (C2) the front frame, and (D2) the rear H-shaped frame. The front-rear H-shaped frame structure includes (A) the ceiling frame, (B) the floor frame, (C1) the front H-shaped frame, and (D2) the rear H-shaped frame. (C2) The front frame includes (c-1) the two front pillars. (D2) The rear H-shaped frame includes (d-1) the two front pillars and (d-2) the rear intermediate transverse frame. (d-2) The rear intermediate transverse frame connects the two rear pillars in each of which the upper portion is provided rearward of the lower portion. The rear intermediate transverse frame supports a part of at least one of the driving source or the steering mechanism, which is provided behind the rear intermediate transverse frame.

The vehicle body frame having the rear H-shaped frame structure includes the rear H-shaped frame which includes the rear intermediate transverse frame. This allows the rear intermediate transverse frame to support the part of at least one of the driving source or the steering mechanism, which is a heavy load provided behind the vehicle body frame in the vehicle front-rear direction. In other words, the rear H-shaped frame makes it possible to secure the rigidity of the rear portion in the vehicle front-rear direction of the vehicle body frame. Furthermore, the upper portion in the vehicle up-down direction of the rear H-shaped frame is provided rearward of the lower portion. As the vehicle body frame is provided in this way, the floor frame is shortened in the vehicle front-rear direction and the ceiling frame is elongated in the vehicle front-rear direction. Because the floor frame is shortened in the front-rear direction, the required rigidity of the vehicle body frame is secured even when rod members constituting the floor frame are thin. When each of the rod members constituting the floor frame is thin, the floor surface supported by the floor frame can be lowered in height. This allows passengers to easily get in or out from the communication seat-type vehicle, even when the passengers are on wheelchairs or are elderly people.

The vehicle body frame having the front-rear H-shaped frame structure includes the front H-shaped frame including the front intermediate transverse frame and the rear H-shaped frame including the rear intermediate transverse frame. This allows the front intermediate transverse frame and the rear intermediate transverse frame to support a part of at least one of the driving source or the steering mechanism, which are heavy loads provided in front of and behind the vehicle body frame in the vehicle front-rear direction. In other words, the front H-shaped frame and the rear H-shaped frame make it possible to secure the rigidity of the front portion and the rear portion in the vehicle front-rear direction of the vehicle body frame. Furthermore, the upper portion in the vehicle up-down direction of the front H-shaped frame is provided forward of the lower portion. The upper portion in the vehicle up-down direction of the rear H-shaped frame is provided rearward of the lower portion. As the vehicle body frame is provided in this way, the floor frame is further shortened in the vehicle front-rear direction and the ceiling frame is further elongated in the vehicle front-rear direction. Because the floor frame is further shortened in the front-rear direction, the required rigidity of the vehicle body frame is further secured even when the rod members constituting the floor frame are thin. When each of the rod members constituting the floor frame is thin, the floor surface supported by the floor frame can be lowered in height. This allows passengers to easily get in or out from the communication seat-type vehicle, even when the passengers are on wheelchairs or are elderly people.

Because of the above, the communication seat-type vehicle of the present teaching is able to further improve easiness of getting in and out, while further securing the rigidity of the vehicle body frame.

(3) According to an aspect of the present teaching, the communication seat-type vehicle of the present teaching preferably includes the following arrangement, in addition to the arrangement (1) or (2). The communication seats include at least two of: a rear seat assembly on which a seated passenger faces in a vehicle forward direction; a front seat assembly on which a seated passenger faces in a vehicle rearward direction; a right seat assembly on which a seated passenger faces in a vehicle leftward direction; and a left seat assembly on which a seated passenger faces in a vehicle rightward direction.

According to this arrangement, the communication seats do not include a seat assembly which is fixed in a state in which the seated passengers face only in the same direction. The communication seats are therefore arranged to allow passengers to be seated at locations where the passengers are able to talk face-to-face with one another.

(4) According to an aspect of the present teaching, the communication seat-type vehicle of the present teaching preferably includes the following arrangement, in addition to any one of the arrangements (1) to (3).

The maximum number of the passengers seated on the communication seats is six or less.

With this arrangement, while the easiness of getting in and out from the vehicle is improved, the passengers in the communication seat-type vehicle can be seated on the communication seats so that the passengers are able to talk face-to-face with one another.

(5) According to an aspect of the present teaching, the communication seat-type vehicle of the present teaching preferably includes the following arrangement, in addition to any one of the arrangements (1) to (4).

The communication seat-type vehicle further includes a vehicle body cover which at least partially covers an upper portion of the vehicle body frame.

With this arrangement, the upper portion of the vehicle body frame is at least partially covered with the vehicle body cover, and hence entrance of rain, wind, etc. into the cabin space is prevented. This allows passengers to easily get in and off from the communication seat-type vehicle. This arrangement makes it possible to improve easiness of getting in and out from the vehicle, while securing the rigidity of the vehicle body frame.

(6) According to an aspect of the present teaching, the communication seat-type vehicle of the present teaching preferably includes the following arrangement, in addition to any one of the arrangements (1) to (5).

The communication seat-type vehicle further includes a vehicle body cover which at least partially covers the vehicle body frame and provides the doorway at a right portion, a left portion, or both of the right portion and the left portion in the vehicle left-right direction of the vehicle body cover.

According to this arrangement, the communication seat-type vehicle further includes the vehicle body cover which at least partially covers the vehicle body frame. The vehicle body cover provides the doorway at a left portion, a right portion, or both of these portions of the vehicle body cover in the vehicle left-right direction. In the communication seat-type vehicle of the present teaching, because the length in the vehicle front-rear direction of the ceiling frame is arranged to be longer than the length in the vehicle front-rear direction of the floor frame, the degree of freedom in determining the width of the upper portion of the doorway which is formed at one or both of the left portion and the right portion in the vehicle left-right direction is high, as compared to a vehicle in which the length in the front-rear direction of the ceiling frame is identical with the length in the front-rear direction of the floor frame. It is therefore possible to arrange the doorway to have width with which a wheelchair, etc. is able to easily get in and out from the vehicle. This arrangement makes it possible to improve easiness of getting in and out from the vehicle, while securing the rigidity of the vehicle body frame.

(7) According to an aspect of the present teaching, the communication seat-type vehicle of the present teaching preferably includes the following arrangement, in addition to the arrangement (6).

The communication seat-type vehicle further includes a door which is configured to be able to open and close the doorway.

According to this arrangement, the communication seat-type vehicle has the door by which the doorway can be opened and closed. Because in the communication seat-type vehicle of the present teaching the ceiling frame is long in the vehicle front-rear direction, the width of the doorway can be arranged to have width with which passengers can easily get in and out from the vehicle, even when the door is provided to be able to open and close the doorway. This arrangement makes it possible to improve easiness of getting in and out from the vehicle, while securing the rigidity of the vehicle body frame.

(8) According to an aspect of the present teaching, the communication seat-type vehicle of the present teaching preferably includes the following arrangement, in addition to the arrangement (7). The door is a sliding door which is slidable along the vehicle outer surface in the vehicle front-rear direction.

According to this arrangement, the door is a sliding door. The sliding door is slidable along the vehicle outer surface in the vehicle front-rear direction. With this arrangement, the sliding door is less likely to obstruct passengers inside and outside the cabin space after the sliding door is opened. This allows passengers to easily get in and off from the communication seat-type vehicle.

(9) According to an aspect of the present teaching, the communication seat-type vehicle of the present teaching preferably includes the following arrangement, in addition to any one of the arrangements (6) to (8).

The communication seat-type vehicle further includes a slope member which is provided to be able to obliquely extend from the doorway to the ground.

According to this arrangement, the communication seat-type vehicle includes the slope member. The slope member can be provided to obliquely extend from the doorway to the ground. The slope member is provided to connect the doorway with the ground. The slope member is provided to be oblique. Because the slope member resolves a level difference between the doorway and the ground, a passenger, a cart, a wheelchair, etc. are able to easily get in or out from the vehicle.

The width of the slope member is preferably identical with or shorter than the width of the doorway. The width of the slope member is preferably identical with the width of the doorway. This is because, when the slope member is wide, a passenger, a cart, a wheelchair, etc. can smoothly get in or out from the vehicle.

Preferably, a protrusion is formed at each end portion in the width direction of the slope member. In particular, each end portion of the slope member is preferably L-shaped. This is because a, a cart, a wheelchair, etc. can be guided when getting in or getting out from the vehicle.

Projections are preferably formed on the upper surface of the slope member for the purpose of preventing slippage. This allows a passenger, a cart, a wheelchair, etc. to smoothly get in or out from the vehicle.

(10) According to an aspect of the present teaching, the communication seat-type vehicle of the present teaching preferably includes the following arrangement, in addition to any one of the arrangements (1) to (6).

The traveling direction is changeable to rearward in the vehicle front-rear direction.

According to this arrangement, the traveling direction of the communication seat-type vehicle can be switched to rearward in the vehicle front-rear direction. To put it differently, the communication seat-type vehicle may be a bi-directional vehicle which is able to change the traveling direction by rotating the wheels in reverse.

(11) According to an aspect of the present teaching, the communication seat-type vehicle of the present teaching preferably includes the following arrangement, in addition to any one of the arrangements (1) to (10).

The communication seats include a seat portion on which a passenger is seated, and a seat which is formed to be able to constitute the seat portion is provided in the vehicle internal portion of the communication seat-type vehicle.

According to this arrangement, the communication seats include a seat portion on which a passenger is seated. The seat is formed to be able to constitute the seat portion in the vehicle internal portion in which the passengers are accommodated. The seat is, for example, fixed to always constitute the seat portion. Alternatively, the seat is, for example, swingable between the seating state in which the seat portion is formed and the storage state (non-seating state) in which the seat portion is not formed. To be more specific, for example, the seat is arranged to be swingable relative to the back-rest constituting the back-rest portion or a wall surface in the vehicle internal portion. When the seat is in the storage state, the seat is positioned to face the back-rest or the wall surface in the vehicle internal portion. Alternatively, the seat is detachable and switchable from the seating state in which the seat portion is formed to the detached state in which the seat portion is not formed. In this way, if the seat does not constitute the seat portion when a passenger gets in or out from the cabin space, a space in the cabin space, where the seat portion is formed, can be used for passengers getting in and out from the vehicle.

The easiness of getting in and out from the vehicle is therefore further improved.

(12) According to an aspect of the present teaching, the communication seat-type vehicle of the present teaching preferably includes the following arrangement, in addition to any one of the arrangements (1) to (11).

The communication seat-type vehicle further includes, in the vehicle internal portion, at least one of: a front luggage deck constituting a front storage space which is at least partially provided forward of a front end of the communication seats; or a rear luggage deck constituting a rear storage space which is provided at least partially rearward of a rear end of the communication seats.

According to this arrangement, the communication seat-type vehicle further includes at least one of the front luggage deck constituting the front storage space or the rear luggage deck constituting the rear storage space. The front storage space is at least partially provided in the vehicle internal portion and positioned forward of the front end of the communication seats. The rear storage space is at least partially provided in the vehicle internal portion and positioned rearward of the rear end of the communication seats. The front storage space or the rear storage space is able to store a luggage of a passenger, etc. As compared to a case where a luggage, etc. of a passenger is placed in the cabin space, a space which can be used by passengers getting in or out is large in the cabin space. The easiness of getting in and out from the vehicle is therefore further improved.

(13) According to an aspect of the present teaching, the communication seat-type vehicle of the present teaching preferably includes the following arrangement, in addition to the arrangement (12). The communication seats include a back-rest portion by which a passenger keeps posture, a back-rest is provided in the vehicle internal portion to be able to constitute the back-rest portion, and the back-rest is arranged to be able to open and close at least one of the front storage space or the rear storage space.

According to this arrangement, the communication seats include the back-rest portion which is used by a passenger to keep the posture. The communication seat-type vehicle includes the back-rest in the vehicle internal portion, which is formed to be able to constitute the back-rest portion. To be more specific, the back-rest is arranged to be swingable relative to the seat which constitutes the seat portion. For example, the back-rest is swingable between a posture keeping state in which the back-rest portion is formed and a storage state (non-posture keeping state) in which the back-rest portion is not formed. Alternatively, for example, the back-rest is detachable and switchable between a posture keeping state in which the back-rest portion is formed and a detached state in which the back-rest portion is not formed. When the back-rest is in the posture keeping state, the passenger is able to lean on the back-rest portion. When the back-rest is in the storage state, the passenger is not able to lean on the back-rest portion. The back-rest is arranged to open and close the front storage space or the rear storage space. For example, the back-rest is formed to be swingable between a closed state in which the front storage space or the rear storage space is closed and an open state in which the front storage space or the rear storage space is open. When the front storage space or the rear storage space is in the open state, the back-rest portion is not formed. When the front storage space or the rear storage space is in the closed state, the back-rest portion is formed. When the front storage space or the rear storage space is in the open state, a passenger is allowed to utilize the front storage space or the rear storage space and store a luggage, etc. in the storage space. As compared to a case where a luggage, etc. of a passenger is placed in the cabin space, a space which can be used by passengers getting in or out is large in the cabin space. The easiness of getting in and out from the vehicle is therefore further improved.

(14) According to an aspect of the present teaching, the communication seat-type vehicle of the present teaching preferably includes the following arrangement, in addition to any one of the arrangements (1) to (13).

The floor frame further includes: at least one of a floor intermediate frame which is provided between the two floor transverse frames to extend along the vehicle left-right direction; or a floor intermediate frame which is provided between the floor right frame and the floor left frame to extend along the vehicle front-rear direction.

According to this arrangement, the floor frame further includes at least one of: the floor intermediate frame which is provided between the two floor transverse frames to extend along the vehicle left-right direction; or the floor intermediate frame which is provided between the floor right frame and the floor left frame to extend along the vehicle front-rear direction. Because the floor frame includes the floor intermediate frame, the rigidity of the floor frame is improved. It is therefore possible to further increase the rigidity of the vehicle body frame.

(15) According to an aspect of the present teaching, the communication seat-type vehicle of the present teaching preferably includes the following arrangement, in addition to any one of the arrangements (1) to (14).

The communication seat-type vehicle further includes an automatic driving controller which is configured to automatically control the driving source and the steering mechanism.

According to this arrangement, the driving source and the steering mechanism are automatically controlled by the automatic driving controller. The communication seat-type vehicle is able to automatically run. It is therefore unnecessary to provide components such as a steering wheel and a pedal in the cabin space. Because the space which can be used by passengers when getting in and out from the vehicle is large in the cabin space as compared to a vehicle having a steering wheel, a pedal, etc., easiness of getting in and out from the vehicle is further improved.

(16) According to an aspect of the present teaching, the communication seat-type vehicle of the present teaching preferably includes the following arrangement, in addition to any one of the arrangements (1) to (12), (14), and (15).

The communication seats include a back-rest portion by which a passenger keeps posture, and the communication seat-type vehicle includes a back-rest which is formed to be able to constitute the back-rest portion in the vehicle internal portion.

According to this arrangement, the communication seats include the back-rest portion which is used by a passenger to keep the posture. The communication seat-type vehicle includes the back-rest in the vehicle internal portion, which is formed to be able to constitute the back-rest portion. The back-rest is, for example, fixed and always constitutes the back-rest portion. For example, the back-rest may be swingable between a posture keeping state in which the back-rest portion is formed and a storage state in which the back-rest portion is not formed. To be more specific, for example, the back-rest is arranged to be swingable relative to the seat which constitutes the seat portion. The back-rest in the storage state is positioned to face the seat. Alternatively, for example, the back-rest may be detachable and switchable from the posture keeping state in which the back-rest portion is formed to the detached state in which the back-rest portion is not formed. When the back-rest constitutes the back-rest portion, the back of each passenger is supported when seated on the communication seats, with the result that each passenger is able to keep posture.

(17) According to an aspect of the present teaching, the communication seat-type vehicle of the present teaching preferably includes the following arrangement, in addition to any one of the arrangements (1) to (16).

The communication seat-type vehicle further includes at least one window which makes it possible to visually recognize an external space outside the vehicle from the cabin space which is in the vehicle internal portion and accommodates the passengers.

According to this arrangement, the communication seat-type vehicle includes the window. Because the window makes it possible to visually recognize the external space outside the vehicle from the cabin space which is in the vehicle internal portion, the passengers are able to check the external space. Because the passengers can easily check the surrounding environment of the communication seat-type vehicle, the easiness of getting in and out from the vehicle is further improved.

(18) According to an aspect of the present teaching, the communication seat-type vehicle of the present teaching preferably includes the following arrangement, in addition to any one of the arrangements (1) to (17).

The communication seat-type vehicle further includes a visor which is provided on the vehicle outer surface and directly above the window in the vehicle up-down direction or is provided at an upper edge of the window.

According to this arrangement, the communication seat-type vehicle includes the visor. The visor is provided on the vehicle outer surface and directly above the window in the vehicle up-down direction or is provided at the upper edge of the window. Because the visor prevents the entrance of rain or sunlight through the window, the passengers can easily get in or off from the vehicle. The easiness of getting in and out from the vehicle is therefore further improved.

(19) According to an aspect of the present teaching, the communication seat-type vehicle of the present teaching preferably includes the following arrangement, in addition to any one of the arrangements (1) to (18).

In the vehicle body frame, the shape of the front portion viewed rearward in the vehicle front-rear direction is identical with the shape of the rear portion viewed forward in the vehicle front-rear direction, or the vehicle body frame is plane-symmetrical in shape with respect to a plane which passes between the front end and the rear end in the vehicle front-rear direction of the vehicle body frame and is orthogonal to the vehicle front-rear direction.

According to this arrangement, in the vehicle body frame, the shape of the front portion viewed rearward in the vehicle front-rear direction is identical with the shape of the rear portion viewed forward in the vehicle front-rear direction. Alternatively, the vehicle body frame is shaped to be plane symmetrical with respect to the plane which passes between the front end and the rear end of the vehicle body frame in the vehicle front-rear direction and is perpendicular to the vehicle front-rear direction. This arrangement makes it possible to improve easiness of getting in and out from the vehicle while securing the rigidity of the vehicle body frame, even after the traveling direction is changed to rearward in the vehicle front-rear direction.

<Definition of Communication Seats>

In the present teaching, communication seats are arranged to allow passengers to be seated at locations where the passengers are able to talk face-to-face with one another. The communication seats are seats on which plural passengers are seatable. The communication seats include, for example, two rows of seat assemblies which are provided to allow the passengers to be seated face to face. The communication seats include, for example, a seat assembly provided in L shape. The communication seats include, for example, a seat assembly provided to form a U-shape. The communication seats include, for example, a seat assembly provided to form a quadrangle. On the communication seats, one passenger or plural passengers may be seated. On the communication seats, the seated passengers may or may not talk each other face to face. The communication seats may include a seat assembly which is switchable between a state in which seated passengers face one another and a state in which the seated passengers face the same direction. In this connection, the communication seats do not include a seat assembly which is fixed in a state in which the seated passengers face only the same direction. To allow the seated passengers to talk each other face to face, the maximum number of passengers seated on the communication seats is preferably six or less. In regard to the maximum number of passengers seated, each passenger is an adult of average height. The communication seat-type vehicle may be individually owned or may be used publicly.

<Definition of Traveling Direction>

In the present teaching, the traveling direction of the communication seat-type vehicle is basically a forward direction in the vehicle front-rear direction. The traveling direction of the communication seat-type vehicle is a direction in which the communication seat-type vehicle in normal use runs due to the rotation of wheels. The traveling direction does not include a direction in which the communication seat-type vehicle runs due to temporary reverse rotation of the wheels. When the communication seat-type vehicle is a bi-directional vehicle, the traveling direction of the communication seat-type vehicle can be changed to a rearward direction in the vehicle front-rear direction, as the rotational direction of the wheels in normal use is changed to the reverse direction. The communication seat-type vehicle may run on a public road or a private road, or may run on a running path which is not a road.

<Definition of Upper Portion, Intermediate Portion, and Lower Portion of Communication Seat-Type Vehicle>

In the present teaching, an upper portion of the communication seat-type vehicle is the uppermost portion when the communication seat-type vehicle is equally divided into three portions in the vehicle up-down direction. An intermediate portion of the communication seat-type vehicle is the middle portion when the communication seat-type vehicle is equally divided into three portions in the vehicle up-down direction. A lower portion of the communication seat-type vehicle is the lowermost portion when the communication seat-type vehicle is equally divided into three portions in the vehicle up-down direction.

<Definition of Upper Portion, Lower Portion, Left Portion, Right Portion, Front Portion, and Rear Portion of Frame>

In the present teaching, an upper portion of the frame is the upper portion when the frame is equally divided into two portions in the vehicle up-down direction. A lower portion of the frame is the lower portion when the frame is equally divided into two portions in the vehicle up-down direction. A left portion of the frame is the left portion when the frame is equally divided into two portions in the vehicle left-right direction. A right portion of the frame is the right portion when the frame is equally divided into two portions in the vehicle left-right direction. A front portion of the frame is the front portion when the frame is equally divided into two portions in the vehicle front-rear direction. A rear portion of the frame is the rear portion when the frame is equally divided into two portions in the vehicle front-rear direction. The upper portion, the lower portion, the left portion, the right portion, the front portion, and the rear portion of the frame are identical in meaning with the upper portion, the lower portion, the left portion, the right portion, the front portion, and the rear portion of a pillar.

<Definition of Cabin Space>

In the present teaching, the cabin space is a space provided in a vehicle internal portion and is a space where passengers are accommodated. The cabin space is provided inside the vehicle body frame. The vehicle body frame is provided in a vehicle internal portion. The cabin space is, for example, constituted by a vehicle body cover, communication seats in the vehicle internal portion, windows, doors, etc. The vehicle body cover is, for example, included in outer walls outside the vehicle and inner walls in the vehicle internal portion. When the communication seat-type vehicle has windows, a space inside planes constituting the windows is the cabin space whereas a space outside the planes constituting the windows is the external space, no matter whether a glass is fitted in each window. Furthermore, no matter whether the communication seat-type vehicle has a door, a space inside a plane constituting the doorway is the cabin space whereas a space outside the plane constituting the doorway is the external space. The cabin space is preferably not high enough to allow an adult passenger with average height to stand erect, but high enough to allow an adult passenger with average height to be seated on a communication seat. This arrangement makes it possible to obtain the cabin space in the vehicle internal portion while the capacity of the communication seat-type vehicle is maintained to be small.

<Definition of Vehicle Front Portion, Vehicle Rear Portion, Vehicle Left Portion, and Vehicle Right Portion of Communication Seat-Type Vehicle>

In the present teaching, a vehicle front portion of the communication seat-type vehicle is the front portion when the vehicle is equally divided in two in the vehicle front-rear direction. A vehicle rear portion of the communication seat-type vehicle is the rear portion when the vehicle is equally divided in two in the vehicle front-rear direction. A vehicle left portion of the communication seat-type vehicle is the left portion when the vehicle is equally divided in two in the vehicle left-right direction. A vehicle right portion of the communication seat-type vehicle is the right portion when the vehicle is equally divided in two in the vehicle left-right direction.

<Definition of Wheels>

In the present teaching, a wheel includes a tire and a wheel main body that holds the tire. A front wheel is a wheel provided at the front portion of the vehicle in the vehicle front-rear direction. A rear wheel is a wheel provided at the rear portion of the vehicle in the vehicle front-rear direction.

<Definition of Door>

In the present teaching, a door is a member which moves to open or close the doorway, and does not encompass accessories of the door, such as a rail attached to the vehicle. The door of the present teaching may be a sliding door, hinged door, swing door, a glide slide door, etc. In the present teaching, the sliding door is provided at the left portion, the right portion, or both of these portions of the vehicle in the vehicle left-right direction, and is a door slidable in the vehicle front-rear direction along the outer surface of the vehicle.

<Definition of Driving Source>

In the present teaching, a driving source applies driving force to at least two of four wheels. The driving source is a motor, an engine, etc.

<Definition of Steering Mechanism>

In the present teaching, a steering mechanism is a mechanism for steering at least one of the four wheels. The steering mechanism is a mechanism for steering at least two of the four wheels by, for example, rotation of a steering wheel. The steering mechanism is a mechanism for steering at least two of the four wheels by, for example, an automatic driving controller. The steering mechanism may be a mechanism for steering two front wheels or two rear wheels. The steering mechanism may be a mechanism for steering two front wheels and two rear wheels.

<Definition of Shape of Vehicle Body Frame>

In the present teaching, when the shape of a front portion viewed rearward in the vehicle front-rear direction is identical with the shape of a rear portion viewed forward in the vehicle front-rear direction, it is indicated that the outer shape of the front portion of the vehicle body frame viewed rearward in the vehicle front-rear direction is identical with or substantially identical with the outer shape of the rear portion of the vehicle body frame viewed forward in the vehicle front-rear direction. In the present teaching, when the vehicle body frame is plane symmetrical with respect to a plane which passes between the front end and the rear end in the vehicle front-rear direction of the vehicle body frame and is orthogonal to the vehicle front-rear direction, it is indicated that the outer shape of the vehicle body frame is plane symmetrical or substantially plane symmetrical with respect to the plane which passes between the front end and the rear end of the vehicle body frame and is orthogonal to the vehicle front-rear direction.

<Other Definitions of Terms>

In the present teaching, an end portion of a member indicates a portion constituted by an end and its surroundings of the member.

In this specification, unless otherwise specified, an inclination angle of a linear line A with respect to a linear line B indicates a smaller one of the angles formed by the linear line A and the linear line B. This applies not only the linear lines but also directions.

In this specification, unless otherwise specified, an angle between a linear line A and a linear line B indicates a smaller one of the angles formed by the linear line A and the linear line B. This applies not only the linear lines but also directions.

In the present teaching and the specification, a linear line along the A direction is not limited to a linear line in parallel to the A direction. Unless otherwise specified, the linear line along the A direction includes a linear line which is inclined from the A direction at an angle which falls within the range from −45 degrees to 45 degrees. The same definition applies to other expressions using "along". The other expressions using "along" are, for example, "direction along the A direction", "plural B are lined up along the A direction", and "a single B is provided along the A direction". The direction A does not indicate any specific direction. The direction A may be the horizontal direction or the front-rear direction.

In the present teaching and the specification, an expression "entities A and B are lined up in an X direction" indicates the following state. Even when the entities A and B are viewed in any direction orthogonal to the X direction, a linear line or a curved line indicating the X direction passes through both the entities A and B. When the entirety of an entity A is lined up with an entity B in the X direction, the entirety of the entity A opposes the entity B in the X direction. In other words, the entirety of the entity A overlaps the entity B when viewed in the X direction. The term "entirety" may be replaced with a term "part".

In the present teaching and the specification, an expression "entities A and B are lined up in an X direction when viewed in a Y direction" indicates the following state. When the entities A and B are viewed in the Y direction, a linear line or a curved line indicating the X direction passes through both of the entities A and B. When the entities A and B are viewed in a W direction different from the Y direction, the entities A and B may not be lined up in the X direction. When the entirety of an entity A is lined up with an entity B in a X direction when viewed in a Y direction, the entirety of the entity A opposes the entity B in the X direction when viewed in the Y direction. The term "entirety" may be replaced with a term "part".

In these two definitions, the entities A and B may be in contact with each other. The entities A and B may not be in contact with each other. An entity C may be provided between the entities A and B.

In the present teaching and the specification, an expression "an entity A is provided forward of an entity B" indicates the following state, unless otherwise specified. The entity A is provided in front of a plane which passes through the front-most end of the entity B and is orthogonal to the front-rear direction. In this connection, the entities A and B may or may not be lined up in the front-rear direction. When the entity B is a plane or a linear line orthogonal to the front-rear direction, a plane passing the front-most end of the entity B is a plane passing the entity B. When the entity B is a linear line or a plane with an infinite length in the front-rear direction, the front-most end of the entity B is not specified. A linear line or a plane with an infinite length in the front-rear direction is not limited to a linear line or a plane parallel to the front-rear direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a plane with an infinite length in the front-rear direction, an expression "an entity A is provided forward of the entity B" indicates the following state. Among two spaces partitioned by the entity B, the entity A exists in the front one of the spaces.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a linear line with an infinite length in the front-rear direction when viewed in a X direction different from the front-rear direction, an expression "an entity A is provided forward of the entity B when viewed in the X direction" indicates the following state. Among two areas partitioned by the entity B, the entity A exists in the front one of the areas when viewed in the X direction. The entity B may be a plane in three dimensions, as long as the entity B is a linear line when viewed in the X direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" when viewed in a given direction, in the same condition with regard to the entity B and the viewing direction.

In the present teaching and the specification, an expression "an entity A is provided in front of an entity B" indicates the following state, unless otherwise specified. At least part of a rear surface of the entity A opposes at least part of a front surface of the entity B in the front-rear direction. Furthermore, the frontmost end of the entity B is rearward of the front-most end of the entity A and the rearmost end of the entity B is forward of the rear-most end of the entity A. The rear surface of the entity A is a surface which is viewable when the entity A is viewed from the rear side. The rear surface of the entity A may be a single continuous surface or may be formed of plural non-continuous surfaces. The definition of the front surface of the entity B is similar to this.

The same applies to expressions "an entity A is provided behind an entity B", "an entity A is provided directly above or below an entity B", and "an entity A is provided to the right of or to the left of an entity B".

In the present teaching and the specification, an expression "an entity A is provided in front of an entity B when viewed in an X direction different from the front-rear direction" indicates the following state, unless otherwise specified. When viewed in the X direction, at least part of the rear end of the entity A opposes at least part of the front end of the entity B in the front-rear direction. Furthermore, the frontmost end of the entity B is rearward of the front-most end of the entity A and the rearmost end of the entity B is forward of the rear-most end of the entity A. When the entities A and B are viewed in a Y direction different from the X direction, at least part of the rear end of the entity A may not oppose at least part of the front end of the entity B in the front-rear direction.

The same applies to expressions "an entity A is provided behind an entity B", "an entity A is provided directly above or below an entity B", and "an entity A is provided to the right of or to the left of an entity B" when viewed in a given direction.

In the present teaching and the specification, an expression "an entity A is provided between entities B and C" indicates the following state, unless otherwise specified. A linear line passes the entities B, A, and C in this order. In other words, the entities B, A, and C are lined up in this order in the direction of a linear line.

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs.

Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicate "may but not must". In this specification, an arrangement which is explained by using the term "may" exerts at least the above-described effects of the arrangement (1) above.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, the preferred arrangements of the different aspects described above may be variously combined. Before an embodiment of the present teaching is detailed, it is informed that the present teaching is not limited to the configurations and layout of elements described below and/or shown in drawings. The present teaching may be implemented as an embodiment other than the below-described embodiment. The present teaching may be implemented as an embodiment which is variously changed from the below-described embodiment. Furthermore, the present teaching may be implemented by suitably combining below-described modifications.

Advantageous Effects

The communication seat-type vehicle of the present teaching is able to improve easiness of getting in and out, while securing the rigidity of the vehicle body frame.

BRIEF DESCRIPTION OF DRAWINGS

FIG. 1A, FIG. 1B, and FIG. 1C schematically show a communication seat-type vehicle of Embodiment 1 of the present teaching. FIG. 1A is a side view, FIG. 1B is a front view, and FIG. 1C is a rear view.

FIG. 2A, FIG. 2B, and FIG. 2C schematically show a communication seat-type vehicle of Embodiment 2 of the present teaching. FIG. 2A is a side view, FIG. 2B is a front view, and FIG. 2C is a rear view.

FIG. 3A is a side view, FIG. 3B is a front view, and FIG. 3C is a rear view.

DESCRIPTION OF EMBODIMENTS

Figure 3A:
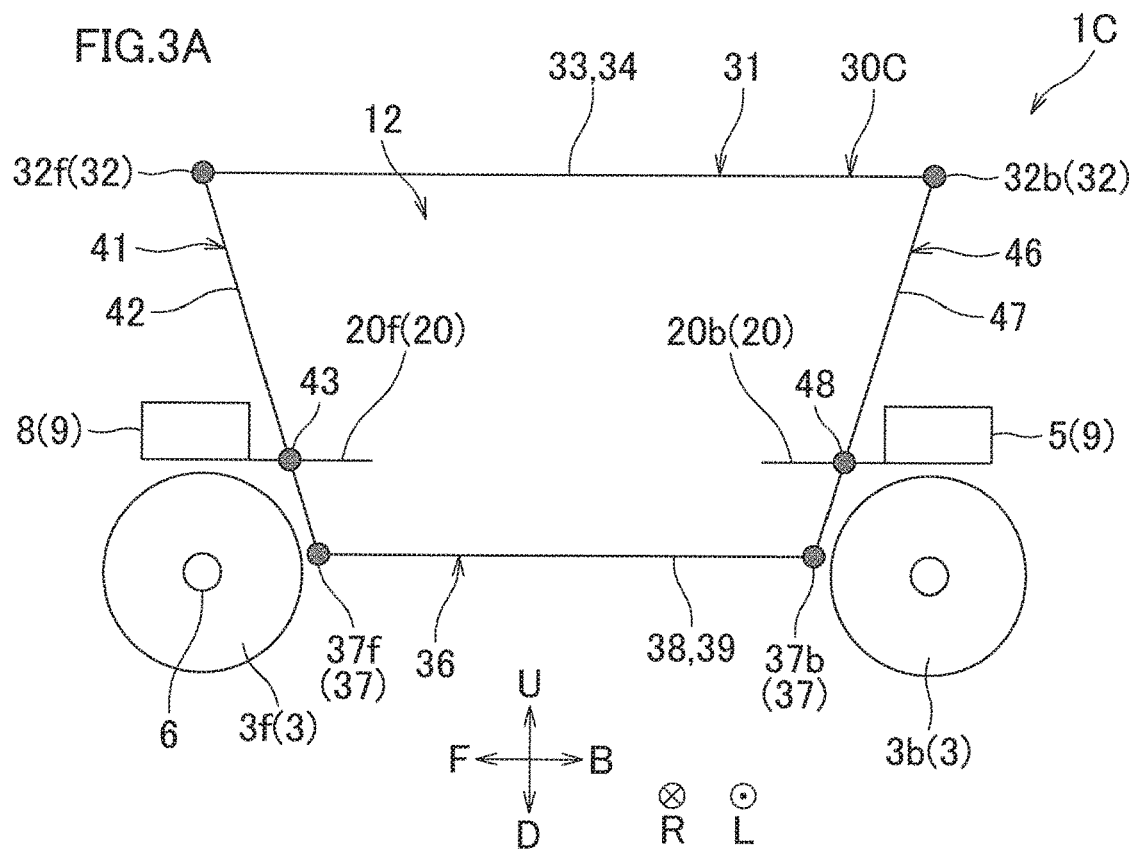
FIG. 3A, FIG. 3B, and FIG. 3C schematically show a communication seat-type vehicle of Embodiment 3 of the present teaching.
Figure 3B:
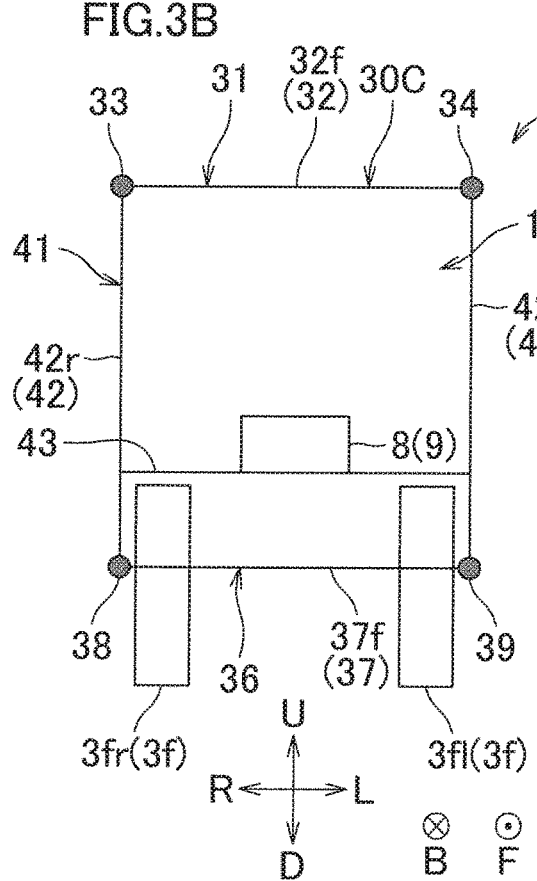
Figure 3C:
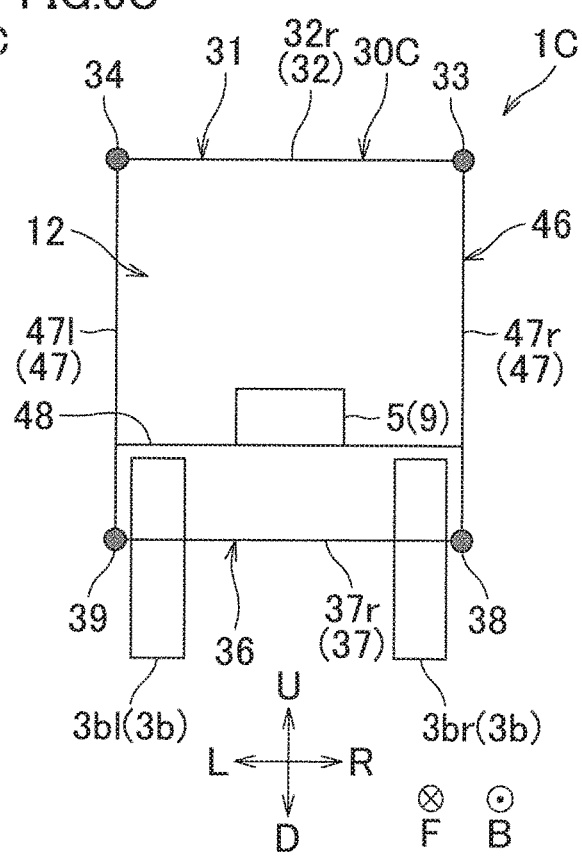

The following will describe an embodiment of the present teaching with reference to FIG. 1 to FIG. 3.

FIG. 1 shows a communication seat-type vehicle of Embodiment 1 of the present teaching. FIG. 2 shows a communication seat-type vehicle of Embodiment 2 of the present teaching. FIG. 3 shows a communication seat-type vehicle of Embodiment 3 of the present teaching. In the following description of the embodiments of the present teaching, a front-rear direction, a left-right direction, and an up-down direction are a vehicle front-rear direction, a vehicle left-right direction, and a vehicle up-down direction, respectively. Furthermore, in each figure, arrows F, B, U, D, L, and R indicate forward, rearward, upward, downward, leftward, and rightward, respectively.

Embodiment 1

The following will describe a communication seat-type vehicle 1A of Embodiment 1 with reference to FIG. 1. As shown in FIG. 1, the communication seat-type vehicle 1A of Embodiment 1 includes communication seats 20, four wheels 3, a driving source 5, a steering mechanism 6, and a vehicle body frame 30A.

The communication seats 20 are provided in a vehicle internal portion. The communication seats 20 are arranged to allow passengers to be seated at locations where the passengers are able to talk face-to-face with one another. For example, the communication seats 20 are constituted by two rows of seat assemblies 20f and 20b which are provided so that seated passengers face each other. The communication seats 20 include seat assemblies arranged so that plural passengers can be seated. On the communication seats 20, one passenger or plural passengers may be seated.

The four wheels 3 include two front wheels 3f and two rear wheels 3b. The two rear wheels 3b are provided rearward of the two front wheels 3f in the vehicle front-rear direction. The two front wheels 3f include a left front wheel 3fl which is at a vehicle left portion and a right front wheel 3fr which is at a vehicle right portion. The two rear wheels 3b include a left rear wheel 3bl which is at the vehicle left portion and a right rear wheel 3br which is at the vehicle right portion. The communication seat-type vehicle 1A is able to run forward in the vehicle front-rear direction, as a traveling direction. The traveling direction is a direction in which the communication seat-type vehicle 1A in normal use runs due to the rotation of wheels 3. The traveling direction does not include a direction in which the communication seat-type vehicle 1A runs due to temporary reverse rotation of the wheels 3. When the communication seat-type vehicle 1A is a bi-directional vehicle, the traveling direction can be changed to rearward in the vehicle front-rear direction by the reverse rotation of the wheels 3.

The driving source 5 applies driving force to at least one of the four wheels 3. The driving source 5 is a motor, an engine, etc. The communication seat-type vehicle 1 runs as the four wheels 3 rotate.

The steering mechanism 6 steers at least one of the four wheels 3. As a result of the steering by the steering mechanism 6, the traveling direction of the communication seat-type vehicle 1 is changed in the vehicle left-right direction.

The vehicle body frame 30A has a cabin space 12 therein. The cabin space 12 is a space provided in the vehicle internal portion and is a space where passengers are accommodated. The vehicle body frame 30A is at least partially provided between front ends of two front wheels 3f and rear ends of two rear wheels 3b in the vehicle front-rear direction. The vehicle body frame 30A has a front H-shaped frame structure, and includes a ceiling frame 31, a floor frame 36, a front H-shaped frame 41, and a rear frame 45.

The ceiling frame 31 includes two ceiling transverse frames 32, a ceiling right frame 33, and a ceiling left frame 34. The two ceiling transverse frames 32 are lined up in the vehicle front-rear direction and are each provided along the vehicle left-right direction. The two ceiling transverse frames 32 include a ceiling front frame 32f and a ceiling rear frame 32r. The ceiling front frame 32f is provided forward of the ceiling rear frame 32r in the vehicle front-rear direction. The ceiling right frame 33 connects right portions of the two ceiling transverse frames 32. The ceiling left frame 34 connects left portions of the two ceiling transverse frames 32.

The floor frame 36 includes two floor transverse frames 37, a floor right frame 38, and a floor left frame 39. The floor frame 36 is provided directly below the ceiling frame 31. The two floor transverse frames 37 are lined up in the vehicle front-rear direction and are each provided along the vehicle left-right direction. The two floor transverse frames 37 include a floor front frame 37f and a floor rear frame 37r. The floor front frame 37f is provided forward of the floor rear frame 37r in the vehicle front-rear direction. The floor right frame 38 connects right portions of the two floor transverse frames 37. The floor left frame 39 connects left portions of the two floor transverse frames 37.

The front H-shaped frame 41 includes two front pillars 42 and a front intermediate transverse frame 43. The two front pillars 42 are lined up in the vehicle left-right direction. Each of the two front pillars 42 is provided along the vehicle up-down direction. The two front pillars 42 include a left front pillar 42l and a right front pillar 42r. The left front pillar 42l is provided leftward of the right front pillar 42r in the vehicle left-right direction. The two front pillars 42 have upper portions which are connected to a front portion of the ceiling frame 31, and lower portions which are connected to a front portion of the floor frame 36. The front intermediate transverse frame 43 connects the two front pillars 42 in each of which the upper portion is provided forward of the lower portion. The front intermediate transverse frame 43 supports, for example, a part 9 of at least one of the driving source 5 or the steering mechanism 6, which is a heavy load provided forward of the front intermediate transverse frame 43.

The rear frame 45 includes two rear pillars 47. The two rear pillars 47 are provided rearward of a doorway 82 and are lined up in the vehicle left-right direction. Each of the two rear pillars 47 extends along the vehicle up-down direction. The two rear pillars 47 have upper portions which are connected to a rear portion of the ceiling frame 31, and lower portions which are connected to a rear portion of the floor frame 36.

The following effects are obtained because the communication seat-type vehicle 1A of Embodiment 1 has the arrangement described above.

The vehicle body frame 30A having the front H-shaped frame structure includes the front H-shaped frame 41 which includes the front intermediate transverse frame 43. This allows the front intermediate transverse frame 43 to support the part 9 of at least one of the driving source 5 or the steering mechanism 6, which is a heavy load provided in front of the vehicle body frame 30A in the vehicle front-rear direction. In other words, the front H-shaped frame 41 makes it possible to secure the rigidity of the front portion in the vehicle front-rear direction of the vehicle body frame 30A. Furthermore, the upper portion in the vehicle up-down direction of the front H-shaped frame 41 is provided forward of the lower portion. As the vehicle body frame 30A is provided in this way, the floor frame 36 is shortened in the vehicle front-rear direction and the ceiling frame 31 is elongated in the vehicle front-rear direction. Because the floor frame 36 is shortened in the front-rear direction, the required rigidity of the vehicle body frame 30A is secured even when the rod members constituting the floor frame 36 are thin. When each of the rod members constituting the floor frame 36 is thin, the floor surface supported by the floor frame 36 can be lowered in height. This allows passengers to easily get in or out from the communication seat-type vehicle 1A, even when the passengers are on wheelchairs or are elderly people.

Because of the above, the communication seat-type vehicle 1A of the present teaching is able to improve easiness of getting in and out, while securing the rigidity of the vehicle body frame 30A.

Embodiment 2

The following will describe a communication seat-type vehicle 1B of Embodiment 2 with reference to FIG. 2. It is noted that items identical with those in Embodiment 1 of the present teaching having been described above are not explained again. As shown in FIG. 2, the communication seat-type vehicle 1B of Embodiment 2 includes communication seats 20, four wheels 3, a driving source 5, a steering mechanism 6, and a vehicle body frame 30B.

The vehicle body frame 30B has a cabin space 12 therein. The cabin space 12 is a space provided in a vehicle internal portion and is a space where passengers are accommodated. The vehicle body frame 30B is at least partially provided between front ends of two front wheels 3f and rear ends of two rear wheels 3b in the vehicle front-rear direction. The vehicle body frame 30B has a rear H-shaped frame structure, and includes a ceiling frame 31, a floor frame 36, a front frame 40, and a rear H-shaped frame 46.

The front frame 40 includes two front pillars 42.

The rear H-shaped frame 46 includes two rear pillars 47 and a rear intermediate transverse frame 48. The rear intermediate transverse frame 48 connects the two rear pillars 47 in each of which the upper portion is provided rearward of the lower portion. The rear intermediate transverse frame 48 supports a part 9 of at least one of the driving source 5 or the steering mechanism 6, which is a heavy load provided behind the rear intermediate transverse frame 48.

The following effects are obtained because the communication seat-type vehicle 1B of Embodiment 2 has the arrangement described above.

The vehicle body frame 30B having the rear H-shaped frame structure includes the rear H-shaped frame 46 which includes the rear intermediate transverse frame 48. This allows the rear intermediate transverse frame 48 to support the part 9 of at least one of the driving source 5 or the steering mechanism 6, which is a heavy load provided behind the vehicle body frame 30B in the vehicle front-rear direction. In other words, the rear H-shaped frame 46 makes it possible to secure the rigidity of the rear portion in the vehicle front-rear direction of the vehicle body frame 30B. Furthermore, the upper portion in the vehicle up-down direction of the rear H-shaped frame 46 is provided rearward of the lower portion. As the vehicle body frame 30B is provided in this way, the floor frame 36 is shortened in the vehicle front-rear direction and the ceiling frame 31 is elongated in the vehicle front-rear direction. Because the floor frame 36 is shortened in the front-rear direction, the required rigidity of the vehicle body frame 30B is secured even when the rod members constituting the floor frame 36 are thin. When each of the rod members constituting the floor frame 36 is thin, the floor surface supported by the floor frame 36 can be lowered in height. This allows passengers to easily get in or out from the communication seat-type vehicle 1B, even when the passengers are on wheelchairs or are elderly people.

Because of the above, the communication seat-type vehicle 1B of the present teaching is able to improve easiness of getting in and out, while securing the rigidity of the vehicle body frame 30B.

Embodiment 3

The following will describe a communication seat-type vehicle 1C of Embodiment 3 with reference to FIG. 3. It is noted that items identical with those in Embodiment 1 and Embodiment 2 of the present teaching having been described above are not explained again. As shown in FIG. 3, the communication seat-type vehicle 1C of Embodiment 3 includes communication seats 20, four wheels 3, a driving source 5, a steering mechanism 6, and a vehicle body frame 30C.

The vehicle body frame 30C has a cabin space 12 therein. The cabin space 12 is a space provided in a vehicle internal portion and is a space where passengers are accommodated. The vehicle body frame 30C is at least partially provided between front ends of two front wheels 3f and rear ends of two rear wheels 3b in the vehicle front-rear direction. The vehicle body frame 30C has a front-rear H-shaped frame structure, and includes a ceiling frame 31, a floor frame 36, a front H-shaped frame 41, and a rear H-shaped frame 46.

The front H-shaped frame 41 includes two front pillars 42 and a front intermediate transverse frame 43. The rear H-shaped frame 46 includes two rear pillars 47 and a rear intermediate transverse frame 48.

The following effects are obtained because the communication seat-type vehicle 1C of Embodiment 3 has the arrangement described above.

The vehicle body frame 30C having the front-rear H-shaped frame structure includes the front H-shaped frame 41 including the front intermediate transverse frame 43 and the rear H-shaped frame 46 including the rear intermediate transverse frame 48. This allows the front intermediate transverse frame 43 and the rear intermediate transverse frame 48 to support a part 9 of at least one of the driving source 5 or the steering mechanism 6, which are heavy loads provided in front of and behind the vehicle body frame 30C in the vehicle front-rear direction. In other words, the front H-shaped frame 41 and the rear H-shaped frame 46 make it possible to secure the rigidity of the front portion and the rear portion in the vehicle front-rear direction of the vehicle body frame 30C. Furthermore, the upper portion in the vehicle up-down direction of the front H-shaped frame 41 is provided forward of the lower portion. The upper portion in the vehicle up-down direction of the rear H-shaped frame 46 is provided rearward of the lower portion. As the vehicle body frame 30C is provided in this way, the floor frame 36 is further shortened in the vehicle front-rear direction and the ceiling frame 31 is further elongated in the vehicle front-rear direction. Because the floor frame 36 is further shortened in the front-rear direction, the required rigidity of the vehicle body frame is further secured even when the rod members constituting the floor frame 36 are thin. When each of the rod members constituting the floor frame 36 is thin, the floor surface supported by the floor frame 36 can be lowered in height. This allows passengers to easily get in or out from the communication seat-type vehicle 1C, even when the passengers are on wheelchairs or are elderly people.

Because of the above, the communication seat-type vehicle 1C of the present teaching is able to further improve easiness of getting in and out, while further securing the rigidity of the vehicle body frame 30C.

(Specific Example 1 of Embodiment) Specific Example 1 of the above-described embodiments of the present teaching will be described with reference to FIG. 4 to FIG. 13. It is noted that items identical with those in the embodiments of the present teaching having been described above are not explained again. Basically, Specific Example 1 of the embodiments of the present teaching encompasses all features of Embodiment 3 of the present teaching described above.

Hereinafter, a front-rear direction is a vehicle front-rear direction unless otherwise specified. A vehicle forward direction is a traveling direction of a communication seat-type vehicle 101. Hereinafter, a left-right direction is a vehicle left-right direction. The vehicle left-right direction is a left-right direction when the traveling direction of the communication seat-type vehicle 101 is forward. The vehicle left-right direction is identical with a vehicle width direction of the communication seat-type vehicle 101. Hereinafter, an up-down direction is a vehicle up-down direction unless otherwise specified. The vehicle up-down direction is an up-down direction when the communication seat-type vehicle 101 vertically stands up on a horizontal road surface. In each figure, arrows F, B, U, D, L, and R indicate forward, rearward, upward, downward, leftward, and rightward, respectively.

Figure 4:
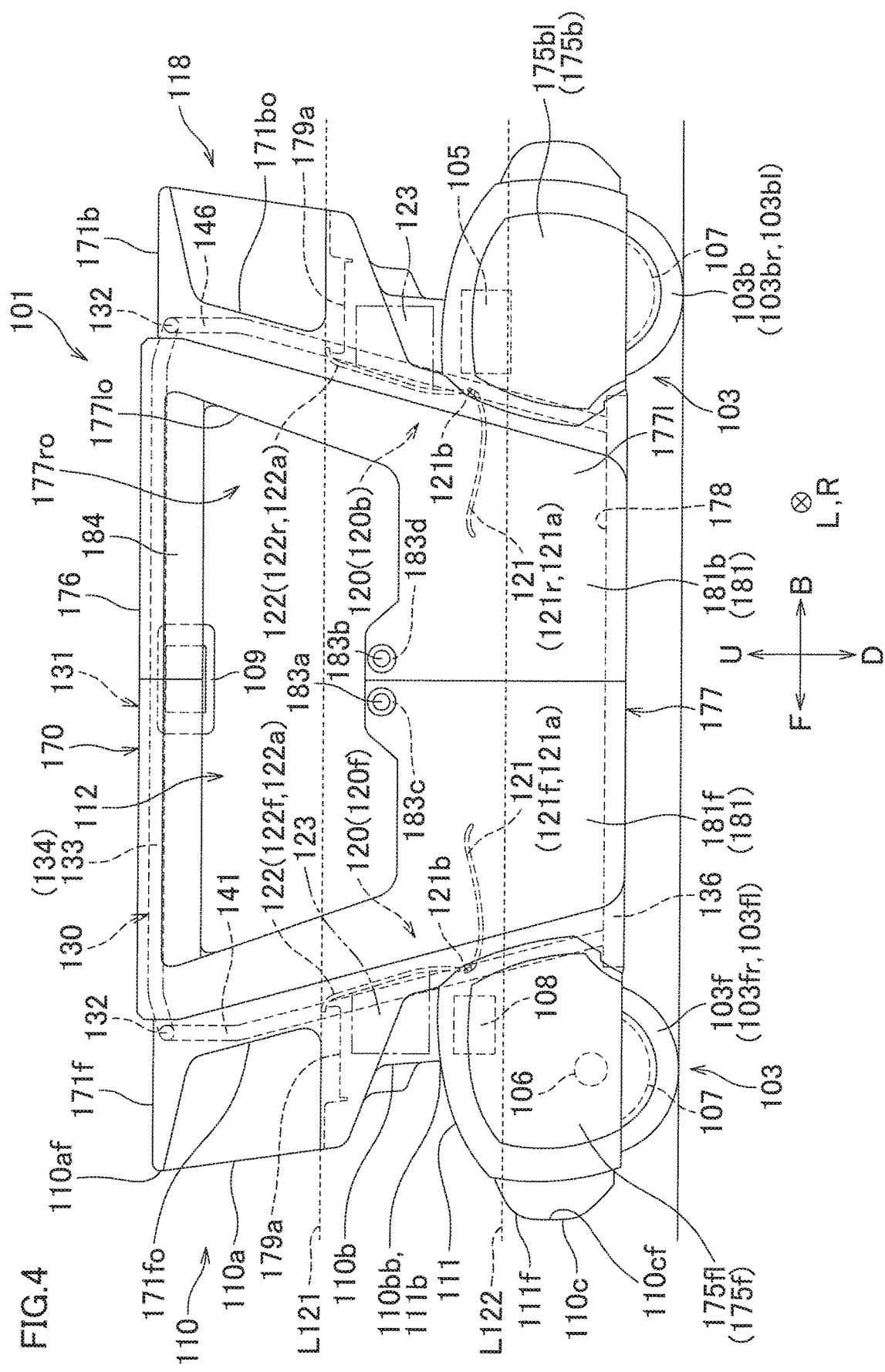
FIG. 4 is a side view of a communication seat-type vehicle of Specific Example 1.

As shown in FIG. 4, the communication seat-type vehicle 101 includes communication seats 120, four wheels 103, a driving source 105, a steering mechanism 106, a brake mechanism 107, an automatic driving controller 108, a vehicle body frame 130, and a vehicle body cover 170.

The communication seats 120 are arranged to allow passengers to be seated at locations where the passengers are able to talk face-to-face with one another. The communication seats 120 include a front seat assembly 120f and a rear seat assembly 120b which constitute two rows and are provided to allow seated passengers to face each other. The front seat assembly 120f and the rear seat assembly 120b are provided to be lined up in the vehicle front-rear direction. The front seat assembly 120f is provided forward of the rear seat assembly 120b. The front seat assembly 120f is a seat assembly on which a seated passenger faces in the vehicle rearward direction. The rear seat assembly 120b is a seat assembly on which a seated passenger faces in the vehicle forward direction. The communication seats 120 includes seats 121 and back-rests 122. The communication seats 120 are arranged so that plural passengers can be seated. The maximum number of passengers seatable on the front seat assembly 120f is two. The maximum number of passengers seatable on the rear seat assembly 120b is two. In other words, the maximum number of passengers seatable on the communication seats 120 is four. On the communication seats 120, one passenger or plural passengers may be seated.

Figure 7:
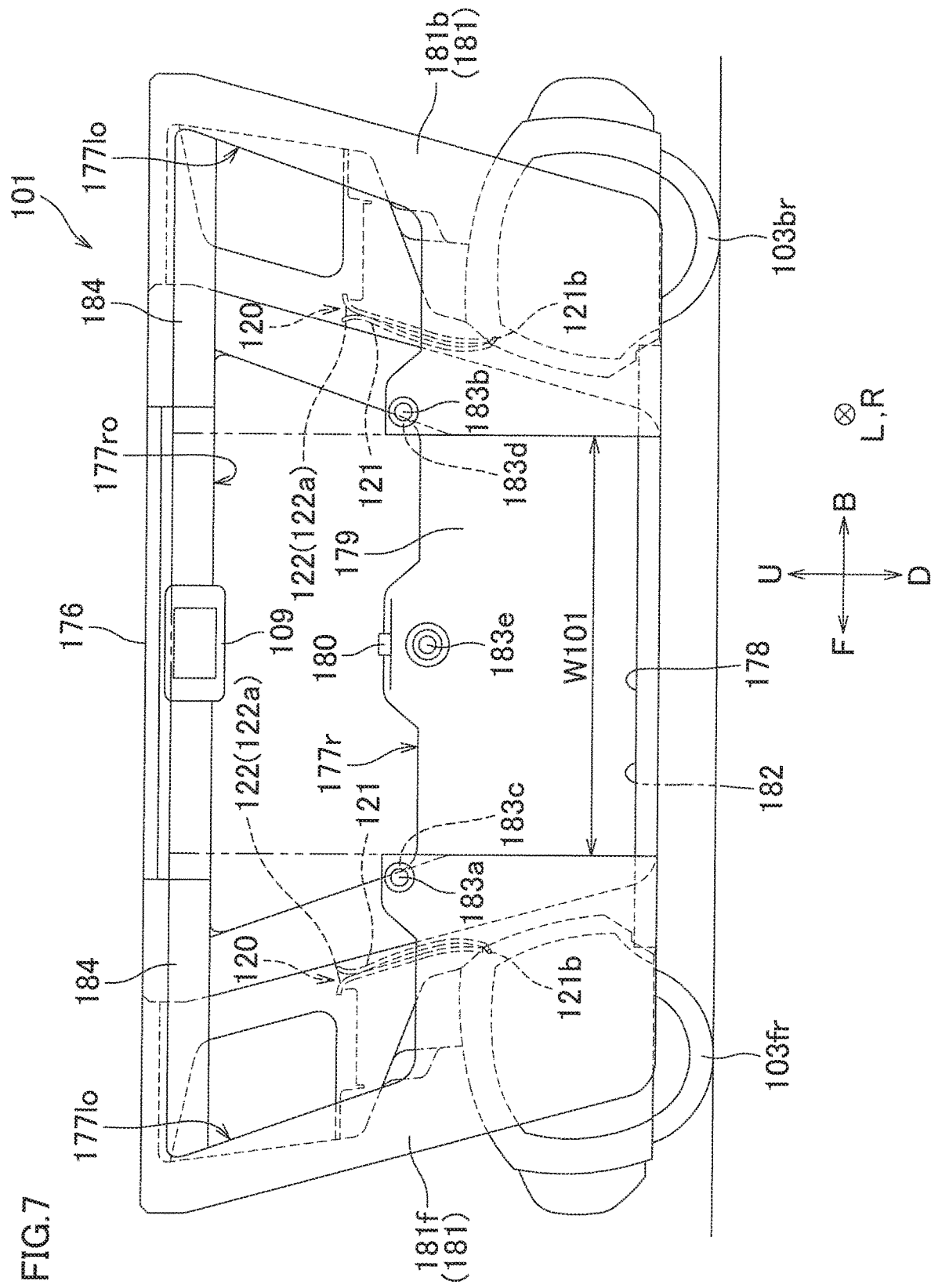
FIG. 7 is a side view of the communication seat-type vehicle of Specific Example 1.
Figure 8:
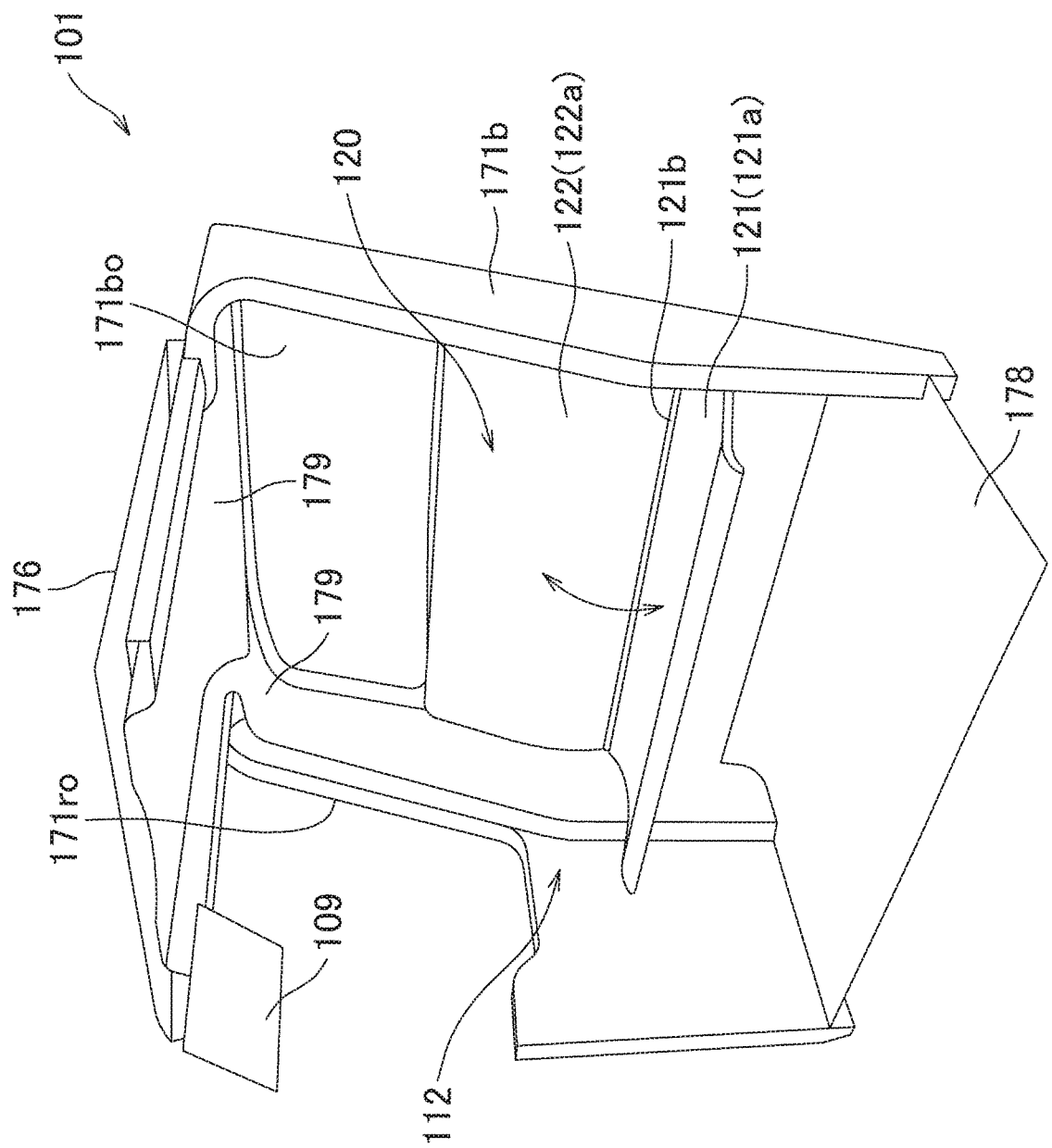
FIG. 8 is a partial sectional view of the communication seat-type vehicle of Specific Example 1.

The communication seats 120 include seat portions 121a on which passengers are seated. The seats 121 are formed to be able to constitute seat portions 121a in a vehicle internal portion. The cabin space 112 is a space in the vehicle internal portion, in which passengers are accommodated. The cabin space 112 is formed inside a later-described vehicle body frame 130. Each seat 121 is arranged to be swingable relative to the back-rest 122. Each seat 121 is swingable between a seating state and a storage state. The seating state of the seat 121 is shown in FIG. 4. The seating state is a state in which the seat portions 121a are formed by the seats 121 and passengers can be seated. In the seating state, the seats 121 are provided along the vehicle front-rear direction. The seats 121 includes a front seat 121f and a rear seat 121r. The front seat 121f is included in the front seat assembly 120f. The rear seat 121r is included in the rear seat assembly 120b. In the seating state shown in FIG. 4, the front seat 121f is inclined upward, downward, and then upward in the vehicle up-down direction, from the rear end to the front side of the front seat 121f in the vehicle front-rear direction. In the seating state shown in FIG. 4, the rear seat 121r is inclined upward, downward, and then upward in the vehicle up-down direction, from the front end to the rear side of the rear seat 121r in the vehicle front-rear direction. This allows the passengers to be deeply seated on the seats 121, and hence the cabin space 112 is roomy for the passengers. The storage state of the seat 121 is shown in FIG. 7. In the storage state shown in FIG. 7, the seats 121 are provided along the vehicle up-down direction. The storage state is a state in which the seat portions 121a are not formed by the seats 121 and passengers cannot be seated. When each seat 121 is in the storage state, the seat 121 and the back-rest 122 are arranged to face each other. When the seat 121 is in the storage state, the area of the seat 121 viewed in the vehicle up-down direction is small as compared to the seat 121 in the seating state. A rotational shaft 121b which is the swing center of the seat 121 is fixed to the vehicle body frame 130. As shown in FIG. 8, the seat 121 is swingable in a direction indicated by an arrow, from the seating state to the storage state. For example, the rotational shaft 121b includes an elastic member, and when the seat 121 in the seating state is manually lifted up by a predetermined angle, the seat 121 is switched to the storage state thanks to the elastic force of the elastic member.

As shown in FIG. 4 and FIG. 7, each communication seat 120 includes a back-rest portion 122a which is used by a passenger to keep the posture. The back-rest 122 is formed to be able to constitute the back-rest portion 122a in the vehicle internal portion. In the specific example, the back-rest 122 is fixed to the vehicle body frame 130. The back-rest 122 therefore always forms the back-rest portion 122a. The back-rests 122 are provided along the vehicle up-down direction. The back-rests 122 include a front back-rest 122f and a rear back-rest 122r. The front back-rest 122f is included in the front seat assembly 120f. The rear back-rest 122r is included in the rear seat assembly 120b. The front back-rest 122f is tilted upward in the vehicle up-down direction and forward in the vehicle front-rear direction. The rear back-rest 122r is tilted upward in the vehicle up-down direction and rearward in the vehicle front-rear direction. With this arrangement, the back-rest 122 supports the back-side of each passenger in a stretched state, and hence the cabin space 112 is roomy for the passengers.

As shown in FIG. 4, the four wheels 103 include two front wheels 103f and two rear wheels 103b. The traveling direction of the communication seat-type vehicle 101 is a forward direction in the vehicle front-rear direction. The traveling direction of the communication seat-type vehicle 101 is a direction in which the communication seat-type vehicle 101 in normal use runs due to the rotation of wheels 103. The traveling direction does not include a direction in which the communication seat-type vehicle 101 temporarily runs. By reverse rotation of the wheels 103, the traveling direction of the communication seat-type vehicle 101 can be changed to rearward in the vehicle front-rear direction. In other words, the communication seat-type vehicle 101 is a bi-directional vehicle. The two front wheels 103f include a left front wheel 103fl which is at the vehicle left portion and a right front wheel 103fr which is at the vehicle right portion. The two rear wheels 103b include a left rear wheel 103bl which is at the vehicle left portion and a right rear wheel 103br which is at the vehicle right portion.

The driving source 105 applies driving force to at least one of the four wheels 103. The communication seat-type vehicle 101 runs as the four wheels 103 rotate. The driving source 105 include a driving motor and a battery. The communication seat-type vehicle 101 is, for example, an electric car and the driving motor is an electric motor. The driving motor is connected to the battery. The battery supplies power for driving the communication seat-type vehicle 101 to the driving motor. The driving motor drives the two rear wheels 103b. The driving motor is able to rotate the rear wheels 103b in both directions. The driving source 105 is supported by the vehicle body frame 130. The driving source 105 is controlled based on a command output from the automatic driving controller 108.

The steering mechanism 106 steers at least one of the four wheels 103. As a result of the steering by the steering mechanism 106, the traveling direction of the communication seat-type vehicle 101 is changed in the vehicle left-right direction. The steering mechanism 106 steers the two front wheels 103f and the two rear wheels 103b. The steering mechanism 106 is arranged to steer the left front wheel 103fl and the right front wheel 103fr each at a predetermined steering angle relative to the vehicle front-rear direction. The left front wheel 103fl and the right front wheel 103fr are swung in the vehicle left-right direction by the steering mechanism 106. The steering mechanism 106 is arranged to steer the left rear wheel 103bl and the right rear wheel 103br each at a predetermined steering angle relative to the vehicle front-rear direction. The left rear wheel 103bl and the right rear wheel 103br are swung in the vehicle left-right direction by the steering mechanism 106. The traveling direction of the communication seat-type vehicle 101 is determined by the orientations of the two front wheels 103f and the two rear wheels 103b which are swung in the vehicle left-right direction. The steering mechanism 106 is supported by the vehicle body frame 130. The steering mechanism 106 is controlled based on a command output from the automatic driving controller 108.

The brake mechanism 107 is constituted by four disc brake devices. The four disc brake devices are provided for the four wheels 103, respectively. The four disc brake devices brake the four wheels 103, respectively. Each disc brake device includes a metal disc which rotates together with the wheel 103 and pads which are provided on the respective sides of the disc in the vehicle left-right direction. The disc brake device brakes the wheel 103 by sandwiching the disc by the pads from both sides. The brake mechanism 107 is supported by the vehicle body frame 130. The brake mechanism 107 is controlled based on a command output from the automatic driving controller 108.

The automatic driving controller 108 is connected to the driving source 105, the steering mechanism 106, and the brake mechanism 107. The automatic driving controller 108 is supported by the vehicle body frame 130. The automatic driving controller 108 is arranged to be able to communicate with a control panel 109. The control panel 109 is provided in a cabin space 112. The control panel 109 is a computer. The control panel 109 may be attachable and detachable to and from an inner cover 179 in the vehicle internal portion. The automatic driving controller 108 is arranged to receive a drive signal, a brake signal, and a steering signal from the control panel 109. The drive signal is a signal for driving the communication seat-type vehicle 101 by the driving source 105. The brake signal is a signal for braking the communication seat-type vehicle 101 by the brake mechanism 107. The steering signal is a signal for steering the communication seat-type vehicle 101 by the steering mechanism 106. The drive signal may be a signal generated based on an acceleration instruction input through the control panel 109. The brake signal may be a signal generated based on a deceleration instruction input through the control panel 109. The drive signal and the brake signal may be signals generated based on a target speed input through the control panel 109. The steering signal may be a signal generated based on a rotational angle instruction which is input through the control panel 109. The automatic driving controller 108 outputs instructions based on the drive signal, the brake signal, and the steering signal to the driving source 105, the steering mechanism 106, and the brake mechanism 107.

As shown in FIG. 4, FIG. 5, and FIG. 10 to FIG. 13, the vehicle body frame 130 includes a ceiling frame 131, a floor frame 136, a front H-shaped frame 141, and a rear H-shaped frame 146. The vehicle body frame 130 is, for example, made of metal. In the vehicle body frame 130, the shape of the front portion viewed rearward in the vehicle front-rear direction is identical with the shape of the rear portion viewed forward in the vehicle front-rear direction. Furthermore, the vehicle body frame 130 is formed to be plane symmetrical with respect to a plane which passes between the front end and the rear end of the vehicle body frame 130 in the vehicle front-rear direction and is perpendicular to the vehicle front-rear direction. In this specific example, the vehicle body frame 130 is formed to be plane symmetrical with respect to a plane which passes through the center in the vehicle front-rear direction of the vehicle body frame 130 and is perpendicular to the vehicle front-rear direction.

The ceiling frame 131 includes two ceiling transverse frames 132, a ceiling right frame 133, and a ceiling left frame 134. The two ceiling transverse frames 132 include a ceiling front frame 132f and a ceiling rear frame 132b. The ceiling front frame 132f and the ceiling rear frame 132b are provided to be lined up in the vehicle front-rear direction. The ceiling front frame 132f is provided forward of the ceiling rear frame 132b in the vehicle front-rear direction.

Each of the ceiling front frame 132*f* and the ceiling rear frame 132*b* is provided along the vehicle left-right direction. The ceiling front frame 132*f* and the ceiling rear frame 132*b* are provided to be parallel to each other. The ceiling right frame 133 connects right portions of the two ceiling transverse frames 132 in the vehicle left-right direction. The ceiling left frame 134 connects left portions of the two ceiling transverse frames 132 in the vehicle left-right direction. The ceiling right frame 133 and the ceiling left frame 134 are provided to be parallel to each other. The ceiling right frame 133 and the ceiling left frame 134 are provided so that a front end portion and a rear end portion of each frame are inclined downward. The front end portion of the ceiling frame 131 is connected to the front H-shaped frame 141. The rear end portion of the ceiling frame 131 is connected to the rear H-shaped frame 146. In Specific Example 1, the ceiling front frame 132*f* is integrated with the two front pillars 142 of the H-shaped frame 141. The ceiling rear frame 132*b* is integrated with the two rear pillars 147 of the rear H-shaped frame 146.

The floor frame 136 is rectangular in shape, in which the sides in the vehicle left-right direction are longer than the sides in the vehicle front-rear direction. The floor frame 136 is provided directly below the ceiling frame 131. The floor frame 136 is connected to lower end portions of the two front pillars 142 of the front H-shaped frame 141. The floor frame 136 is connected to lower end portions of the two rear pillars 147 of the rear H-shaped frame 146. The floor frame 136 includes two floor transverse frames 137, a floor right frame 138, and a floor left frame 139. The two floor transverse frames 137 includes a floor front frame 137*f* and a floor rear frame 137*b*. The floor front frame 137*f* and the floor rear frame 137*b* are provided to be lined up in the vehicle front-rear direction. The floor front frame 137*f* is provided forward of the floor rear frame 137*b*. Each of the floor front frame 137*f* and the floor rear frame 137*b* is provided along the vehicle left-right direction. The floor front frame 137*f* and the floor rear frame 137*b* are provided to be parallel to each other. The floor right frame 138 and the floor left frame 139 are provided to be lined up in the vehicle left-right direction. The floor right frame 138 is provided to the right of the floor left frame 139 in the vehicle left-right direction. The floor right frame 138 and the floor left frame 139 are provided to be parallel to each other. The floor right frame 138 connects right portions of the two floor transverse frames 137 in the vehicle left-right direction. The floor left frame 139 connects left portions of the two floor transverse frames 137 in the vehicle left-right direction.

The floor frame 136 includes a floor intermediate frame 140. The floor intermediate frame 140 includes a floor intermediate front frame 137*cf*, a floor intermediate rear frame 137*cb*, a floor intermediate right frame 138*a*, and a floor intermediate left frame 139*a*. The floor intermediate front frame 137*cf* and the floor intermediate rear frame 137*cb* are provided to be lined up in the vehicle front-rear direction. The floor intermediate front frame 137*cf* and the floor intermediate rear frame 137*cb* are provided between the two floor transverse frames 137 in the vehicle front-rear direction. The floor intermediate front frame 137*cf* is provided in front of the floor intermediate rear frame 137*cb* in the vehicle front-rear direction. Each of the floor intermediate front frame 137*cf* and the floor intermediate rear frame 137*cb* is provided along the vehicle left-right direction. The floor intermediate front frame 137*cf* and the floor intermediate rear frame 137*cb* are provided to be parallel to each other. The floor right frame 138 connects right portions of the floor intermediate front frame 137*cf* and the floor intermediate rear frame 137*cb* in the vehicle left-right direction. The floor left frame 139 connects left portions of the floor intermediate front frame 137*cf* and the floor intermediate rear frame 137*cb* in the vehicle left-right direction. The floor intermediate right frame 138*a* and the floor intermediate left frame 139*a* are provided to be lined up in the vehicle left-right direction. The floor intermediate right frame 138*a* and the floor intermediate floor intermediate left frame 139*a* are provided between the floor right frame 138 and the floor left frame 139 in the vehicle left-right direction. The floor intermediate right frame 138*a* is provided to the right of the floor intermediate left frame 139*a* in the vehicle left-right direction. The floor intermediate right frame 138*a* and the floor intermediate left frame 139*a* are provided to be parallel to each other. The two floor transverse frames 137 connect a front end portion of the floor intermediate right frame 138*a* with a rear end portion thereof. The two floor transverse frames 137 connect a front end portion of the floor intermediate left frame 139*a* with a rear end portion thereof.

The front H-shaped frame 141 includes two front pillars 142 and a front intermediate transverse frame 143. The two front pillars 142 are provided to be lined up in the vehicle left-right direction. The two front pillars 142 include a right front pillar 142*r* and a left front pillar 142*l*. The two front pillars 142 are provided forward of a later-described doorway 182. The right front pillar 142*r* and the left front pillar 142*l* are lined up in the vehicle left-right direction. The right front pillar 142*r* is provided rightward of the left front pillar 142l in the vehicle left-right direction. Each of the right front pillar 142*r* and the left front pillar 142*l* is provided along the vehicle up-down direction. The right front pillar 142*r* and the left front pillar 142*l* are provided to be parallel to each other. Each of the right front pillar 142*r* and the left front pillar 142*l* is arranged so that the upper portion is provided forward of the lower portion. The right front pillar 142*r* and the left front pillar 142l have upper portions connected to a front portion of the ceiling frame 131. The right front pillar 142*r* and the left front pillar 142*l* have lower portions connected to a front portion of the floor frame 136. The front intermediate transverse frame 143 is connected to the two front pillars 142 at end portions in the vehicle left-right direction. The front intermediate transverse frame 143 connects the two front pillars 142 to each other. The front intermediate transverse frame 143 is connected to a front support frame 151*f* and a front cover support frame 152*f* supporting heavy loads. The front support frame 151*f* and the front cover support frame 152*f* are provided in front of the front intermediate transverse frame 143. The front support frame 151*f* supports heavy loads such as the driving source 105 and the automatic driving controller 108. The front cover support frame 152*f* supports a heavy load such as the front cover 171*f*. The front intermediate transverse frame 143 supports a heavy load provided in front of the front intermediate transverse frame 143, via the front support frame 151*f* and the front cover support frame 152*f*. Although not illustrated, a front seat assembly frame is swingably attached to the front intermediate transverse frame 143 via a rotational shaft. The front seat assembly frame constitutes the front seat assembly 120*f*.

The rear H-shaped frame 146 includes two rear pillars 147 and a rear intermediate transverse frame 148. The two rear pillars 147 are provided to be lined up in the vehicle left-right direction. The two rear pillars 147 include a right rear pillar 147*r* and a left rear pillar 147*l*. The two rear pillars 147 are provided rearward of the later-described doorway 182. The right rear pillar 147*r* and the left rear pillar 147l are lined up in the vehicle left-right direction.

The right rear pillar 147r is provided rightward of the left rear pillar 147l in the vehicle left-right direction. Each of the right rear pillar 147r and the left rear pillar 147l is provided along the vehicle up-down direction. The right rear pillar 147r and the left rear pillar 147l are provided to be parallel to each other. Each of the right rear pillar 147r and the left rear pillar 147l is arranged so that the upper portion is provided rearward of the lower portion. The right rear pillar 147r and the left rear pillar 147l have upper portions connected to a rear portion of the ceiling frame 131. The right rear pillar 147r and the left rear pillar 147l have lower portions connected to a rear portion of the floor frame 136. The rear intermediate transverse frame 148 is connected to the two rear pillars 147 at end portions in the vehicle left-right direction. The rear intermediate transverse frame 148 connects the two rear pillars 147 to each other. The rear intermediate transverse frame 148 is connected to a rear support frame 151b and a rear cover support frame 152b supporting heavy loads. The rear support frame 151b and the rear cover support frame 152b are provided behind the rear intermediate transverse frame 148. The rear support frame 151b supports heavy loads such as the driving source 105 and the automatic driving controller 108. The rear cover support frame 152b supports a heavy load such as the rear cover 171b. The rear intermediate transverse frame 148 supports a heavy load provided behind the rear intermediate transverse frame 148, via the rear support frame 151b and the rear cover support frame 152b. A rear seat assembly frame 120bf is swingably attached to the rear intermediate transverse frame 148 via a rotational shaft 121b. The rear seat assembly frame 120bf constitutes the rear seat assembly 120b.

Figure 5:
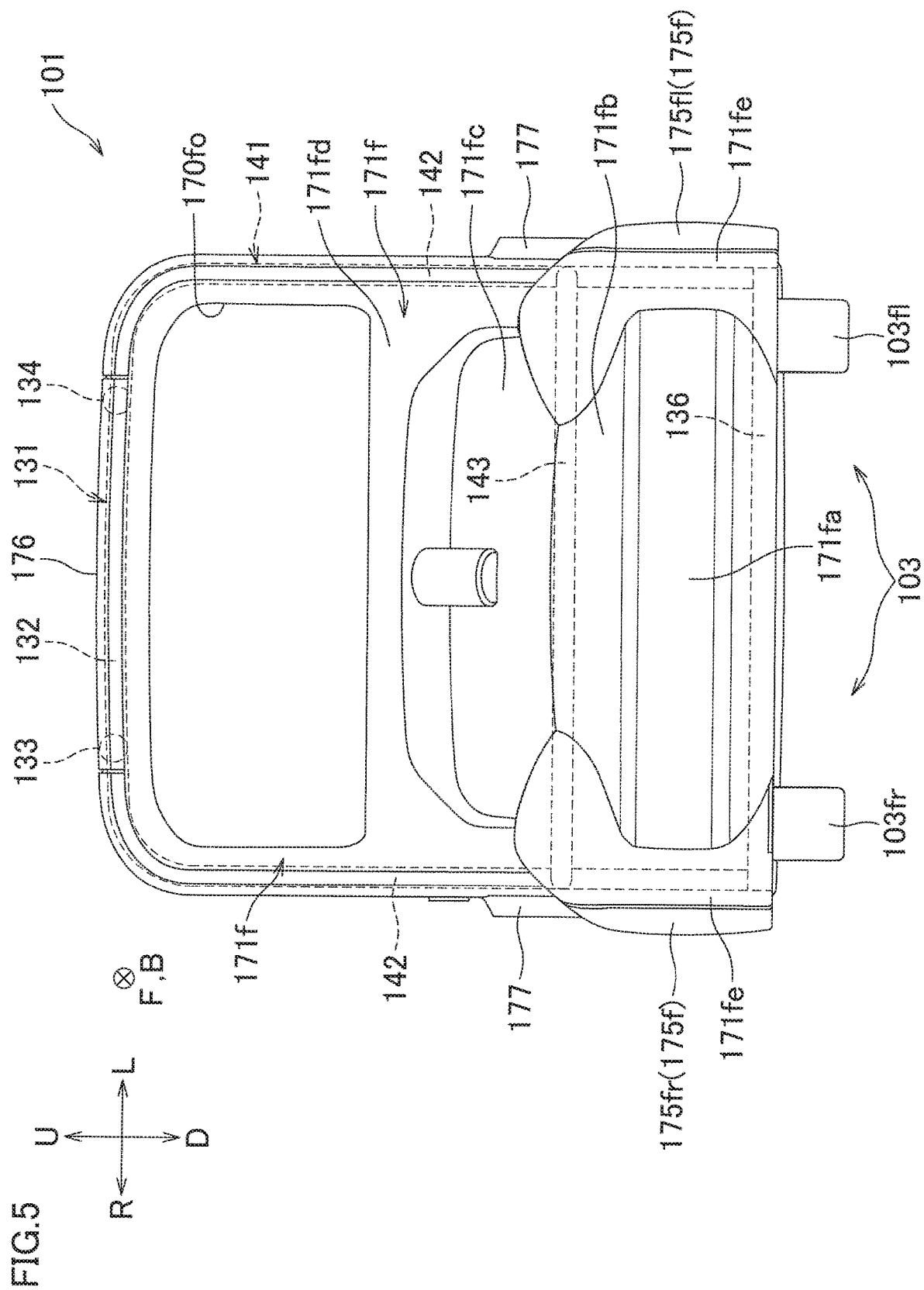
FIG. 5 is a front view of the communication seat-type vehicle of Specific Example 1.
Figure 6:
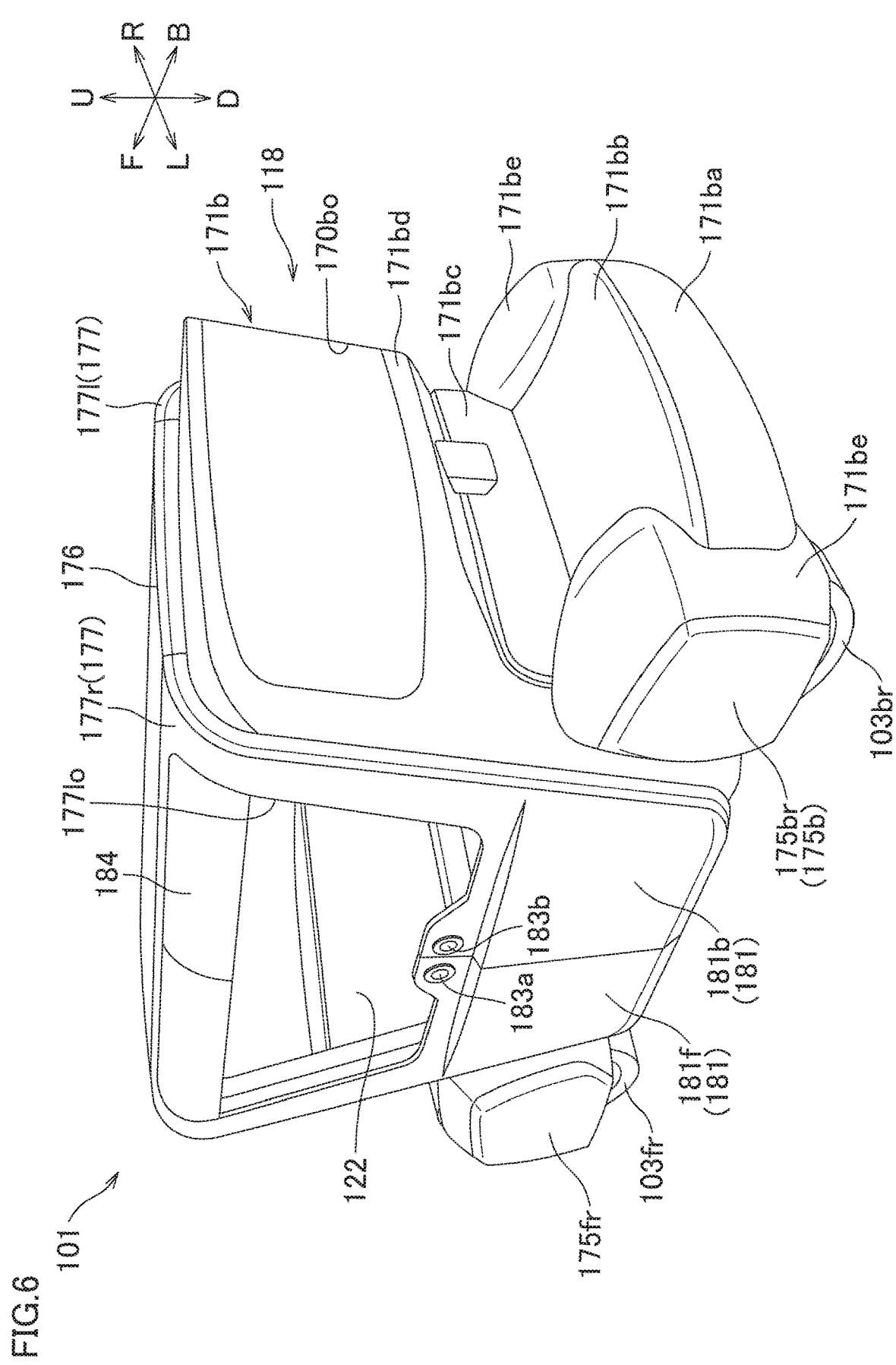
FIG. 6 is a perspective view of the communication seat-type vehicle of Specific Example 1.

As shown in FIG. 4 to FIG. 6, the vehicle body cover 170 includes the front cover 171f, the rear cover 171b, two front wheel side covers 175f, two rear wheel side covers 175b, a roof cover 176, side covers 177, a floor deck 178 which is a floor cover, and an inner cover 179. In the vehicle internal portion, the vehicle body cover 170 constitutes the cabin space 112 in which passengers are accommodated. The vehicle body cover 170 is formed to be plane symmetrical with respect to a plane which passes between a front end and a rear end in the vehicle front-rear direction of the vehicle body cover 170 and is perpendicular to the vehicle front-rear direction. In this specific example, the vehicle body cover 170 is formed to be plane symmetrical with respect to a plane which passes through the center in the vehicle front-rear direction of the vehicle body cover 170 and is perpendicular to the vehicle front-rear direction. The vehicle body cover 170 is, for example, made of synthetic resin. The vehicle body cover 170 is supported by the vehicle body frame 130. The vehicle body cover 170 covers the vehicle body frame 130. The vehicle body cover 170 covers an upper portion of the vehicle body frame 130 from the inside and outside of the vehicle. The vehicle body cover 170 covers a lower portion of the vehicle body frame 130 from the inside and outside of the vehicle. The front cover 171f covers the front H-shaped frame 141 from the front and rear in the vehicle front-rear direction. The rear cover 171b covers the rear H-shaped frame 146 from the front and rear in the vehicle front-rear direction. The front wheel side covers 175f cover the side faces of the two front wheels 103f. The rear wheel side covers 175b cover the side faces of the two rear wheels 103b. The roof cover 176 covers the ceiling frame 131 from above and below in the vehicle up-down direction. The floor deck 178 covers the upper surface of the floor frame 136 from above in the vehicle up-down direction. The side covers 177 include a right side cover 177r and a left side cover 177l. The shape of the communication seat-type vehicle 101 visually perceived by the passengers is plane symmetrical with respect to a plane which passes between the front end and the rear end of the vehicle in the vehicle front-rear direction and is perpendicular to the vehicle front-rear direction. In this specific example, the shape of the communication seat-type vehicle 101 visually perceived by the passengers is plane symmetrical with respect to a plane which passes through the center in the vehicle front-rear direction of the communication seat-type vehicle 101 and is perpendicular to the vehicle front-rear direction. The shape of the communication seat-type vehicle 101 perceived by the passengers is a combination of the outer shape of the communication seat-type vehicle 101 and the shape of the cabin space 112.

The vehicle body cover 170 includes a doorway 182 which is provided at a left portion, a right portion, or both of these portions of the vehicle body cover 170 in the vehicle left-right direction. In FIG. 4, the vehicle body cover 170 has the doorway 182 provided at the left portion in the vehicle left-right direction.

As shown in FIG. 5, the front cover 171f is provided in front of the roof cover 176 and the side covers 177. The front cover 171f is partially provided above the two front wheels 103f. The front cover 171f includes a front cover lower portion 171fa, a front cover intermediate lower portion 171fb, a front cover intermediate portion 171fc, a front cover upper portion 171fd, and two front wheel front cover portions 171fe. The front cover lower portion 171fa, the front cover intermediate lower portion 171fb, the front cover intermediate portion 171fc, the front cover upper portion 171fd, and the two front wheel front cover portions 171fe may be partially or entirely formed in an integral manner, or may be formed individually.

The front cover lower portion 171fa is provided in front of the two front wheels 103f. The front cover lower portion 171fa is provided along the vehicle up-down direction. The front cover lower portion 171fa has left and right portions which are connected to the two front wheel front cover portions 171fe, respectively. The front cover lower portion 171fa is provided between the two front wheel front cover portions 171fe, along the vehicle left-right direction. The front cover lower portion 171fa is curved so that a central portion in the vehicle left-right direction is positioned forward of left and right end portions. The front cover lower portion 171fa is curved so that a central portion in the vehicle up-down direction is positioned forward of upper and lower end portions. The front end of the front cover lower portion 171fa protrudes forward as compared to the front ends of the two front wheel front cover portions 171fe.

The front cover intermediate lower portion 171fb is connected to the front cover lower portion 171fa and is provided directly above the front cover lower portion 171fa. The front cover intermediate lower portion 171fb is provided rearward of the front cover lower portion 171fa. The front cover intermediate lower portion 171fb is connected to the front cover intermediate portion 171fc and is provided directly below the front cover intermediate portion 171fc. The front cover intermediate portion 171fc is provided behind the front cover lower portion 171fa. The front cover intermediate lower portion 171fb is provided along the vehicle front-rear direction. The front cover intermediate lower portion 171fb is inclined upward from the front cover lower portion 171fa toward the front cover intermediate portion 171fc. The front cover intermediate lower portion 171fb has left and right portions which are connected to the two front wheel front cover portions 171fe, respectively.

The front cover intermediate portion 171*fc* is connected to the front cover intermediate lower portion 171*fb* and is provided directly above the front cover intermediate lower portion 171*fb*. The front cover intermediate portion 171*fc* is provided along the vehicle up-down direction.

The front cover upper portion 171*fd* is connected to the front cover intermediate portion 171*fc* and is provided above the front cover intermediate portion 171*fc*. The front cover upper portion 171*fd* is provided along the vehicle up-down direction. The front cover upper portion 171*fd* is provided forward of the front cover intermediate portion 171*fc*. The front cover upper portion 171*fd* has left and right portions which are connected to the two front wheel front cover portions 171*fe*, respectively. The front cover upper portion 171*fd* is curved so that a central portion in the vehicle left-right direction is positioned forward of left and right end portions. The front cover upper portion 171*fd* includes a front cover window 171*fo*. The front cover window 171*fo* is provided above the back-rest 122 of the communication seat 120. The front cover window 171*fo* is positioned to be higher than the waist of a passenger seated on the communication seat 120. The front cover window 171*fo* is at least partially positioned at the height of the viewpoint of a passenger seated on the communication seat 120. The front cover window 171*fo* is arranged to allow a passenger seated on the communication seat 120 to visually recognize the external space outside the vehicle from the cabin space 112 in the vehicle internal portion. The front cover window 171*fo* may be an open window which allows the cabin space 112 to always communicate with the external space. The front cover window 171*fo* may be a window which is openable and closable and allows the cabin space 112 to communicate with the external space when opened. The front cover window 171*fo* may be a fixed window which cannot be opened/closed. When the front cover window 171*fo* is either a window which is openable and closable or a fixed window, a transparent glass, synthetic resin, a vinyl sheet, etc. is fitted to the front cover window 171*fo*.

The two front wheel front cover portions 171*fe* are provided in front of the two front wheels 103*f* and partially cover the two front wheels 103*f* from the front. The two front wheel front cover portions 171*fe* are provided directly above the two front wheels 103*f* and partially cover front portions of the two front wheels 103*f* from above. The two front wheel front cover portions 171*fe* are curved along the two front wheels 103*f*. The two front wheel front cover portions 171*fe* are connected to the two front wheel side covers 175*f*, respectively.

As shown in FIG. 6, the rear cover 171*b* is provided rearward of the roof cover 176 and the side covers 177. The rear cover 171*b* is provided directly above the rear wheels 103*b*. The rear cover 171*b* includes a rear cover lower portion 171*ba*, a rear cover intermediate lower portion 171*bb*, a rear cover intermediate portion 171*bc*, a rear cover upper portion 171*bd*, and two rear wheel rear cover portions 171*be*. In the rear cover 171*b*, the rear cover lower portion 171*ba*, the rear cover intermediate lower portion 171*bb*, the rear cover intermediate portion 171*bc*, the rear cover upper portion 171*bd*, and the two rear wheel rear cover portions 171*be* may be partially or entirely formed in an integral manner, or may be formed individually.

The rear cover lower portion 171*ba* is provided behind the two rear wheels 103*b*. The rear cover lower portion 171*ba* is provided along the vehicle up-down direction. The rear cover lower portion 171*ba* has left and right portions which are connected to the two front wheel rear cover portions 171*be*, respectively. The rear cover lower portion 171*ba* is provided between the two rear wheel rear cover portions 171*be*, along the vehicle left-right direction. The rear cover lower portion 171*ba* is curved so that a central portion in the vehicle left-right direction is positioned rearward of left and right end portions. The rear cover lower portion 171*ba* is curved so that a central portion in the vehicle up-down direction is positioned rearward of upper and lower end portions. The rear end of the rear cover lower portion 171*ba* protrudes rearward as compared to the rear ends of the two rear wheel rear cover portions 171*be*.

The rear cover intermediate lower portion 171*bb* is connected to the rear cover lower portion 171*ba* and is provided directly above the rear cover lower portion 171*ba*. The rear cover intermediate lower portion 171*bb* is provided at least partially rearward of the rear cover lower portion 171*ba*. The rear cover intermediate lower portion 171*bb* is connected to the rear cover intermediate portion 171*bc* and is provided directly below the rear cover intermediate portion 171*bc*. The rear cover intermediate portion 171*bc* is provided in front of the rear cover lower portion 171*ba*. The rear cover intermediate lower portion 171*bb* is provided along the vehicle front-rear direction. The rear cover intermediate lower portion 171*bb* is inclined upward from the rear cover lower portion 171*ba* toward the rear cover intermediate portion 171*bc*. The rear cover intermediate lower portion 171*bb* has left and right portions which are connected to the two rear wheel rear cover portions 171*be*, respectively.

The rear cover intermediate portion 171*bc* is connected to the rear cover intermediate lower portion 171*bb* and is provided directly above the rear cover intermediate lower portion 171*bb*. The rear cover intermediate portion 171*bc* is provided along the vehicle up-down direction.

The rear cover upper portion 171*bd* is connected to the rear cover intermediate portion 171*bc* and is provided above the rear cover intermediate portion 171*bc*. The rear cover upper portion 171*bd* is provided along the vehicle up-down direction. The rear cover upper portion 171*bd* is provided partially rearward of the rear cover intermediate portion 171*bc*. The rear cover upper portion 171*bd* has left and right portions which are connected to the two rear wheel rear cover portions 171*be*, respectively. The rear cover upper portion 171*bd* is curved so that a central portion in the vehicle left-right direction is positioned rearward of left and right end portions. The rear cover upper portion 171*bd* includes a rear cover window 171*bo*. The rear cover window 171*bo* is provided above the back-rest 122 of the communication seat 120. The rear cover window 171*bo* is positioned to be higher than the waist of a passenger seated on the communication seat 120. The rear cover window 171*bo* is at least partially positioned at the height of the viewpoint of a passenger seated on the communication seat 120. The rear cover window 171*bo* is arranged to allow a passenger seated on the communication seat 120 to visually recognize the external space outside the vehicle from the cabin space 112 in the vehicle internal portion. The rear cover window 171*bo* may be an open window which allows the cabin space 112 to always communicate with the external space. The rear cover window 171*bo* may be a window which is openable and closable and allows the cabin space 112 to communicate with the external space when opened. The rear cover window 171*bo* may be a fixed window which cannot be opened/closed. When the rear cover window 171*bo* is either a window which is openable and closable or a fixed window, a transparent glass, a synthetic resin, a vinyl sheet, etc. is fitted to the rear cover window 171*bo*.

The two rear wheel rear cover portions 171*be* are provided directly above the two rear wheels 103*b* and partially cover the two rear wheels 103*b* from above. The two rear wheel rear cover portions 171*be* are curved along the two rear wheels 103*b*. The two rear wheel rear cover portions 171*be* are connected to the two rear wheel side covers 175*b*, respectively.

As shown in FIG. 4 and FIG. 5, the two front wheel side covers 175*f* include a right front wheel side cover 175*fr* and a left front wheel side cover 175*fl*. The two front wheel side covers 175*f* are provided to the left of and to the right of the two front wheels 103*f* in the vehicle left-right direction. The right front wheel side cover 175*fr* is provided to the right of the right front wheel 103*fr*. The left front wheel side cover 175*fl* is provided to the left of the left front wheel 103*fl*. The two front wheel side covers 175*f* partially cover the two front wheels 103*f* from the left and right. The two front wheel side covers 175*f* are curved along the two front wheels 103*f*.

The two rear wheel side covers 175*b* include a right rear wheel side cover 176*br* and a left rear wheel side cover 176*bl*. The two rear wheel side covers 175*b* are provided to the left of and to the right of the two rear wheels 103*b* in the vehicle left-right direction. The right rear wheel side cover 175*br* is provided to the right of the right rear wheel 103*br*. The left rear wheel side cover 175*bl* is provided to the to the left of the left rear wheel 103*bl*. The two rear wheel side covers 175*b* partially cover the two rear wheels 103*b* from the left and right. The two rear wheel side covers 175*b* are curved along the two rear wheels 103*b*.

As shown in FIG. 4 and FIG. 6, the roof cover 176 is connected to the front cover 171*f* and is provided behind the front cover 171*f*. The roof cover 176 is connected to the rear cover 171*b* and is provided in front of the rear cover 171*b*. The roof cover 176 is connected to the side covers 177 and is provided directly above the side covers 177. The roof cover 176 is formed to be substantially flat.

The side covers 177 are connected to the front cover 171*f* and are provided behind the front cover 171*f*. The side covers 177 are connected to the rear cover 171*b* and are provided in front of the rear cover 171*b*. The side covers 177 are connected to the roof cover 176 and are provided directly below the roof cover 176. The side covers 177 include a right side cover 177*r* and a left side cover 177*l*.

As shown in FIG. 7, the right side cover 177*r* has a right window 177*ro*. The right window 177*ro* is trapezoidal in shape, and the upper side is longer than the lower side. The right window 177*ro* is provided at an upper portion of the right side cover 177*r*. The right window 177*ro* is provided above the seat 121 of the communication seat 120. The right window 177*ro* is positioned to be higher than the waist of a passenger seated on the communication seat 120. The right window 177*ro* is positioned at the height of the viewpoint of a passenger seated on the communication seat 120. The right window 177*ro* is arranged to allow a passenger seated on the communication seat 120 to visually recognize the external space outside the vehicle from the cabin space 112 in the vehicle internal portion. The right window 177*ro* is an open window which allows the cabin space to always communicate with the external space. The communication seat-type vehicle 101 has an emergency button 180 at a central portion in the front-rear direction of a lower frame of the right window 177*ro* of the right side cover 177*r*. The emergency button 180 is provided more or less at the border between the cabin space 112 and the external space of the vehicle. The emergency button 180 is operated by being pressed down. The emergency button 180 may be pressed by a passenger inside the communication seat-type vehicle 101. Alternatively, the emergency button 180 may be pressed by a pedestrian, etc. who is outside the communication seat-type vehicle 101 and inserts a hand through the right window 177*ro*. The communication seat-type vehicle 101 is stopped when the emergency button 180 is pressed.

The left side cover 177*l* includes a left window 177*lo* and a door 181. The communication seat-type vehicle 101 of Specific Example 1 is assumed to run in a left portion of the road in the vehicle left-right direction. The left window 177*l0* is provided at an upper portion of the left side cover 177*l*.

When the door 181 is in a closed state (see FIG. 4), the left window 177*lo* is trapezoidal in shape, and the upper side is longer than the lower side. The left window 177*lo* is provided above the seat 121 of the communication seat 120. The left window 177*lo* is at least partially positioned to be higher than the height of the waist of a passenger seated on the communication seat 120. The left window 177*lo* is at least partially positioned at the height of the viewpoint of a passenger seated on the communication seat 120. The left window 177*lo* is arranged to allow a passenger seated on the communication seat 120 to visually recognize the external space outside the vehicle from the cabin space 112 in the vehicle internal portion. The left window 177*lo* is an open window which allows the cabin space to always communicate with the external space.

The door 181 is provided at a lower central portion in the vehicle left-right direction of the left side cover 177*l*. The door 181 includes a front door 181*f* and a rear door 181*b*. The front door 181*f* is provided forward of the center in the vehicle front-rear direction of the communication seat-type vehicle 101. The rear door 181*b* is provided rearward of the center in the vehicle front-rear direction of the communication seat-type vehicle 101. The front door 181*f* and the rear door 181*b* form a sliding door. The front door 181*f* and the rear door 181*b* are arranged to slide in the vehicle front-rear direction so as to open or close the doorway 182. The doorway 182 is a region indicated by two-dot chain lines in FIG. 7. The front door 181*f* and the rear door 181*b* are arranged so that, in a closed state, the rear end of the front door 181*f* is in contact with the front end of the rear door 181*b* (see FIG. 4). The front door 181*f* and the rear door 181*b* are arranged so that, in an open state (see FIG. 7), a passenger is allowed to get in or out from the cabin space 112 through the doorway 182. When the closed state is switched to the open state, the front door 181*f* is slid forward. When the open state is switched to the closed state, the front door 181*f* is slid rearward. When the closed state is switched to the open state, the rear door 181*b* is slid rearward. When the open state is switched to the closed state, the rear door 181*b* is slid forward.

In the communication seat-type vehicle 101, four open buttons 183*a*, 183*b*, 183*c*, and 183*d* are provided. The open buttons 183*a* and 183*b* are provided on a vehicle outer surface. The open buttons 183*c* and 183*d* are provided on a vehicle inner surface. The vehicle outer surface is a surface exposed to the external space of the vehicle, among surfaces constituting the communication seat-type vehicle 101. The vehicle inner surface is a surface facing the cabin space 112 in the vehicle internal portion, among the surfaces constituting the communication seat-type vehicle 101. The open buttons 183*a* and 183*d* are provided on the outer surface of the door 181. The outside surface of the door 181 is a surface exposed to the external space of the vehicle, among surfaces constituting the door 181. The open buttons 183*c* and 183*d* are provided on the inner surface of the door 181. The open buttons 183*c* and 183*d* face the cabin space 112. The inner surface of the door 181 is a surface facing the cabin space 112 in the vehicle internal portion, among the surfaces constituting the door 181. The open buttons 183a and 183c are provided on the front door 181f. The open buttons 183b and 183d are provided on the rear door 181b. The open button 183a and the open button 183c are provided for general passengers. When one of the open button 183a and the open button 183c is pressed, the front door 181f and the rear door 181b are switched to the open state. The open button 183b and the open button 183d are provided for special passengers. When one of the open button 183b and the open button 183d is pressed, the front door 181f and the rear door 181b are switched to the open state and the vehicle height of the communication seat-type vehicle 101 is lowered. To be more specific, when the vehicle height of the communication seat-type vehicle 101 is lowered, at least the vehicle body frame 130 and the vehicle body cover 170 are lowered in height. Alternatively, the open button 183a and the open button 183c may be buttons for special passengers whereas the open button 183b and the open button 183d may be buttons for general passengers. The communication seat-type vehicle 101 has a single close button 183e which is provided on the vehicle inner surface. The close button 183e is provided on a later-described inner cover 179 which is provided directly below the right window 170ro. The close button 183e faces the cabin space 112. As the close button 183e is pressed, the front door 181f and the rear door 181b are switched to the closed state. When the vehicle height of the communication seat-type vehicle 101 is lower than the height in the running at the time of the pressing of the close button 183e, the front door 181f and the rear door 181b are switched to the closed state and the vehicle height of the communication seat-type vehicle 101 is changed to the height in the running, in response to the pressing of the close button 183e. The open buttons 183a and 183b provided on the outer surfaces of the front door 181f and the rear door 181b may be pressed by a pedestrian, etc. in the external space of the communication seat-type vehicle 101. The open buttons 183c and 183d on the inner surfaces of the front door 181f and the rear door 181b and the close button 183e on the inner cover 179 may be pressed by a passenger inside the cabin space 112. When a human, etc. is no longer detected by a sensor or when a predetermined time elapses after one of the open buttons 183c and 183d provided on the inner surfaces of the front door 181f and the rear door 181b is pressed, the front door 181f and the rear door 181b are automatically switched to the closed state.

As shown in FIG. 4 and FIG. 6, the communication seat-type vehicle 101 includes visors 184. The visors 184 are provided at the upper edges of the left window 177lo and the right window 177ro on the vehicle outer surface. Alternatively, the visors 184 may be provided at positions directly above the left window 177lo and the right window 177ro on the vehicle outer surface.

As shown in FIG. 7 and FIG. 8, the floor deck 178 is provided below the roof cover 176. The floor deck 178 constitute a floor portion in the vehicle internal portion. A foot of a passenger, a wheelchair, and a luggage are placed on the floor deck 178.

The inner cover 179 is provided below the roof cover 176. The inner cover 179 constitutes a wall portion in the vehicle internal portion. The inner cover 179 is provided above the floor deck 178 and is connected to the floor deck 178. The control panel 109 is provided on the inner cover 179 and directly above the right window 170ro. The inner cover 179 is provided with two trays (luggage decks) 179a. The two luggage decks 179a include a front luggage deck 179af and a rear luggage deck 179ar. The front luggage deck 179af is provided above the front seat 121f. The front luggage deck 179af is provided forward of the front back-rest 122f and rearward of the front cover window 171fo. The rear luggage deck 179ar is provided above the rear seat 121r. The rear luggage deck 179ar is provided rearward of the rear back-rest 122r and forward of the rear cover window 171bo. The front luggage deck 179af is a front luggage deck in which a front storage space is formed above the upper surface. The rear luggage deck 179ar is a rear luggage deck in which a rear storage space is formed above the upper surface. The front storage space and the rear storage space are spaces in the vehicle internal portion. A luggage of a passenger, etc. can be placed on the two luggage decks 179a.

In the vehicle internal portion, the vehicle body cover 170 constitutes the cabin space 112 in which passengers are accommodated. The vehicle body cover 170 includes a front wall and a rear wall. The front wall is a front surface of an outer wall which is at a front end portion of the communication seat-type vehicle 1 in the vehicle front-rear direction. The rear wall is a rear surface of an outer wall which is at a rear end portion of the communication seat-type vehicle 1 in the vehicle front-rear direction. In the vehicle internal portion, moreover, the door 181 and the communication seats 120 constitute the cabin space 112 in which passengers are accommodated. To be more specific, the cabin space 112 is constituted in the vehicle internal portion by the vehicle body cover 170 and the door 181. In the vehicle internal portion, the cabin space 112 includes a space which is rearward of the front back-rest 122f of the communication seat 120 and forward of the rear back-rest 122r of the communication seat 120. In the vehicle internal portion, the cabin space 112 includes a space above the two luggage decks 179a.

An upper portion 110a of the communication seat-type vehicle 101 is the uppermost portion when the communication seat-type vehicle 101 is equally divided into three portions in the vehicle up-down direction. An intermediate portion 110b of the communication seat-type vehicle 101 is the middle portion when the communication seat-type vehicle 101 is equally divided into three portions in the vehicle up-down direction. A lower portion 110c of the communication seat-type vehicle 101 is the lowermost portion when the communication seat-type vehicle 101 is equally divided into three portions in the vehicle up-down direction. In FIG. 4, linear lines L121 and L122 are shown as linear lines equally dividing the communication seat-type vehicle 101 into three portions in the vehicle up-down direction. The linear lines L121 and L122 are linear lines which are orthogonal to the vehicle up-down direction and parallel to the vehicle front-rear direction. The linear line L121 is directly above the linear line L122 in the vehicle up-down direction. In the vehicle up-down direction, the communication seat-type vehicle 101 is divided into three portions, i.e., the upper portion 110a, the intermediate portion 110b, and the lower portion 110c, by a plane passing through the linear line L121 and a plane passing through the linear line L122.

The communication seat-type vehicle 101 is arranged such that, in the vehicle front-rear direction, the upper portion 110a is shorter than the lower portion 110c and the intermediate portion 110b is longer than the upper portion 110a. The cabin space 112 is formed so that the front end of the cabin space 112 at the vehicle upper portion 110a is forward of the front end of the cabin space 112 at the vehicle intermediate portion 110b. The cabin space 112 is formed so that the rear end of the cabin space 112 at the vehicle upper portion 110a is rearward of the rear end of the cabin space 112 at the vehicle intermediate portion 110b.

Figure 9:
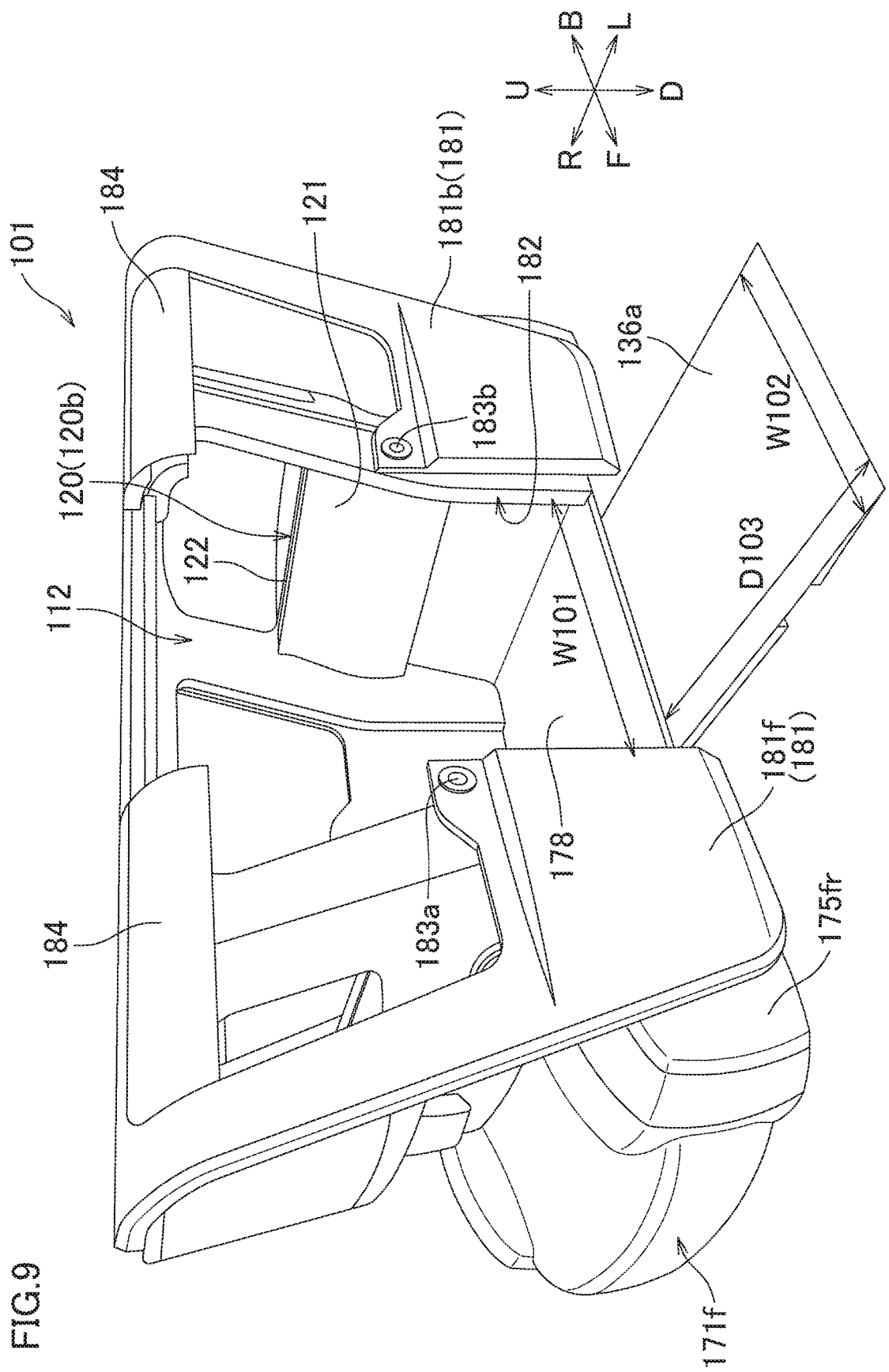
FIG. 9 is a perspective view of the communication seat-type vehicle of Specific Example 1.

As shown in FIG. 4, FIG. 7, and FIG. 9, the communication seat-type vehicle 101 includes a slope member 136a. When the communication seat-type vehicle 101 is running, the slope member 136a is stored at a position which is in the cabin space 112 and is to the right of the door 181 in the vehicle left-right direction. To be more specific, the slope member 136a is constituted by two plate members which are aligned in the vehicle front-rear direction. When the slope member 136a is in the storage state, the two plate members of the slope member 136a are provided along the inner surfaces of the front door 181f and the rear door 181b. Each plate member may be folded in two, for example, and provided along the inner surface of the door 181. When the open button 183b or the open button 183d is pressed while the communication seat-type vehicle 101 is in a stopped state, the slope member 136a is switched from the storage state (not illustrated) to an in-use state shown in FIG. 9. The slope member 136a in the in-use state obliquely extends from the doorway 182 to the ground. In other words, in the slope member 136a in the in-use state shown in FIG. 9, a left end portion in the vehicle left-right direction is on the ground. The slope member 136a in the in-use state shown in FIG. 9 is provided at the doorway 182 so that a right end portion in the vehicle left-right direction is at the same height as the floor deck 178. In this connection, the communication seat-type vehicle 101 is controlled so that its vehicle height is lower than the vehicle height when the vehicle is running. In other words, the doorway 182 of the communication seat-type vehicle 101 is controlled so that its height is lower than the height when the vehicle is running. This allows a passenger, a cart, a wheelchair, etc. to be easily get in or out from the vehicle. When the close button 183e is pressed while the slope member 136a is in the in-use state shown in FIG. 9, the slope member 136a is switched from the in-use state shown in FIG. 9 to the storage state. In this connection, the communication seat-type vehicle 101 is controlled so that its vehicle height is identical with the vehicle height when the vehicle is running. In other words, the doorway 182 of the communication seat-type vehicle 101 is controlled so that its height is identical with the height when the vehicle is running. When the open button 183a or the open button 183c is pressed, the two plate members constituting the slope member 136a are slid in the vehicle front-rear direction together with the front door 181f and the rear door 181b. When the close button 183e is pressed while the slope member 136a is in the storage state, the two plate members constituting the slope member 136a are slid in the vehicle front-rear direction together with the front door 181f and the rear door 181b. The slope member 136a is used for bridging the level difference between the floor deck 178 and the ground. The slope member 136a allows a passenger, a cart, a wheelchair, etc. to be easily get in or out from the vehicle. The width W102 of the slope member 136a is identical with or shorter than the width W101 of the doorway 182. The width W102 of the slope member 136a is preferably identical with the width W101 of the doorway 182. This is because, when the slope member 136a is wide, a passenger, a cart, a wheelchair, etc. can smoothly get in or out from the vehicle. Preferably, a protrusion is formed at each end portion in the width direction of the slope member 136a and each end portion of the slope member 136a is L-shaped. This is because a, a cart, a wheelchair, etc. can be guided when getting in or getting out from the vehicle. Projections are preferably formed on the upper surface of the slope member 136a for the purpose of preventing slippage. This allows a passenger, a cart, a wheelchair, etc. to smoothly get in or out from the vehicle. As shown in FIG. 9, when the communication seat-type vehicle 101 is in the stopped state and a passenger, a cart, a wheelchair, etc. gets in or out from the vehicle, the seats 121 are preferably in the storage state. With this arrangement, the cabin space 112 is roomy and a passenger, a cart, a wheelchair, etc. can smoothly get in or out from the vehicle.

In addition to the effects of the communication seat-type vehicle 1C of the above-described Embodiment 3 of the present teaching, the communication seat-type vehicle 101 of Specific Example 1 of the embodiment of the present teaching exerts the following effects.

In the communication seat-type vehicle 101, the upper portion of the vehicle body frame 130 is at least partially covered with the vehicle body cover 170, and hence entrance of rain, wind, etc. into the cabin space 112 is prevented. This allows passengers to easily get in and off from the communication seat-type vehicle 101. This arrangement makes it possible to improve easiness of getting in and out from the vehicle, while securing the rigidity of the vehicle body frame 130.

The communication seat-type vehicle 101 further includes the vehicle body cover 170 which at least partially covers the vehicle body frame 130. The vehicle body cover 170 has the doorway 182 provided at the left portion in the vehicle left-right direction. Because the length in the vehicle front-rear direction of the ceiling frame 131 is arranged to be longer than the length in the vehicle front-rear direction of the floor frame 136, the degree of freedom in determining the width of the upper portion of the doorway 182 which is formed at one or both of the left portion and the right portion in the vehicle left-right direction is high, as compared to a vehicle in which the length in the front-rear direction of the ceiling frame is identical with the length in the front-rear direction of the floor frame 136. It is therefore possible to arrange the doorway 182 to have width with which a wheelchair, etc. is able to easily get in and out from the vehicle. This arrangement makes it possible to improve easiness of getting in and out from the vehicle, while securing the rigidity of the vehicle body frame 130.

The communication seat-type vehicle 101 has the door 181 by which the doorway 182 can be opened and closed. Because in the communication seat-type vehicle 101 of the present teaching the ceiling frame 131 is long in the vehicle front-rear direction, the width of the doorway 182 can be arranged to have width with which passengers can easily get in and out from the vehicle, even when the door 181 is provided to be able to open and close the doorway 182. This arrangement makes it possible to improve easiness of getting in and out from the vehicle, while securing the rigidity of the vehicle body frame 130.

In addition to the above, the door 181 is a sliding door. The door 181 is slidable along the vehicle outer surface in the vehicle front-rear direction. With this arrangement, the door 181 is less likely to obstruct passengers inside and outside the cabin space 112 after the door 181 is opened. This allows passengers to easily get in and off from the communication seat-type vehicle 101.

As the wheels 103 are rotated in reverse, the traveling direction of the communication seat-type vehicle 101 can be switched to rearward in the vehicle front-rear direction. The vehicle body cover 170 of the communication seat-type vehicle 101 is shaped to be symmetrical with respect to the vehicle front-rear direction. The vehicle body frame 130 is shaped to be symmetrical with respect to the vehicle front-rear direction. This arrangement makes it possible to improve easiness of getting in and out from the vehicle while securing the rigidity of the vehicle body frame 130, even after the traveling direction is changed to rearward in the vehicle front-rear direction.

The communication seats 120 include seat portions 121*a* on which passengers are seated. The seats 121 are formed to be able to constitute seat portions 121*a* in the cabin space 112. Each of the seats 121 is swingable between a seating state in which the seat portion 121*a* is constituted and a storage state in which the seat portion 121*a* is not constituted. Each seat 121 is arranged to be swingable relative to the back-rest 122 which constitutes the back-rest portion 122*a*. When each seat 121 is in the storage state, the seat 121 is swung so that the seat 121 and the back-rest 122 face each other. In this way, if the seats 121 do not constitute the seat portions 121*a* when a passenger gets in or out from the cabin space 112, the cabin space 112 is roomy when the passenger gets in or out from the cabin space 112. The easiness of getting in and out from the vehicle is therefore further improved.

The communication seats 120 include the back-rest portions 122*a* which are used by passengers to keep the posture. The back-rests 122 are formed in the cabin space 112 in the vehicle internal portion to be able to constitute the back-rest portions 122*a*. The back-rests 122 are therefore fixed and always constitute the back-rest portion 122*a*. When the back-rests 122 constitute the back-rest portions 122*a*, the back of each passenger is supported when seated on the communication seat 120, with the result that each passenger is able to keep posture. When, for example, a passenger gets in or out from the vehicle, another passenger does not obstruct this passenger because the another passenger who has already been seated leans on the back-rest portion 122*a*. The easiness of getting in and out from the vehicle is therefore further improved.

The front cover window 171*fo*, the rear cover window 171*bo*, the right window 177*ro*, and the left window 177*lo* are provided to allow the cabin space 112 to communicate with the external space outside the vehicle. The front cover window 171*fo*, the rear cover window 171*bo*, the right window 177*ro*, and the left window 177*lo* are arranged to allow a passenger seated on the communication seat 120 to visually recognize the external space outside the vehicle from the cabin space 112. The passenger is therefore able to see the external space. Because the passengers can easily check the surrounding environment of the communication seat-type vehicle 101, the easiness of getting in and out from the vehicle is further improved.

The doorway 182 is provided at the vehicle left portion. When the communication seat-type vehicle 101 runs at a left portion of the road in the vehicle left-right direction, an oncoming vehicle passes to the right of the communication seat-type vehicle 101. The doorway 182 can therefore be positioned to allow passengers to easily get in and out from the cabin space 112. Because passengers can smoothly get in or out from the vehicle, the easiness of getting in and out from the vehicle is further improved.

The driving source 105 and the steering mechanism 106 are automatically controlled by the automatic driving controller 108. The communication seat-type vehicle 101 is able to automatically run. It is therefore unnecessary to provide components such as a steering wheel and a pedal in the cabin space 112. The cabin space 112 is therefore roomy for the passengers, and hence the easiness of getting in and out from the vehicle is further improved.

The communication seat-type vehicle 101 includes the visors 184. The visors 184 are provided at the upper edges of the left window 177*lo* and the right window 177*ro* on the vehicle outer surface. Because the visors 184 prevent the entrance of rain or sunlight through the left window 177*lo* and the right window 177*ro*, the passengers are able to smoothing get in and out from the vehicle. The easiness of getting in and out from the vehicle is therefore further improved.

The floor frame 136 further includes the floor intermediate front frame 137*cf* and the floor intermediate rear frame 137*cb* which are the floor intermediate frame 140 extending along the vehicle left-right direction. The floor frame 136 further includes the floor intermediate right frame 138*a* and the floor intermediate left frame 139*a* which are the floor intermediate frame 140 extending along the vehicle front-rear direction. Because the floor frame 136 includes the floor intermediate frame 140, the rigidity of the floor frame 136 is improved. It is therefore possible to further increase the rigidity of the vehicle body frame 130.

The communication seat-type vehicle 101 includes the slope member 136*a*. The slope member 136*a* can be provided to obliquely extend from the doorway 182 to the ground. The slope member 136*a* is provided to connect the doorway 182 with the ground. In other words, the slope member 136*a* is provided to be oblique. Because the slope member 136*a* resolves a level difference between the doorway 182 and the ground, a passenger, a cart, a wheelchair, etc. are able to easily get in or out from the vehicle.

(Specific Example 2 of Embodiment) Specific Example 1 of the above-described embodiment of the present teaching will be described with reference to FIG. 10. It is noted that items identical with those in the embodiments of the present teaching having been described above are not explained again. Basically, Specific Example 2 of the embodiments of the present teaching encompasses all features of the embodiments and Specific Example 1 of the present teaching described above. It is noted that items identical with those of the Specific Example 1 of the embodiments of the present teaching are indicated by the same reference numerals and detailed descriptions thereof are suitably omitted.

A communication seat-type vehicle 201 of Specific Example 2 includes a front cover lower portion 271*fa* of a front cover 271*f* and a rear cover lower portion 271*ba* of a rear cover 271*b* which are different in shape from the front cover lower portion 171*fa* of the front cover 171*f* and the rear cover lower portion 171*ba* of the rear cover 171*b* of Specific Example 1 having been described above. Therefore, a front portion and a rear portion of the communication seat-type vehicle 201 are different in shape from the front portion and the rear portion of the above-described communication seat-type vehicle 101 of Specific Example 1.

Figure 10:
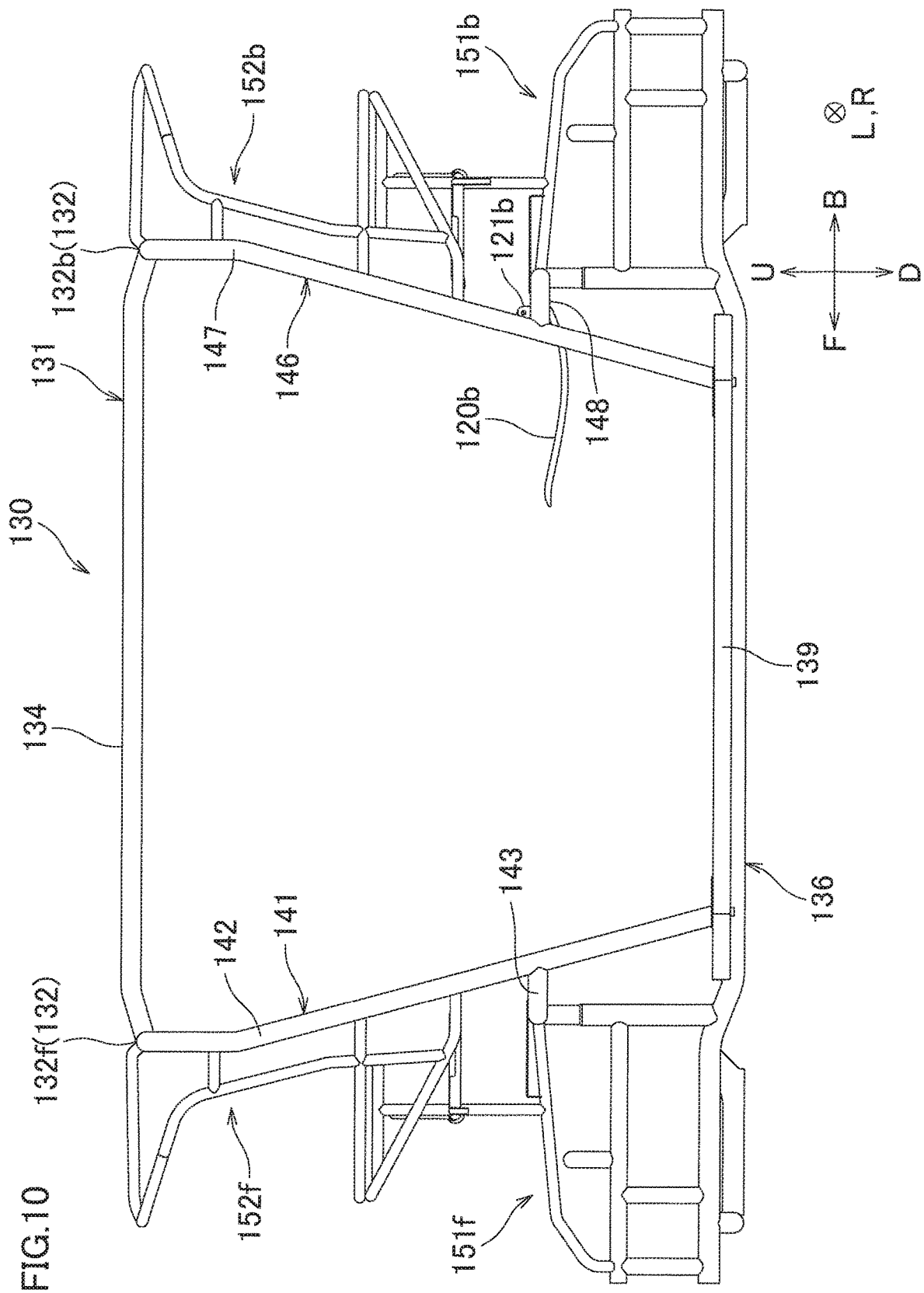
FIG. 10 is a side view of the vehicle body frame of Specific Example 1.
Figure 11:
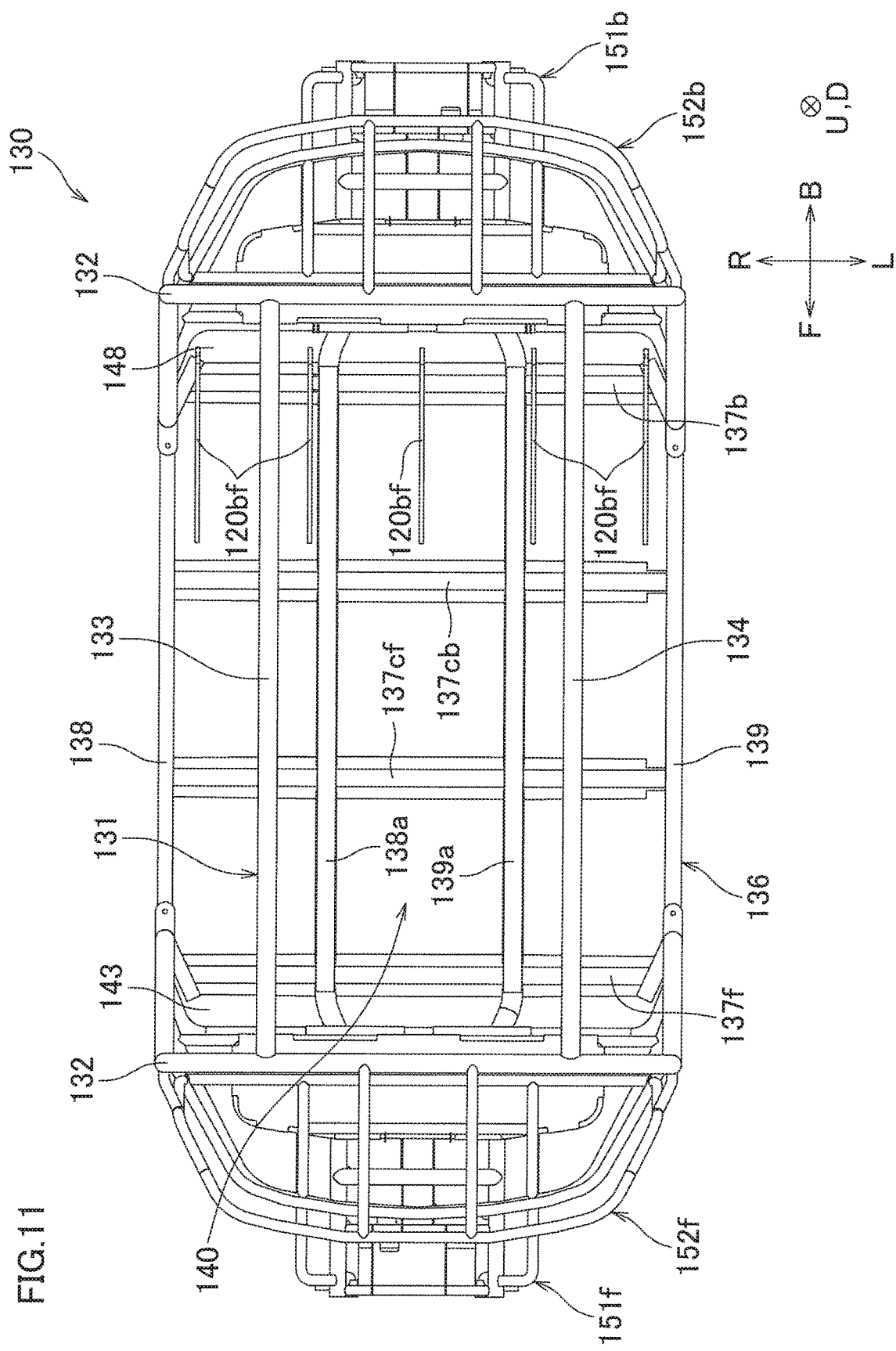
FIG. 11 is a front view of the vehicle body frame of Specific Example 1.
Figure 12:
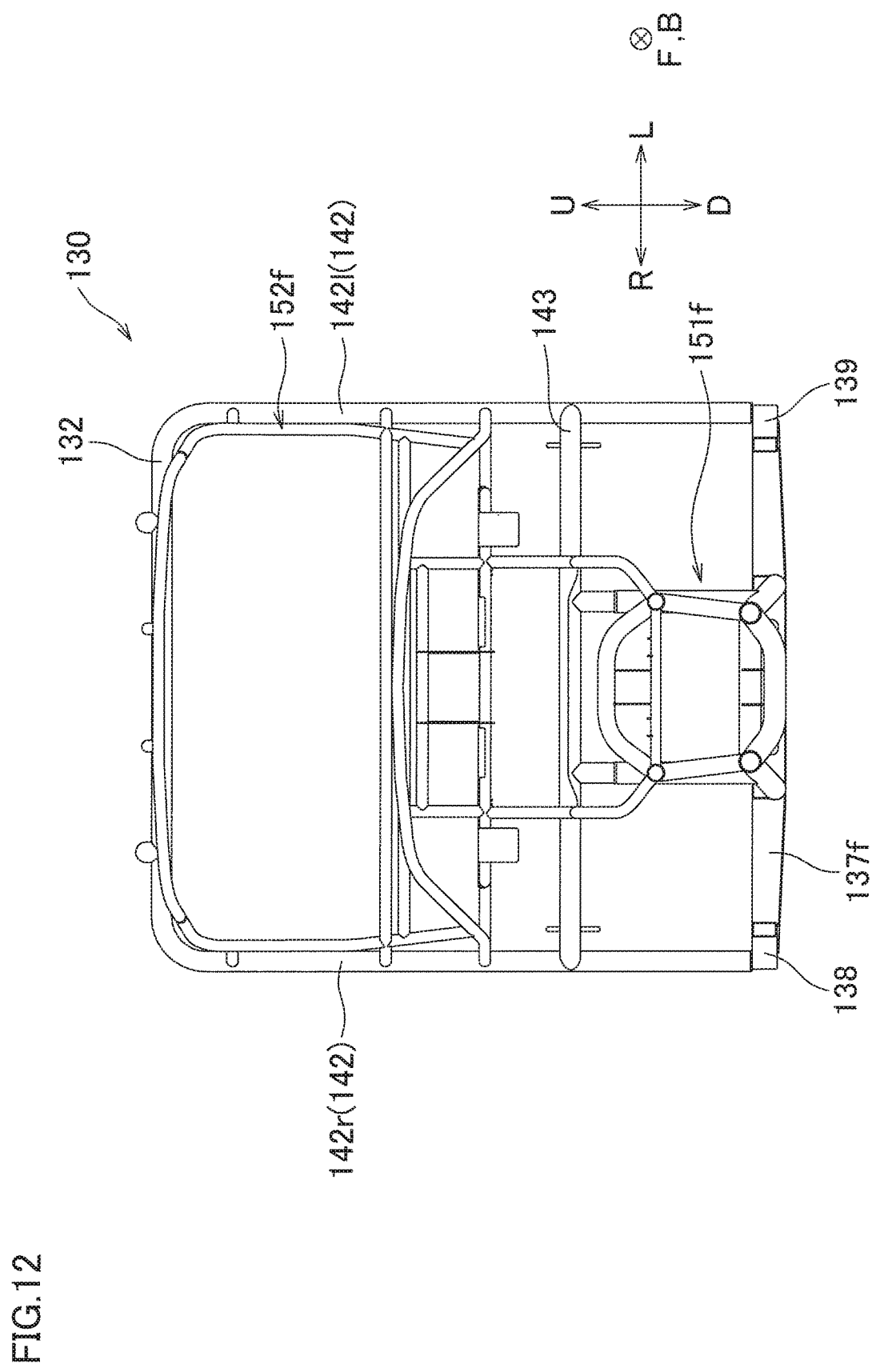
FIG. 12 is a top view of the vehicle body frame of Specific Example 1.
Figure 13:
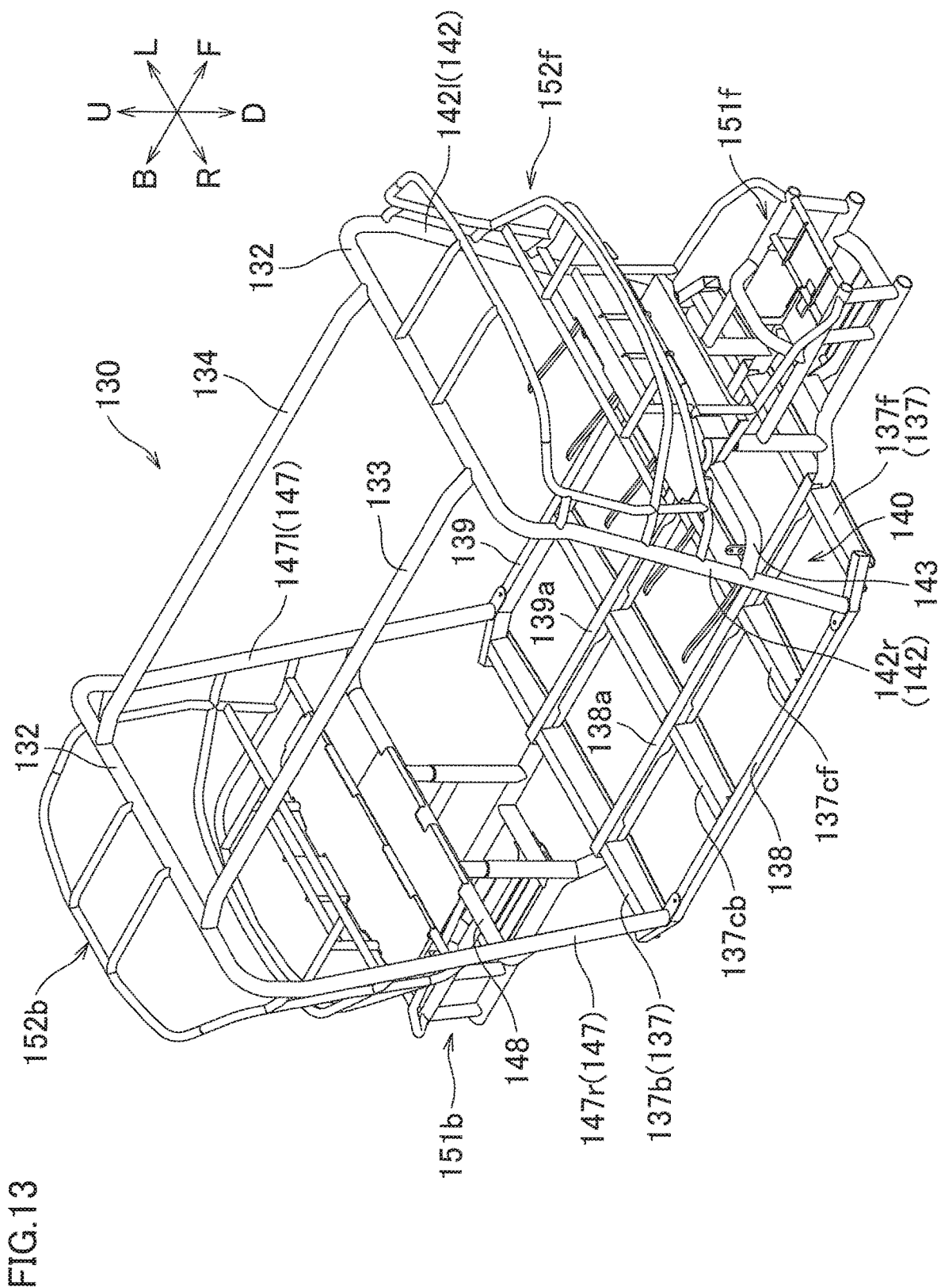
FIG. 13 is a perspective view of the vehicle body frame of Specific Example 1.
Figure 14:
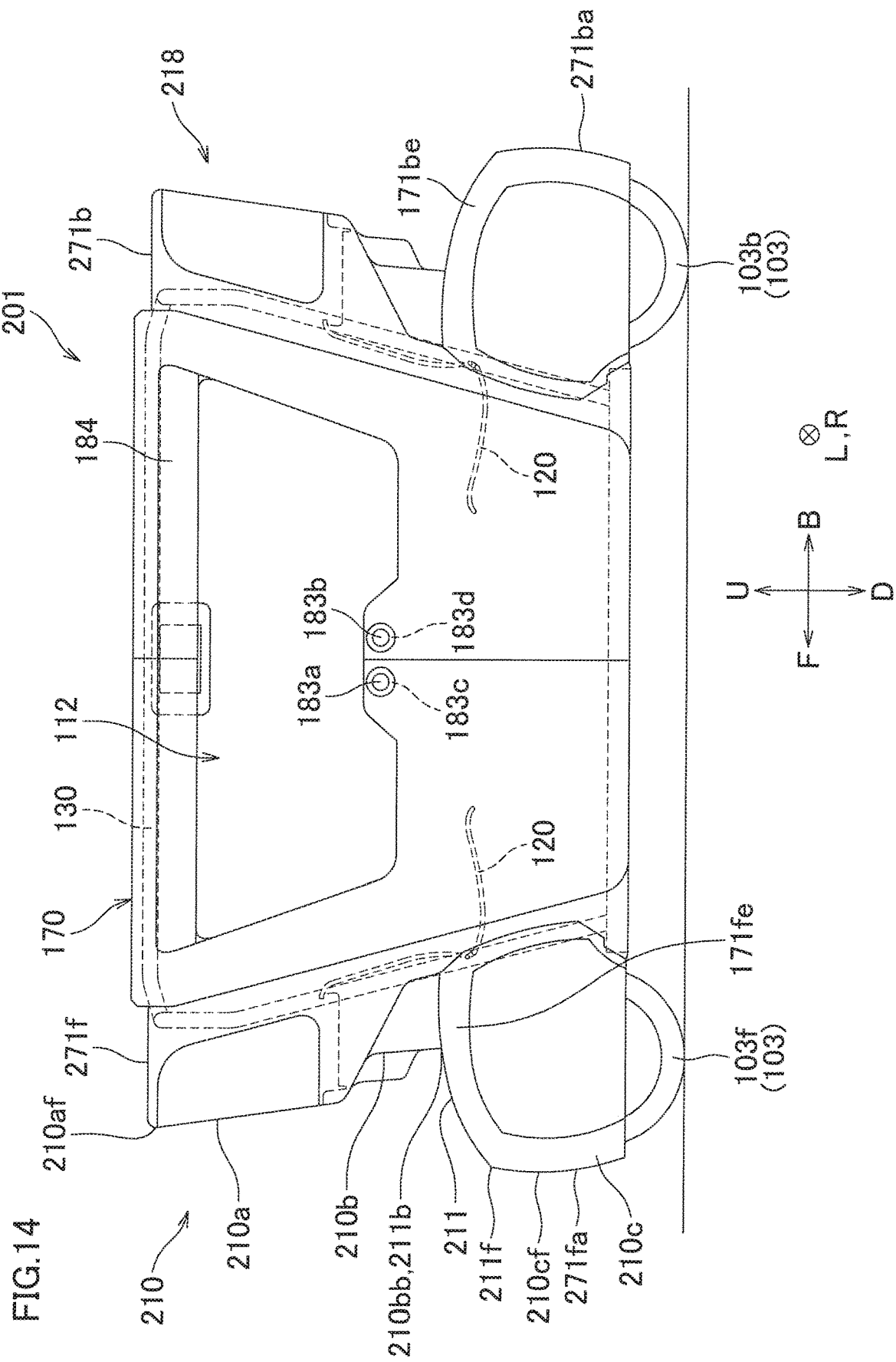
FIG. 14 is a side view of a communication seat-type vehicle of Specific Example 2.

As shown in FIG. 10, a front cover lower portion 271*fa* of a front cover 271*f* is provided in front of the two front wheels 103*f*. The front cover lower portion 271*fa* is provided along the vehicle up-down direction. The front cover lower portion 271*fa* has left and right portions which are connected to the two front wheel front cover portions 171*fe*, respectively. The front cover lower portion 271*fa* is provided between the two front wheel front cover portions 171*fe*, along the vehicle left-right direction. The front cover lower portion 271*fa* is curved so that a central portion in the vehicle left-right direction is positioned forward of left and right end portions. The front cover lower portion 271*fa* is curved so that a central portion in the vehicle up-down direction is positioned forward of upper and lower end portions. In the vehicle front-rear direction, the front end of the front cover lower portion 271*fa* is at the same position as or rearward of the front ends of the two front wheel front cover portions 171*fe*.

The rear cover lower portion 271*ba* of the rear cover 271*b* is provided behind the two rear wheels 103*b*. The rear cover lower portion 271*ba* is provided along the vehicle up-down direction. The rear cover lower portion 271*ba* has left and right portions which are connected to the two front wheel rear cover portions 171*be*, respectively. The rear cover lower portion 271*ba* is provided between the two rear wheel rear cover portions 171*be*, along the vehicle left-right direction. The rear cover lower portion 271*ba* is curved so that a central portion in the vehicle left-right direction is positioned rearward of left and right end portions. The rear cover lower portion 271*ba* is curved so that a central portion in the vehicle up-down direction is positioned rearward of upper and lower end portions. The rear end of the rear cover lower portion 271*ba* is provided at the same position as or forward of the rear ends of the two rear wheel rear cover portions 171*be* in the vehicle front-rear direction.

The communication seat-type vehicle 201 is arranged such that, in the front-rear direction, the upper portion 210*a* is shorter than the lower portion 210*c* and the intermediate portion 210*b* is longer than the upper portion 210*a*.

The shape of the rear portion of the communication seat-type vehicle 201 viewed forward in the vehicle front-rear direction is not explained because this shape is substantially identical with the shape of the front portion of the communication seat-type vehicle 201 viewed rearward in the vehicle front-rear direction.

The communication seat-type vehicle 201 of Specific Example 2 of the embodiment of the present teaching exerts the same effects as the communication seat-type vehicle 101 of the above-described Specific Example 1 of the embodiment of the present teaching.

The present teaching is not limited to the above-described embodiment, and various changes can be made within the scope of the claims. The following describes modifications of the embodiment of the present teaching.

In the specific examples of the present teaching, the driving source drives the two rear wheels. Alternatively, the driving source of the present teaching may drive the two front wheels. Alternatively, the driving source of the present teaching may drive at least two of the wheels. In the specific examples of the present teaching, the driving source is a driving motor including an electric motor and a battery. Alternatively, the driving source of the present teaching may be an engine using gasoline, etc.

In the specific examples of the present teaching, the brake mechanism is constituted by the disc brake device. Alternatively, the brake mechanism of the present teaching may be a combination of a regenerative brake using a driving motor and the disc brake device. Alternatively, the brake mechanism of the present teaching may be constituted by a drum brake device, etc.

In the specific examples of the present teaching, the steering mechanism steers the two front wheels to control the traveling direction of the communication seat-type vehicle. Alternatively, the steering mechanism of the present teaching may steer the two rear wheels to control the traveling direction of the communication seat-type vehicle. Alternatively, the steering mechanism of the present teaching may steer at least two of the wheels to control the traveling direction of the communication seat-type vehicle.

In the embodiments and the specific examples of the present teaching, the communication seats include two arrays of seat assemblies (the front seat assembly and the rear seat assembly). In this regard, the communication seats of the present teaching may be variously arranged on condition that passengers can be seated at locations where the passengers are able to talk face-to-face with one another. The communication seats of the present teaching may be variously arranged on condition that at least two of the rear seat assembly, the front seat assembly, a right seat assembly, and a left seat assembly are included. The right seat assembly is a seat assembly on which a seated passenger faces in the vehicle leftward direction. The left seat assembly is a seat assembly on which a seated passenger faces in the vehicle rightward direction. The communication seats may include an L-shaped seat assembly which is constituted by a combination of the front seat assembly and the right seat assembly, a combination of the front seat assembly and the left seat assembly, a combination of the rear seat assembly and the right seat assembly, or a combination of the rear seat assembly and the left seat assembly. The communication seats may include a U-shaped seat assembly which is constituted by a combination of the front seat assembly, the right seat assembly, and the left seat assembly, a combination of the front seat assembly, the left seat assembly, and the rear seat assembly, a combination of the rear seat assembly, the right seat assembly, and the front seat assembly, or a combination of the rear seat assembly, the right seat assembly, and the front seat assembly. The communication seats may include a quadrangular seat assembly which is constituted by all of the rear seat assembly, the front seat assembly, the right seat assembly, and the left seat assembly.

In the embodiments and the specific examples of the present teaching, each communication seat includes the back-rest portion which is used by a passenger to keep the posture. Alternatively, the communication seat may not include the back-rest portion.

In the specific examples of the present teaching, the steering mechanism is controlled by the automatic driving controller. Alternatively, the steering mechanism of the present teaching may include a steering wheel, and the mechanism may be controlled by a passenger operating the steering wheel. The steering wheel may be formed of a circular member and rotationally operated by a passenger, or may be formed of a lever and tilted by a passenger to input the direction. The communication seat-type vehicle of the present teaching may be switchable between an automatic driving mode and a manual driving mode. In the automatic driving mode, the steering mechanism is controlled by the automatic driving controller. In the manual driving mode, the steering mechanism is controlled by a passenger operating the steering wheel. The steering mechanism may include an attachable and detachable steering wheel. The steering wheel may be attached when the vehicle is driven in the manual driving mode, and the steering wheel may be detached when the vehicle is driven in the automatic driving mode.

In the specific examples of the present teaching, the driving source and the brake mechanism are controlled by the automatic driving controller. Alternatively, the communication seat-type vehicle of the present teaching may include an accelerator pedal, a brake pedal, and a clutch pedal. The driving source may be controlled by a passenger operating the accelerator pedal or the clutch pedal. The clutch pedal may be omitted. The brake mechanism may be controlled by a passenger operating the brake pedal. The communication seat-type vehicle of the present teaching may be switchable between an automatic driving mode and a manual driving mode. In the automatic driving mode, the running of the communication seat-type vehicle is controlled by the automatic driving controller. In the manual driving mode, the running of the communication seat-type vehicle is controlled by a passenger operating the accelerator pedal and the brake pedal.

In the specific examples of the present teaching, the rotational shaft of the seat is, for example, made of an elastic member. With this arrangement, when the seat in the seating state is manually lifted up at a predetermined angle, the seat is switched to the storage state due to the elastic force of the elastic member. Alternatively, the rotational shaft of the seat of the present teaching may be stoppable at a desired position between the seating state and the storage state. Alternatively, the seat may be normally in the storage state due to the elastic member, and may be manually swung to the seating state when a passenger is seated on the seat.

In the specific examples of the present teaching, the seat is swingable between the seating state in which the seat portion is formed and the storage state in which the seat portion is not formed. Alternatively, the seat of the present teaching may be fixed and always constitute the seat portion on which a passenger is seated. To put it differently, the seat of the present teaching may not be switchable to the storage state in which the seat portion is not constituted.

In the specific examples of the present teaching, the seat is swingable between the seating state in which the seat portion is formed and the storage state in which the seat portion is not formed. Alternatively, the seat of the present teaching may be detachable and switchable from the seating state in which the seat portion is formed to a detached state in which the seat portion is not formed.

In the specific examples of the present teaching, the back-rest is fixed to the vehicle body frame. Alternatively, the communication seat-type vehicle of the present teaching may further include a storage space which is in the vehicle internal portion and outside the cabin space. The back-rest of the present teaching may be arranged to open and close the storage space. For example, as indicated by two-dot chain lines in FIG. 4, the communication seat-type vehicle 101 may include two storage spaces 123 (a front storage space 123$f$ and a rear storage space 123$r$). The front storage space 123$f$ is constituted by the front luggage deck 123$fd$. In the vehicle front-rear direction, the front luggage deck 123$fd$ is provided partially forward of the front end of the front back-rest 122$f$ of the front seat assembly 120$f$. The front luggage deck 123$fd$ is provided below the front luggage deck 179$af$ in the vehicle up-down direction. The rear storage space 123$r$ is constituted by the rear luggage deck 123$rd$. In the vehicle front-rear direction, the rear luggage deck 123$rd$ is provided partially rearward of the rear end of the rear back-rest 122$r$ of the rear seat assembly 120$b$. The rear luggage deck 123$rd$ is provided below the rear luggage deck 179$ar$ in the vehicle up-down direction. The back-rest of the present teaching may be arranged to open and close the storage space, e.g., as in the back-rest 122 shown in FIG. 4. In other words, the area of the back-rest is changeable when viewed in the vehicle front-rear direction. Alternatively, for example, the area of the back-rest when viewed in the vehicle front-rear direction is changeable between a posture keeping state and a storage state in which the passenger cannot keep the posture. When the back-rest is in the posture keeping state, the area of the back-rest is maximized when viewed in the vehicle front-rear direction. When the back-rest is in the storage state, the area of the back-rest when viewed in the vehicle front-rear direction is small as compared to the case where the back-rest is in the posture keeping state. When the back-rest is in the storage state, the rest is swung so that the back-rest faces the seat. Alternatively, for example, the back-rest is formed to be detachable and switchable from the posture keeping state or the storage state to a detached state in which the back-rest is detached. When the back-rest is in the detached state, the area of the back-rest is minimized to 0 when viewed in the vehicle front-rear direction. The back-rest is formed to be switchable between a closed state in which the front storage space or the rear storage space is closed and an open state in which the front storage space or the rear storage space is open. The back-rest is arranged to be swingable relative to the seat which constitutes the seat portion. When the back-rest is in the open state, the back-rest is swung and the storage space is open. When the back-rest in the open state is swung to be in the closed state, the storage space is closed. Alternatively, the back-rest may be detachable and switchable from the closed state in which the back-rest portion is formed to the open state in which the back-rest portion is not formed. To be more specific, when the back-rest is in the open state, the back-rest is detached and the storage space is open. When the back-rest is in the open state, the back-rest is attached and the storage space is closed. When the back-rest is in the open state, a passenger is allowed to utilize the storage space and store a luggage, etc. in the storage space. As compared to a case where a luggage, etc. of a passenger is placed in the cabin space, a space which can be used by passengers getting in or out is large in the cabin space. It becomes easy for passengers to get in and out from the vehicle. The communication seat-type vehicle of the present teaching may include both a back-rest which is able to open and close the front storage space and a back-rest which is able to open and close the rear storage space. Only either the front storage space or the rear storage space may be provided as the storage space. In the vehicle internal portion, storage spaces may be provided not only at the vehicle front portion and the vehicle rear portion but also at the vehicle right portion or the vehicle left portion. The storage space may not be configured to be opened/closed by the back-rest.

In the specific examples of the present teaching, the automatic driving controller is arranged to be able to communicate with the control panel and receive various types of signals from the control panel. Alternatively, the control panel of the present teaching may be a terminal with a computer, e.g., a tablet terminal or a portable terminal. The terminal may be provided in the vehicle internal portion of the communication seat-type vehicle or outside the communication seat-type vehicle.

In the specific examples of the present teaching, the automatic driving controller is arranged to be able to communicate with the terminal and receive various types of signals from the terminal. Alternatively, the automatic-controlled vehicle of the present teaching may not be able to communicate with a terminal. In such a case, for example, the automatic driving controller may store commands to be output to the driving source, the steering mechanism, and the brake mechanism in advance, in association with information related to a location of the vehicle.

In the specific examples of the present teaching, the communication seat-type vehicle includes the emergency button. Alternatively, the communication seat-type vehicle of the present teaching may not include the emergency button.

In the specific examples of the present teaching, the communication seat-type vehicle includes the vehicle body cover. Alternatively, the communication seat-type vehicle of the present teaching may not include the vehicle body cover.

In the specific examples of the present teaching, the communication seat-type vehicle includes the door. Alternatively, the communication seat-type vehicle of the present teaching may not include the door.

In the specific examples of the present teaching, the door is a sliding door. Alternatively, the door of the present teaching may be a hinged door, a swing door, a glide slide door, etc.

In the specific examples of the present teaching, the communication seat-type vehicle includes two open buttons provided on the outer surface of the door and two open buttons provided on the inner surface of the door. Alternatively, the open button of the present teaching may be provided on the outer surface of the vehicle body cover, which is not the door. Likewise, the open button of the present teaching may be provided on the inner surface of the vehicle body cover, which is not the door. The communication seat-type vehicle of the present teaching may include five or more open buttons. The communication seat-type vehicle of the present teaching may include only one open button, two open buttons, or three open buttons. In the specific examples of the present teaching, one close button is provided on the vehicle inner surface. Alternatively, the number of the close buttons in the present teaching may be two or more. The door of the present teaching may be opened and closed by a passenger operating the control panel or another portable terminal. The communication seat-type vehicle of the present teaching may not include an open button or a close button. The door of the present teaching may be opened and closed without being operated by a passenger. For example, the door may be switched to the open state by the automatic driving controller when the communication seat-type vehicle does not run. The door may be switched to the closed state by the automatic driving controller when the communication seat-type vehicle is running.

In the specific examples of the present teaching, the open buttons include the open button for general passengers and the open button for special passengers. Alternatively, the communication seat-type vehicle of the present teaching may include only the open button for general passengers. In this case, the communication seat-type vehicle of the present teaching may not include the slope. The communication seat-type vehicle of the present teaching may be arranged not to change the vehicle height from the vehicle height when the vehicle is running, even when any of the open buttons is pressed. The communication seat-type vehicle of the present teaching may include only the open button for special passengers.

In the specific examples of the present teaching, the slope member is stored along the inner surface of the door when the communication seat-type vehicle is running. Alternatively, the slope member of the present teaching may be stored below the floor frame along the floor frame. In this case, the depth of the slope member is identical with or shorter than the length of the floor frame in the vehicle left-right direction. With this arrangement, the slope member stored below the floor frame does not obstruct the running of the communication seat-type vehicle. The height of the protrusion of the slope member is shorter than the length between the floor frame and the ground. This allows the slope member to be stored below the floor frame.

In the specific examples of the present teaching, the communication seat-type vehicle includes visors. Alternatively, the communication seat-type vehicle of the present teaching may not include the visors.

In the specific examples of the present teaching, the doorway is formed at a left portion in the vehicle left-right direction of the vehicle body cover. Alternatively, the communication seat-type vehicle of the present teaching may be arranged such that the doorway is formed at one or more of the front portion and the rear portion in the vehicle front-rear direction and the left portion and the right portion in the vehicle left-right direction of the vehicle body cover. When the communication seat-type vehicle runs at a right portion of the road in the vehicle left-right direction, an oncoming vehicle passes to the left of the communication seat-type vehicle. In this case, the doorway is preferably formed at the right portion in the vehicle left-right direction of the vehicle body cover to allow passengers to easily get in and out from the cabin space. Meanwhile, when, for example, the communication seat-type vehicle runs on a narrow road, it may be difficult to get in and out from the communication seat-type vehicle in the vehicle left-right direction. In this case, the doorway is preferably formed at one or both of the front portion and the rear portion in the vehicle front-rear direction of the vehicle body cover, in order to allow passengers to easily get in and out from the cabin space.

In the embodiment and the specific examples of the present teaching, the traveling direction of the communication seat-type vehicle can be changed to rearward in the vehicle front-rear direction. To put it differently, the communication seat-type vehicle is a vehicle which is able to change the traveling direction by rotating the wheels in reverse. In the specific examples of the present teaching, in the vehicle body frame, the shape of the front portion viewed rearward in the vehicle front-rear direction is identical with the shape of the rear portion viewed forward in the vehicle front-rear direction. In the specific examples of the present teaching, the vehicle body frame is formed to be plane symmetrical with respect to a plane which passes between the front end and the rear end of the vehicle body frame in the vehicle front-rear direction and is perpendicular to the vehicle front-rear direction. In this regard, in the vehicle body frame of the present teaching, the shape of the front portion viewed rearward in the vehicle front-rear direction may not be identical with the shape of the rear portion viewed forward in the vehicle front-rear direction. In the present teaching, the plane perpendicular to the vehicle front-rear direction may not pass through the center of the vehicle body cover in the vehicle front-rear direction, as long as the plane passes between the front end and the rear end of the vehicle body frame in the vehicle front-rear direction. In the specific examples of the present teaching, the communication seat-type vehicle is formed to be plane symmetrical with respect to a plane which passes through the center in the vehicle front-rear direction of the vehicle and is perpendicular to the vehicle front-rear direction. In this regard, in the present teaching, the plane perpendicular to the vehicle front-rear direction may not pass through the center of the communication seat-type vehicle in the vehicle front-rear direction as long as the plane passes between the front end and the rear end of the communication seat-type vehicle in the vehicle front-rear direction. The vehicle body frame may not be formed to be plane symmetrical with respect to the plane which passes between the front end and the rear end of the vehicle body frame in the vehicle front-rear direction and is perpendicular to the vehicle front-rear direction.

In the specific example of the embodiment of the present teaching, the ceiling front frame and the ceiling rear frame are provided to be parallel to each other. The ceiling front frame and the ceiling rear frame may not be parallel to each other, as long as each frame is provided to extend along the vehicle left-right direction. In the specific example of the embodiments of the present teaching, the ceiling right frame and the ceiling left frame are provided to be parallel to each other. The ceiling right frame and the ceiling left frame may not be parallel to each other, as long as each frame is provided to extend along the vehicle front-rear direction.

In the specific examples of the embodiments of the present teaching, the floor front frame and the floor rear frame are provided to be parallel to each other. The floor front frame and the floor rear frame may not be parallel to each other, as long as each frame is provided to extend along the vehicle left-right direction. In the specific examples of the embodiments of the present teaching, the floor right frame and the floor left frame are provided to be parallel to each other. The floor right frame and the floor left frame may not be parallel to each other, as long as each frame is provided to extend along the vehicle front-rear direction.

In the specific examples of the embodiments of the present teaching, the floor intermediate front frame and the floor intermediate rear frame are provided to be parallel to each other. The floor intermediate front frame and the floor intermediate rear frame may not be parallel to each other, as long as each frame is provided to extend along the vehicle left-right direction. The vehicle body frame may not include at least one of the floor intermediate front frame or the floor intermediate rear frame. In the specific examples of the embodiments of the present teaching, the floor intermediate right frame and the floor intermediate left frame are provided to be parallel to each other. The floor intermediate right frame and the floor intermediate left frame may not be parallel to each other, as long as each frame is provided to extend along the vehicle front-rear direction. The vehicle body frame may not include at least one of the floor intermediate right frame or the floor intermediate left frame.

In the specific examples of the embodiments of the present teaching, the right front pillar and the left front pillar are provided to be parallel to each other. The right front pillar and the left front pillar may not be parallel to each other, as long as each pillar is provided to extend along the vehicle up-down direction. In the specific examples of the embodiments of the present teaching, the right rear pillar and the left rear pillar are provided to be parallel to each other. The right rear pillar and the left rear pillar may not be parallel to each other, as long as each pillar is provided to extend along the vehicle up-down direction.

In the embodiment and the specific examples of the present teaching, the traveling direction of the communication seat-type vehicle can be changed to rearward in the vehicle front-rear direction. To put it differently, the communication seat-type vehicle is a vehicle which is able to change the traveling direction by rotating the wheels in reverse. In the specific examples of the present teaching, the vehicle body cover of the communication seat-type vehicle is formed to be plane symmetrical with respect to a plane which passes between the front end and the rear end in the vehicle front-rear direction of the vehicle body cover and is perpendicular to the vehicle front-rear direction. When the traveling direction of the communication seat-type vehicle is changed to rearward in the vehicle front-rear direction and the communication seat-type vehicle runs, the vehicle body cover of the vehicle is preferably formed to be plane symmetrical with respect to a plane which passes between the front end and the rear end in the vehicle front-rear direction of the vehicle body cover and is perpendicular to the vehicle front-rear direction. Alternatively, when the traveling direction of the communication seat-type vehicle of the present teaching is changed to rearward in the vehicle front-rear direction and the communication seat-type vehicle runs, the vehicle body cover of the vehicle is preferably arranged such that the shape of the front portion viewed rearward in the vehicle front-rear direction is identical with the shape of the rear portion viewed forward in the vehicle front-rear direction. The traveling direction of the communication seat-type vehicle may not be changeable to rearward in the vehicle front-rear direction. In such a case, the vehicle body cover of the communication seat-type vehicle of the present teaching may not be plane symmetrical with respect to a plane which passes between the front end and the rear end in the vehicle front-rear direction of the vehicle body cover and is perpendicular to the vehicle front-rear direction, and may not be arranged such that the shape of the front portion viewed rearward in the vehicle front-rear direction is identical with the shape of the rear portion viewed forward in the vehicle front-rear direction.

Figure 15:
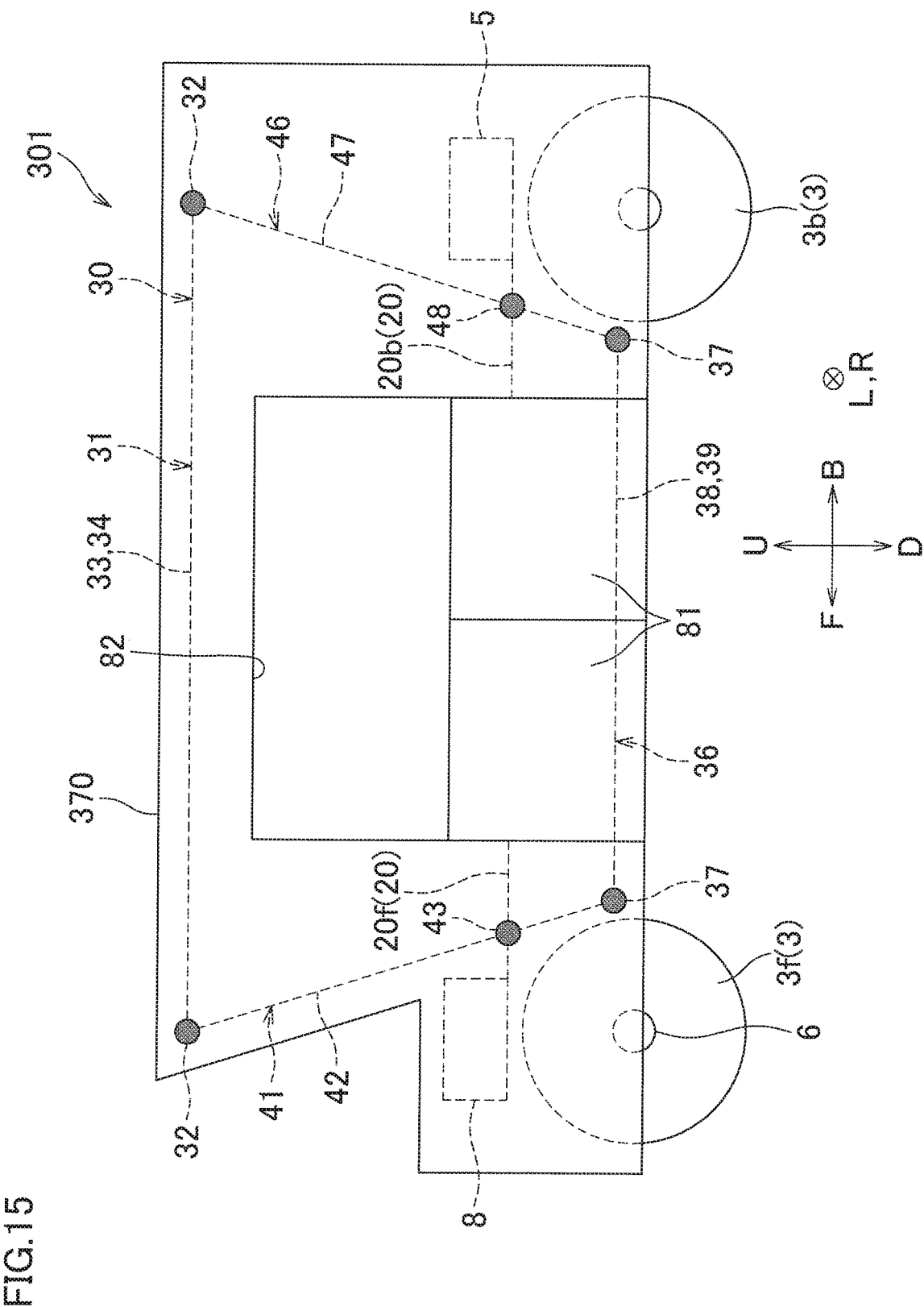
FIG. 15 is a side view of a communication seat-type vehicle of a modification.

In the embodiments and the specific examples of the present teaching, the vehicle body cover is formed to be plane symmetrical with respect to a plane which passes between the front end and the rear end in the vehicle front-rear direction of the vehicle body cover and is perpendicular to the vehicle front-rear direction. In other words, the front cover and the rear cover of the vehicle body cover are formed to be plane symmetrical with respect to the plane which passes between the front end and the rear end in the vehicle front-rear direction of the vehicle body cover and is perpendicular to the vehicle front-rear direction. In this regard, the vehicle body cover of the present teaching may not be formed to be plane symmetrical with respect to a plane which passes between the front end and the rear end in the vehicle front-rear direction of the vehicle body cover and is perpendicular to the vehicle front-rear direction. In this case, the communication seat-type vehicle is preferably not able to change the traveling direction to rearward in the vehicle front-rear direction. The vehicle body cover may be differently shaped. For example, in the vehicle body cover of the communication seat-type vehicle of the present teaching, the front portion and the rear portion may not be symmetrical in shape, or may not be identical in shape. Furthermore, for example, in the vehicle body cover of the communication seat-type vehicle of the present teaching, the right portion and the left portion may not be symmetrical in shape, or may not be identical in shape. To be more specific, the rear portion of the vehicle body cover may be box-shaped. A modification of the shape of the vehicle body cover of the communication seat-type vehicle of the present teaching will be described with reference to FIG. 15. A communication seat-type vehicle 301 shown in FIG. 15 is a modification of the communication seat-type vehicle of the embodiment shown in FIG. 3. Basically, the modification of the embodiment of the present teaching encompasses all features of the embodiment of the present teaching described above, which is shown in FIG. 3. The communication seat-type vehicle 301 shown in FIG. 15 includes a vehicle body cover 370 and a door 81 which is able to open and close a doorway 82. The vehicle body cover 370 covers the vehicle body frame 30. The vehicle body cover 370 has the doorway 82 provided at a left portion in the vehicle left-right direction. A front wall of a front portion of the vehicle body cover 370 of the communication seat-type vehicle 301 is shaped along the shape of the vehicle body frame 30. In other word, the front wall of the vehicle body cover 370 is arranged such that a front end of a vehicle lower portion is provided forward of a front end of a vehicle upper portion in the vehicle front-rear direction. The front wall of the vehicle body cover 370 is arranged such that a rear end of a vehicle intermediate portion is provided rearward of a rear end of a vehicle upper portion in the vehicle front-rear direction. A rear wall of a rear portion of the vehicle body cover 370 of the communication seat-type vehicle 301 is formed to be flat-shaped along the vehicle up-down direction.

Figure 16:
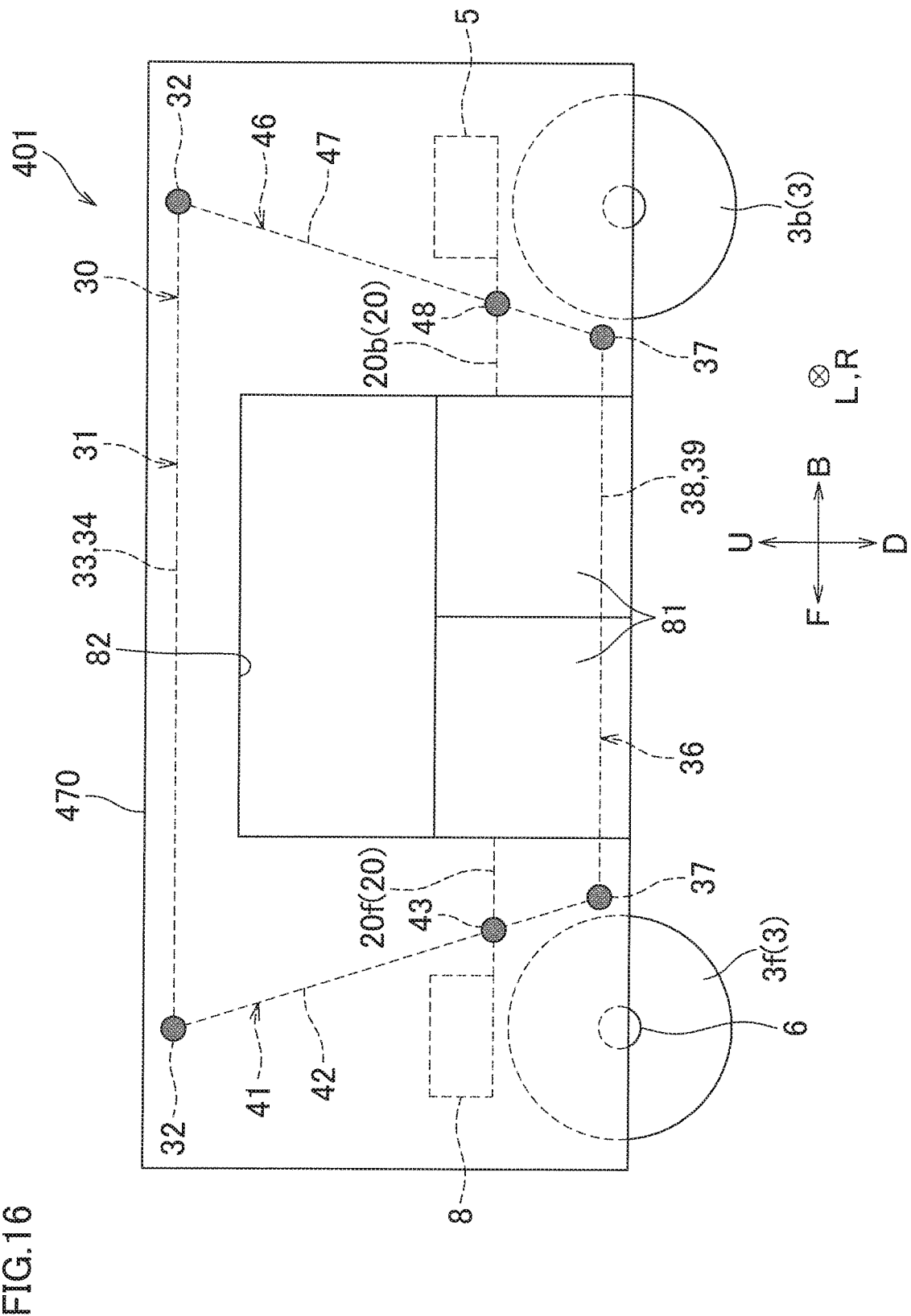
FIG. 16 is a side view of a communication seat-type vehicle of a modification.

In the embodiments and the specific examples of the present teaching, the communication seat-type vehicle is arranged such that, in the vehicle front-rear direction, the upper portion is shorter than the lower portion and the intermediate portion is longer than the upper portion. Alternatively, the communication seat-type vehicle of the present teaching may be arranged such that, in the front-rear direction, the upper portion is shorter than the lower portion and the intermediate portion is longer than the upper portion. The front portion and the rear portion in the front-rear direction of the vehicle body cover may have shapes different from the above. For example, the front portion and the rear portion in the front-rear direction of the vehicle body cover may be box-shaped. A modification of the shape of the vehicle body cover of the communication seat-type vehicle of the present teaching will be described with reference to FIG. 16. A communication seat-type vehicle 401 shown in FIG. 16 is a modification of the communication seat-type vehicle of the embodiment shown in FIG. 3. Basically, the modification of the embodiment of the present teaching encompasses all features of the embodiment of the present teaching described above, which is shown in FIG. 3. The communication seat-type vehicle 401 shown in FIG. 16 includes a vehicle body cover 470 and a door 81 which is able to open and close a doorway 82. The vehicle body cover 470 covers the vehicle body frame 30. The vehicle body cover 470 has the doorway 82 provided at a left portion in the vehicle left-right direction. A front wall of a front portion of the vehicle body cover 470 of the communication seat-type vehicle 401 and a rear wall of a rear portion of the vehicle body cover 470 are formed to be flat-shaped along the vehicle up-down direction.

In the embodiments and the specific examples of the present teaching, the vehicle body frame of the communication seat-type vehicle does not include, between two front pillars and between two rear pillars, an intermediate front pillar or an intermediate rear pillar extending along the vehicle up-down direction. In this regard, the vehicle body frame of the communication seat-type vehicle may include, between two front pillars and between two rear pillars, an intermediate front pillar or an intermediate rear pillar extending along the vehicle up-down direction. A modification of the shape of the vehicle body frame of the communication seat-type vehicle of the present teaching will be described with reference to FIG. 17 and FIG. 18.

Figure 17:
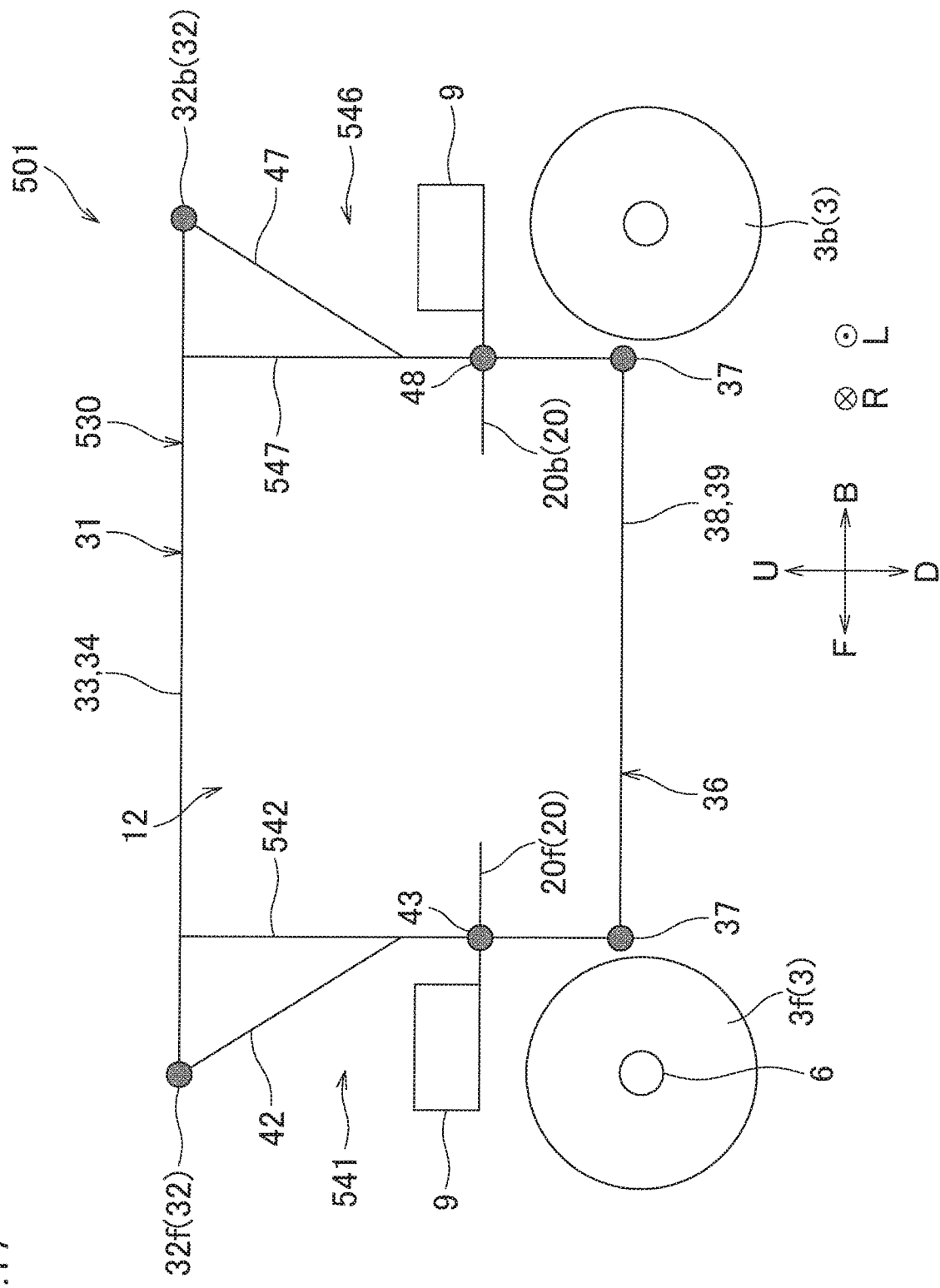
FIG. 17 is a side view of a communication seat-type vehicle of a modification.

A communication seat-type vehicle 501 shown in FIG. 17 is a modification of the communication seat-type vehicle of the embodiment shown in FIG. 3. As shown in FIG. 17, a vehicle body frame 530 includes a ceiling frame 31, a floor frame 36, a front H-shaped frame 541, and a rear H-shaped frame 546. The front H-shaped frame 541 includes two front pillars 42, two intermediate front pillars 542, and a front intermediate transverse frame 43. Each of the two intermediate front pillars 542 is provided to extend along the vehicle up-down direction. The two intermediate front pillars 542 include a left intermediate front pillar 542*l* and a right intermediate front pillar 542*r*. The left intermediate front pillar 542*l* is provided leftward of the right intermediate front pillar 542*r* in the vehicle left-right direction. The left intermediate front pillar 542*l* has an upper portion connected to the ceiling left frame 34 and a lower portion connected to the left front pillar 42*l*. The right intermediate front pillar 542*r* has an upper portion connected to the ceiling right frame 33 and a lower portion connected to the right front pillar 42*r*. The rear H-shaped frame 546 includes two rear pillars 47, two intermediate front pillars 547, and a rear intermediate transverse frame 48. Each of the two intermediate rear pillars 547 is provided to extend along the vehicle up-down direction. The two intermediate rear pillars 547 include a left intermediate rear pillar 547*l* and a right intermediate rear pillar 547*r*. The left intermediate rear pillar 547*l* is provided leftward of the right intermediate rear pillar 547*r* in the vehicle left-right direction. The left intermediate rear pillar 547*l* has an upper portion connected to the ceiling left frame 34 and a lower portion connected to the left rear pillar 47*l*. The right intermediate rear pillar 547*r* has an upper portion connected to the ceiling right frame 33 and a lower portion connected to the right rear pillar 47*r*. Because the front H-shaped frame 541 includes the two intermediate front pillars 542, the rigidity of the front H-shaped frame 541 is improved. Because the rear H-shaped frame 546 includes the two intermediate rear pillars 547, the rigidity of the rear H-shaped frame 546 is improved. It is therefore possible to further increase the rigidity of the vehicle body frame 530.

Figure 18:
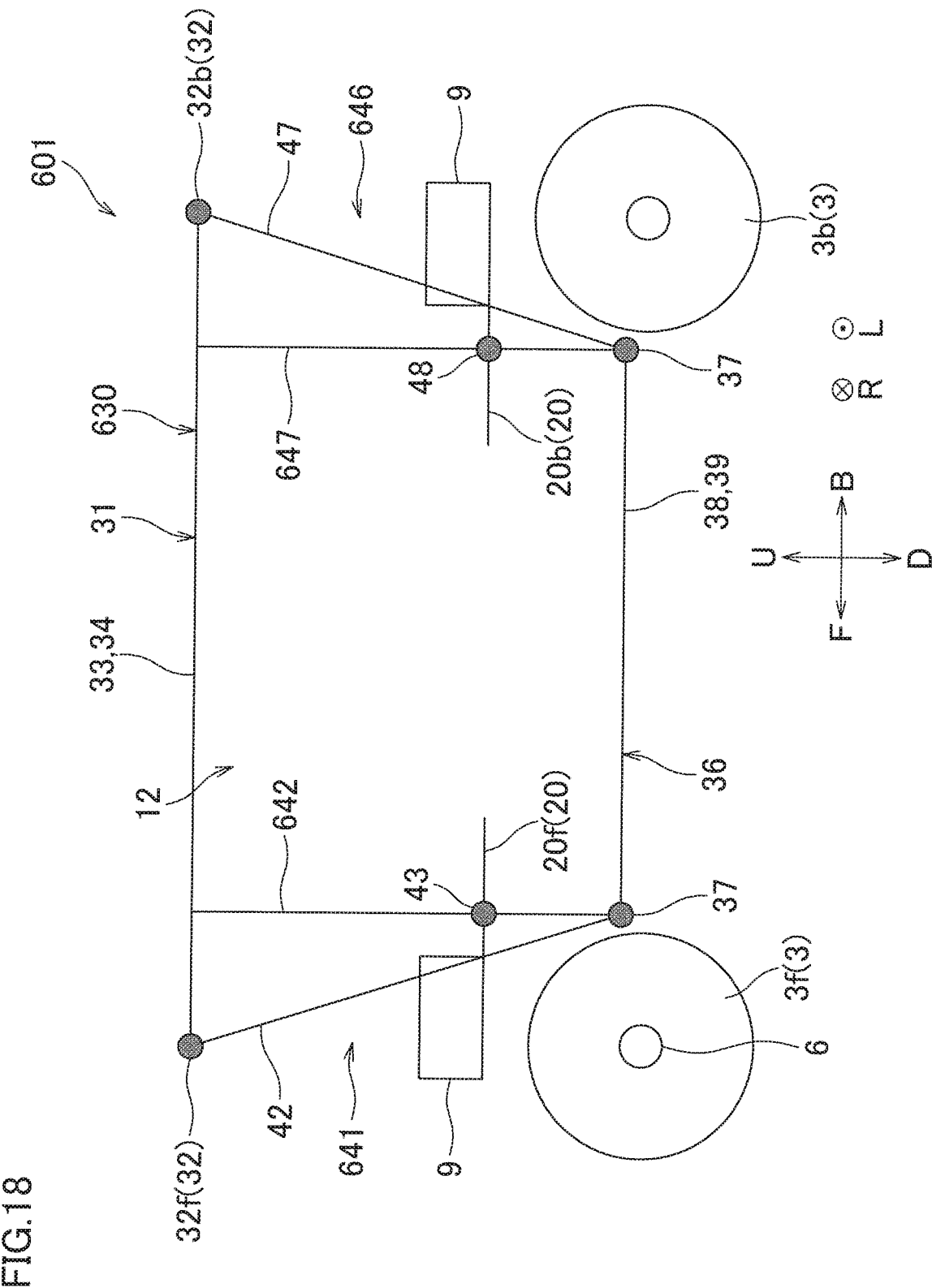
FIG. 18 is a side view of a communication seat-type vehicle of a modification.

A communication seat-type vehicle 601 shown in FIG. 18 is a modification of the communication seat-type vehicle of the embodiment shown in FIG. 3. As shown in FIG. 18, a vehicle body frame 630 includes a ceiling frame 31, a floor frame 36, a front H-shaped frame 641, and a rear H-shaped frame 646. The front H-shaped frame 641 includes two front pillars 42, two intermediate front pillars 642, and a front intermediate transverse frame 43. Each of the two intermediate front pillars 642 is provided to extend along the vehicle up-down direction. The two intermediate front pillars 642 include a left intermediate front pillar 642*l* and a right intermediate front pillar 642*r*. The left intermediate front pillar 642*l* is provided leftward of the right intermediate front pillar 642*r* in the vehicle left-right direction. The left intermediate front pillar 642*l* has an upper portion connected to the ceiling left frame 34 and a lower portion connected to the floor left frame 39. The right intermediate front pillar 642*r* has an upper portion connected to the ceiling right frame 33 and a lower portion connected to the floor right frame 38. The rear H-shaped frame 646 includes two rear pillars 47, two intermediate front pillars 647, and a rear intermediate transverse frame 48. Each of the two intermediate rear pillars 647 is provided to extend along the vehicle up-down direction. The two intermediate rear pillars 647 include a left intermediate rear pillar 647*l* and a right intermediate rear pillar 647*r*. The left intermediate rear pillar 647*l* is provided leftward of the right intermediate rear pillar 647*r* in the vehicle left-right direction. The left intermediate rear pillar 647*l* has an upper portion connected to the ceiling left frame 34 and a lower portion connected to the floor left frame 39. The right intermediate rear pillar 647*r* has an upper portion connected to the ceiling right frame 33 and a lower portion connected to the floor right frame 38. Because the front H-shaped frame 641 includes the two intermediate front pillars 642, the rigidity of the front H-shaped frame 641 is improved. Because the rear H-shaped frame 646 includes the two intermediate rear pillars 647, the rigidity of the rear H-shaped frame 646 is improved. It is therefore possible to further increase the rigidity of the vehicle body frame 630.

In the specific example of the present teaching, the maximum number of passengers seated on the communication seats of the communication seat-type vehicle is four.

Alternatively, the maximum number of passengers seated on the communication seats of the communication seat-type vehicle of the present teaching may be two or more and six or less.

REFERENCE SIGNS LIST 1, 101, 201, 301, 401, 501, 601 communication seat-type vehicle
3, 103 wheel
3f, 103f front wheel
5, 105 driving source
6, 106 steering mechanism
9 part of at least one of driving source or steering mechanism
20, 120 communication seat
30, 130 vehicle body frame
31, 131 ceiling frame
32, 132 ceiling transverse frame
33, 133 ceiling right frame
34, 134 ceiling left frame
36, 136 floor frame
37, 137 floor transverse frame
38, 138 floor right frame
39, 139 floor left frame
41, 141, 541, 641 front H-shaped frame
42, 142 front pillar
43, 143 front intermediate transverse frame
46, 146, 546, 646 rear H-shaped frame
47, 147 rear pillar
48, 148 rear intermediate transverse frame
108 automatic driving controller
112 cabin space
121 seat
121a seat portion
122 back-rest
122a back-rest portion
123 storage space
140 floor intermediate frame
170, 370, 470 vehicle body cover
181 door (sliding door)
182 doorway
184 visor

The invention claimed is:

1. A communication seat-type vehicle for passengers, the vehicle being configured to run forward in a vehicle front-rear direction as a traveling direction, comprising:
communication seats which are provided in a vehicle internal portion and are arranged at locations to allow the passengers seated thereon to talk face-to-face with one another;
four wheels including two front wheels and two rear wheels which are rearward of the two front wheels in the vehicle front-rear direction;
a driving source configured to apply driving force to at least one of the four wheels;
a steering mechanism which is configured to steer at least one of the four wheels; and
a vehicle body frame which is at least partially provided between front ends of the two front wheels and rear ends of the two rear wheels in the vehicle front-rear direction, a cabin space in the vehicle internal portion being provided in the vehicle body frame to accommodate the passengers, the vehicle body frame having a front H-shaped frame structure including:

(A) a ceiling frame including
(a-1) two ceiling transverse frames which are lined up in the vehicle front-rear direction and are each along a vehicle left-right direction,
(a-2) a ceiling right frame connecting right portions of the two ceiling transverse frames with each other, and
(a-3) a ceiling left frame which connects left portions of the two ceiling transverse frame with each other;
(B) a floor frame provided directly below the ceiling frame and including
(b-1) two floor transverse frames which are lined up in the vehicle front-rear direction and are each along the vehicle left-right direction,
(b-2) a floor right frame connecting right portions of the two floor transverse frames with each other, and
(b-3) a floor left frame which connects left portions of the two floor transverse frame with each other;
(C1) a front H-shaped frame including
(c-1) two front pillars which are positioned forward of at least one doorway through which the passengers get in and out from the cabin space, are lined up in the vehicle left-right direction, and are each along a vehicle up-down direction, each of the two front pillars having an upper portion connected to a front portion of the ceiling frame, and a lower portion connected to a front portion of the floor frame, and
(c-2) a front intermediate transverse frame which connects the two front pillars, each of which is arranged so that an upper portion thereof is located forward of a lower portion thereof, the front intermediate transverse frame supporting part of at least one of the driving source or the steering mechanism, which is provided in front of the front intermediate transverse frame; and
(D1) a rear frame including
(d-1) two rear pillars which are positioned rearward of the doorway, are lined up in the vehicle left-right direction, and are each along the vehicle up-down direction, each of the two rear pillars having an upper portion connected to a rear portion of the ceiling frame, and a lower portion connected to a rear portion of the floor frame.

2. A communication seat-type vehicle according to claim 1, wherein,
the vehicle body frame includes:
the front H-shaped frame structure;
a rear H-shaped frame structure including
(A) the ceiling frame,
(B) the floor frame,
(C2) a front frame including (c-1) the two front pillars, and
(D2) a rear H-shaped frame including
(d-1) the two rear pillars, and
(d-2) a rear intermediate transverse frame which connects the two rear pillars, each of which has an upper portion located rearward of a lower portion, the rear intermediate transverse frame supporting part of at least one of the driving source or the steering mechanism, which is provided behind the rear intermediate transverse frame; or
a front-rear H-shaped frame structure including
(A) the ceiling frame,
(B) the floor frame,
(C1) the front H-shaped frame, and
(D2) the rear H-shaped frame.

3. The communication seat-type vehicle according to claim 1, wherein, the communication seats include at least two of:
- a rear seat assembly positioned to have a passenger seated thereon face a forward direction of the vehicle;
- a front seat assembly positioned to have a passenger seated thereon face a rearward direction of the vehicle;
- a right seat assembly positioned to have a passenger seated thereon face a leftward direction of the vehicle; and
- a left seat assembly positioned to have a passenger seated thereon face a rightward direction of the vehicle.

4. The communication seat-type vehicle according to claim 1, wherein, a maximum number of the passengers seatable on the communication seats is no more than six.

5. The communication seat-type vehicle according to claim 1, further comprising a vehicle body cover which at least partially covers the vehicle body frame.

6. The communication seat-type vehicle according to claim 1, further comprising a vehicle body cover which at least partially covers the vehicle body frame, wherein
the at least one doorway is at a right portion, a left portion, or both of the right portion and the left portion of the vehicle body cover.

7. The communication seat-type vehicle according to claim 6, further comprising a door which is configured to open and close each of the at least one doorway.

8. The communication seat-type vehicle according to claim 7, wherein, the door is a sliding door which is slidable in the front-rear direction along an outer surface of the vehicle.

9. The communication seat-type vehicle according to claim 6, further comprising a slope member which is obliquely extendable from the doorway to the ground.

10. The communication seat-type vehicle according to claim 1, wherein, the vehicle is also configured to run rearward in the vehicle front-rear direction.

11. The communication seat-type vehicle according to claim 1, wherein,
each of the communication seats includes a seat portion for a passenger to be seated thereon, and
the seat portion is provided in the vehicle internal portion.

12. The communication seat-type vehicle according to claim 1, further comprising, in the vehicle internal portion, at least one of:
- a front luggage deck constituting a front storage space which is at least partially provided in front of the communication seats; or
- a rear luggage deck constituting a rear storage space which is provided at least partially behind the communication seats.

13. The communication seat-type vehicle according to claim 12, wherein,
each of the communication seats includes a back-rest portion by which a passenger keeps posture, the back-rest portion being constitutable by a back-rest that is provided in the vehicle internal portion, and is arranged to open and close at least one of the front storage space or the rear storage space.

14. The communication seat-type vehicle according to claim 1, wherein, the floor frame further includes:
- at least one floor intermediate frame which is provided between the two floor transverse frames to extend along the vehicle left-right direction; or
- a floor intermediate frame which is provided between the floor right frame and the floor left frame to extend along the vehicle front-rear direction.

15. The communication seat-type vehicle according to claim 1, further comprising an automatic driving controller which is configured to automatically control the driving source and the steering mechanism.

* * * * *